US007950034B2

(12) United States Patent
Sano et al.

(10) Patent No.: US 7,950,034 B2
(45) Date of Patent: May 24, 2011

(54) INFORMATION PROCESSING APPARATUS, INFORMATION PROCESSING METHOD AND PROGRAM FOR THE SAME

(75) Inventors: Ikuya Sano, Kanagawa (JP); Ryoji Amemiya, Kanagawa (JP); Junichiro Sakata, Tokyo (JP); Hiroshi Nagatani, Saitama (JP)

(73) Assignee: Sony Corporation, Tokyo (JP)

( * ) Notice: Subject to any disclaimer, the term of this patent is extended or adjusted under 35 U.S.C. 154(b) by 1142 days.

(21) Appl. No.: 11/119,802

(22) Filed: May 3, 2005

(65) Prior Publication Data
US 2005/0259963 A1 Nov. 24, 2005

(30) Foreign Application Priority Data

May 7, 2004 (JP) ................................. 2004-138594

(51) Int. Cl.
G06F 3/00 (2006.01)
G06F 13/00 (2006.01)
H04N 5/445 (2006.01)
G06F 3/048 (2006.01)
(52) U.S. Cl. .......................................... 725/44; 715/768
(58) Field of Classification Search .................... 735/134
See application file for complete search history.

(56) References Cited

U.S. PATENT DOCUMENTS

| 5,815,145 | A | * | 9/1998 | Matthews, III | 725/41 |
| 6,147,714 | A | * | 11/2000 | Terasawa et al. | 348/564 |
| 6,262,722 | B1 | * | 7/2001 | Allison et al. | 725/39 |
| 6,292,187 | B1 | * | 9/2001 | Gibbs et al. | 715/804 |
| 6,934,718 | B2 | * | 8/2005 | Davidsson | 707/104.1 |
| 2002/0124256 | A1 | | 9/2002 | Suzuka | |
| 2003/0016304 | A1 | * | 1/2003 | Norsworthy et al. | 348/565 |
| 2003/0177495 | A1 | * | 9/2003 | Needham et al. | 725/55 |
| 2003/0206710 | A1 | | 11/2003 | Ferman et al. | |
| 2003/0237097 | A1 | | 12/2003 | Marshall et al. | |

FOREIGN PATENT DOCUMENTS

| EP | 1 549 055 A1 | 6/2005 |
| JP | 10-042218 | 2/1998 |
| JP | 2001-333345 | 11/2001 |
| JP | 2004-015195 | 1/2004 |
| WO | WO 2004/032491 A1 | 4/2004 |

* cited by examiner

Primary Examiner — Andrew Y Koenig
Assistant Examiner — Mark D Featherstone
(74) Attorney, Agent, or Firm — Oblon, Spivak, McClelland, Maier & Neustadt, L.L.P.

(57) ABSTRACT

An information processing apparatus for providing controls to have contents recorded in a recording medium for recording one or more broadcast programs aired in the past as data displayed on a specified display device, includes: an acquiring section to acquire program information for one or more broadcast programs recorded in the recording medium; a program table generating section to generate a first table in which columns in one orthogonal direction are allocated to broadcast stations and the other are to time zones, generate a first program table by allocating program columns for the broadcast program on each of one or more areas identified with the one or more program information acquired by the acquiring section in the entire area constituting the first table, and outputting the first program table as first image data; and a display control section to control, while the control is executed, a background image for second image data displayed on the specified display device, data constituting each of the one or more program columns of the first image data is synthesized on corresponding data in the second image data with a first transmission percentage, the remaining data is synthesized on corresponding data in the second image data with a second transmission rate higher than the first transmission rate, and an image corresponding to the resultant synthesized image data is displayed on the specified display device.

8 Claims, 28 Drawing Sheets

F I G . 1 5

SETTING FOR RECORDING

RECORDING
START TIME (S)  [9] O'CLOCK [00] MINUTE

RECORDING
END TIME (E)   [10] O'CLOCK [00] MINUTE

CHANNEL (C)   CHANNEL A

CHANNEL (D)   ☑ MON.  ☐ TUES.  ☐ WED.  ☐ THURS.  ☐ FRI.  ☐ SAT.  ☐ SUN.

[ OK ]   [ CANCEL ]   [ HELP ]

FIG. 26

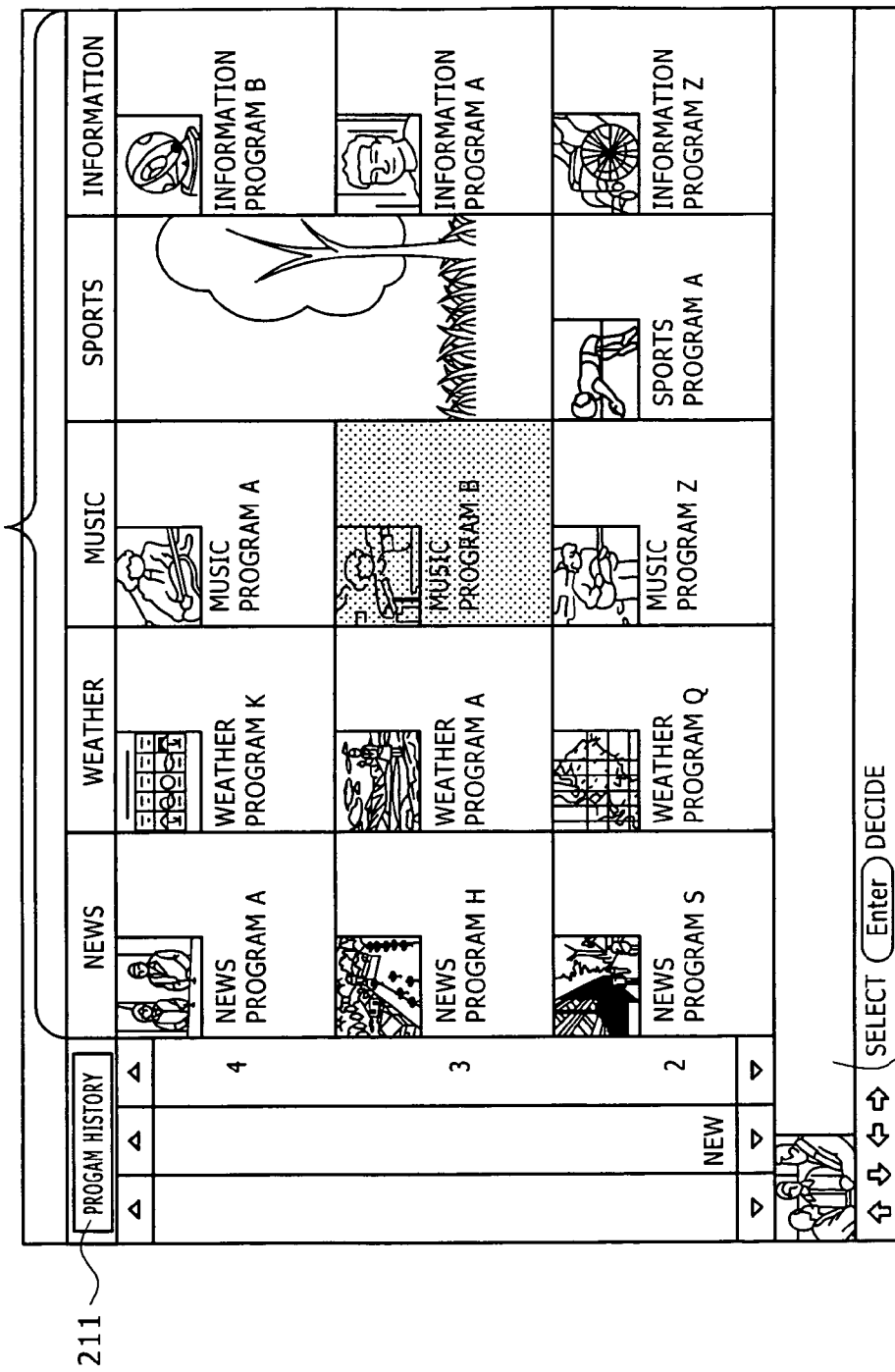

FIG. 28

| NEWS | WEATHER | MUSIC | SPORTS | INFORMATION | DRAMA | VARIETY |
|---|---|---|---|---|---|---|
| NEWS PROGRAM T | | | | | | |
| NEWS PROGRAM E | | MUSIC PROGRAM G | | | | |
| NEWS PROGRAM Z | WEATHER PROGRAM H | MUSIC PROGRAM W | | | | |
| NEWS PROGRAM O | WEATHER PROGRAM P | MUSIC PROGRAM K | | | DRAMA PROGRAM A | |
| NEWS PROGRAM M | WEATHER PROGRAM S | MUSIC PROGRAM P | | | DRAMA PROGRAM K | |
| NEWS PROGRAM A | WEATHER PROGRAM K | MUSIC PROGRAM A | | INFORMATION PROGRAM B | DRAMA PROGRAM L | |
| NEWS PROGRAM H | WEATHER PROGRAM A | MUSIC PROGRAM B | | INFORMATION PROGRAM A | DRAMA PROGRAM P | VARIETY PROGRAM F |
| NEWS PROGRAM S | WEATHER PROGRAM Q | MUSIC PROGRAM Z | SPORTS PROGRAM A | INFORMATION PROGRAM Z | DRAMA PROGRAM D | VARIETY PROGRAM Z |
| NEWS PROGRAM L | WEATHER PROGRAM L | MUSIC PROGRAM L | SPORTS PROGRAM L | INFORMATION PROGRAM L | DRAMA PROGRAM Y | VARIETY PROGRAM O |
| | | | | | DRAMA PROGRAM H | |

222

INFORMATION PROCESSING APPARATUS, INFORMATION PROCESSING METHOD AND PROGRAM FOR THE SAME

BACKGROUND OF THE INVENTION

The present invention relates to an information processing apparatus, an information processing method, and a program for the same, and more specifically to an information processing apparatus, an information processing method, and a program each making it possible for a user to easily and visually check a desired broadcast program among those recorded in a recording medium.

Recently, a recording/reproducing apparatus capable of recording a broadcast program (video signals and audio signals constituting the same) and reproducing the recorded program such as, for instance, a hard disk video recorder has been becoming increasingly popular, and further also a recording/reproducing apparatus enabling a user to make various setting and processing making use of program information concerning broadcast programs such as the so-called EPG (Electronic Program Guide) has been introduced into the market (Refer to, for instance, Japanese Patent Laid-Open No. Hei 9-9193 (Patent document 1), Japanese Patent Laid-Open No. 2001-313878 (Patent document 2), and Japanese Patent Laid-Open No. 2001-8122 (Patent document 3)).

SUMMARY OF THE INVENTION

Recently, a storage capacity of the recording/reproducing apparatus as described above has remarkably increasing. Therefore a number of broadcast programs are recorded in the recording/reproducing apparatus, and there occurs a first problem that, unless management of the recorded contents are performed properly, it would become difficult for the user to find out a desired broadcast program.

Even when contents recorded in the recording/reproducing apparatus are managed with a conventional type of program history, the first program as described above occurs. Namely the conventional type of program history is a table generated by making use of program information for all broadcast programs aired in the past, and all of the broadcast programs (or program columns) are displayed regardless of whether or not each discrete program has been actually recorded. Because of this feature, in the conventional time of program history, broadcast program actually recorded in the recording/reproducing apparatus (described as recorded programs hereinafter) can not be differentiated from those not having been recorded. As a result the first program as described above occurs.

Further with the conventional type of program history, a second program occurs that not all of the displayed broadcast programs can be reproduced.

To solve the problems as described above, the patent documents 2 and 3 disclose the technique for differentiating a display format of recorded programs among programs (program columns) included in a program history by attached a specific mark or by changing the display format. With this feature, recorded program can be differentiated from those not having been recorded to some extent.

However, also in the techniques disclosed in the patent documents 2 and 3, it is presumed that the conventional type of program history showing all broadcast programs (program columns for the broadcast programs) should be used. Therefore, with the techniques disclosed in the patent documents 2 and 3, a user is required to perform an operation for selecting a desired program column from program columns for recorded programs only after broadcast program columns each having a different display format as having a specific mark are separated from the program columns for all aired programs. Because this type of complicated and troublesome operation is required, it can be said that the first program has sufficiently be solved.

Further also in the techniques disclosed in the patent documents 2 and 3, there still exists the second program that not all of the displayed broadcast programs can be reproduced.

An information processing apparatus for providing controls to have contents recorded in a recording medium for recording therein one or more broadcast programs broadcasted in the past as data displayed on a specified display device, the information processing apparatus including: an acquiring section for acquiring program information including, at least first information indicating broadcast station, second information for start time of the broadcast program, and third information indicating end time or time zone, corresponding to one or more broadcast programs recorded in the recording medium; a program table generating section for generating a first table in which columns in one of the vertical direction and horizontal direction are allocated to broadcast stations, and columns in the other direction are allocated to time zones, generating a first program table by allocating program columns for the corresponding broadcast program on each of one or more areas identified with the one or more program information acquired by the acquiring section in the entire area constituting the first table, and outputting the first program table as first image data; and a display control section for providing controls so that, when the first image data is outputted from the program table generating section while the control is being provided to have a background image corresponding to second image data displayed on the specified display device, data constituting each of the one or more program columns of the first image data is synthesized on corresponding data in the second image data with a first transmission percentage, the remaining data is synthesized on corresponding data in the second image data with a second transmission percentage higher than the first transmission percentage, and an image corresponding to the resultant synthesized image data is displayed on the specified display device.

The program table generating section further can generate a second table in which information different from the broadcast stations or time zones is allocated to columns in the vertical direction or in the horizontal direction, generates a second program table in which the one or more program columns included in the first program table are arrayed according to a prespecified rule in the second table, and output the second program table as the first image data.

An information processing method for an information processing apparatus for providing controls to have contents recorded in a recording medium for recording therein one or more broadcast programs broadcasted in the past as data displayed on a specified display device, the method including steps of: acquiring program information including at least first information indicating broadcast station, second information for start time of the broadcast program, and third information indicating end time or time zone, corresponding to one or more broadcast programs recorded in the recording medium; generating program table, which generates a table in which columns in one of the vertical direction and horizontal direction are allocated to broadcast stations, and columns in the other direction are allocated to time zones, generates a program table by allocating program columns for the corresponding broadcast programs on each of one or more areas identified with the one or more program information acquiring by the acquiring section in the entire area constituting the first table, and outputs the program table as first image data; and controlling display so that, when the first image data is outputted as a result of the program table generating step while the control is being executed to display a background image corresponding to second image data on the specified display device, data constituting each of the one or more program columns of the first image data is synthesized on corresponding data in the second image data with a first transmission percentage, the remaining data is synthesized on corresponding data in the second image data with a second transmission percentage higher than the first transmission percentage, and an image corresponding to the resultant synthesized image data is displayed on the specified display device.

A program for making a computer execute controls to display contents recorded in a recording medium recording one or more programs broadcasted in the past as data on a specified display device, the program including: steps of acquiring program information including at least first information indicating broadcast station, second information for start time of the broadcast program, and third information indicating end time or time zone, corresponding to one or more broadcast programs recorded in the recording medium; generating program table, which generates a table in which columns in one of the vertical direction and horizontal direction are allocated to broadcast stations, and columns in the other direction are allocated to time zones, generates a program table by allocating program columns for the corresponding broadcast programs on each of one or more areas identified with the one or more program information acquiring by the acquiring section in the entire area constituting the first table, and outputs the program table as first image data; and controlling display so that, when the first image data is outputted as a result of the program table generating step while the control is being executed to display a background image corresponding to second image data on the specified display device, data constituting each of the one or more program columns of the first image data is synthesized on corresponding data in the second image data with a first transmission percentage, the remaining data is synthesized on corresponding data in the second image data with a second transmission percentage higher than the first transmission percentage, and an image corresponding to the resultant synthesized image data is displayed on the specified display device.

According to the present invention, an information processing apparatus, an information processing method, and a program display contents recorded in a recording medium which includes therein one or more broadcast programs broadcasted in the past as data, on a specified display device. Specifically, in the information processing apparatus, the information processing method, and the program, the steps are executed of: acquiring program information including at least first information indicating broadcast station, second information for start time of the broadcast program, and third information indicating end time or time zone, corresponding to one or more broadcast programs recorded in the recording medium; generating program table, which generates a table in which columns in one of the vertical direction and horizontal direction are allocated to broadcast stations, and columns in the other direction are allocated to time zones, generates a program table by allocating program columns for the corresponding broadcast programs on each of one or more areas identified with the one or more program information acquiring by the acquiring section in the entire area constituting the first table, and outputs the program table as first image data; and controlling display so that, when the control is being executed to display a background image corresponding to second image data on the specified display device, data constituting each of the one or more program columns of the first image data is synthesized on corresponding data in the second image data with a first transmission percentage, the remaining data is synthesized on corresponding data in the second image data with a second transmission percentage higher than the first transmission percentage, and an image corresponding to the resultant synthesized image data is displayed on the specified display device.

As described above, with the present invention, a program table showing broadcast programs broadcasted in the past can be presented. Especially, a program table making is possible for a user to easily find out a desired broadcast program from those recorded in a recording/reproducing apparatus can be presented.

BRIEF DESCRIPTION OF THE DRAWINGS

FIG. 15 is a view showing an example of a dialog (image) used together with the non-stop recording reserved image shown in FIG. 14;

FIG. 26 is a view showing an example of an image showing a portion of a program history used in the "program history presentation/reproduction control process" shown in FIG. 25 and FIG. 26;

FIG. 27 is a view showing an example of an image showing a portion of a keyword-classified program history used in the "program history presentation/reproduction control process" shown in FIG. 25 and FIG. 26;

FIG. 28 is a view showing an example of an image showing the keyword-classified program history used in the "program history presentation/reproduction control process" shown in FIG. 25 and FIG. 26 as a whole.

DETAILED DESCRIPTION OF THE PREFERRED EMBODIMENTS

Embodiments of the present invention are described hereinafter, and correspondence between the constituent features as defined in claims and the examples in the embodiments of the present invention is exemplified as follows. This description is made to confirm that operative examples for supporting the inventions described in claims are described in the embodiments of the present invention. Therefore, even when there is an operative example which is described in the embodiments of the present invention but not described herein as a correspondence to constituent features, it is not meant that the operative example does not correspond to the constituent features. On the contrary, even when an operative example is described herein as a correspondence to constituent features, it is not meant that the operative example corresponds only to the foregoing constituent features but not to other constituent features.

Additionally, this description does not mean that each of the inventions corresponding to an operative example described in an embodiment of the present invention is described in claims. In other words, this description does not deny a possible existence of an invention which corresponds to an operative example described in an embodiment of the present invention but not described in claims of this application, namely, this description does not deny a possible existence of an invention whose application may be divided or may be added due to an amendment(s).

Figure 1:
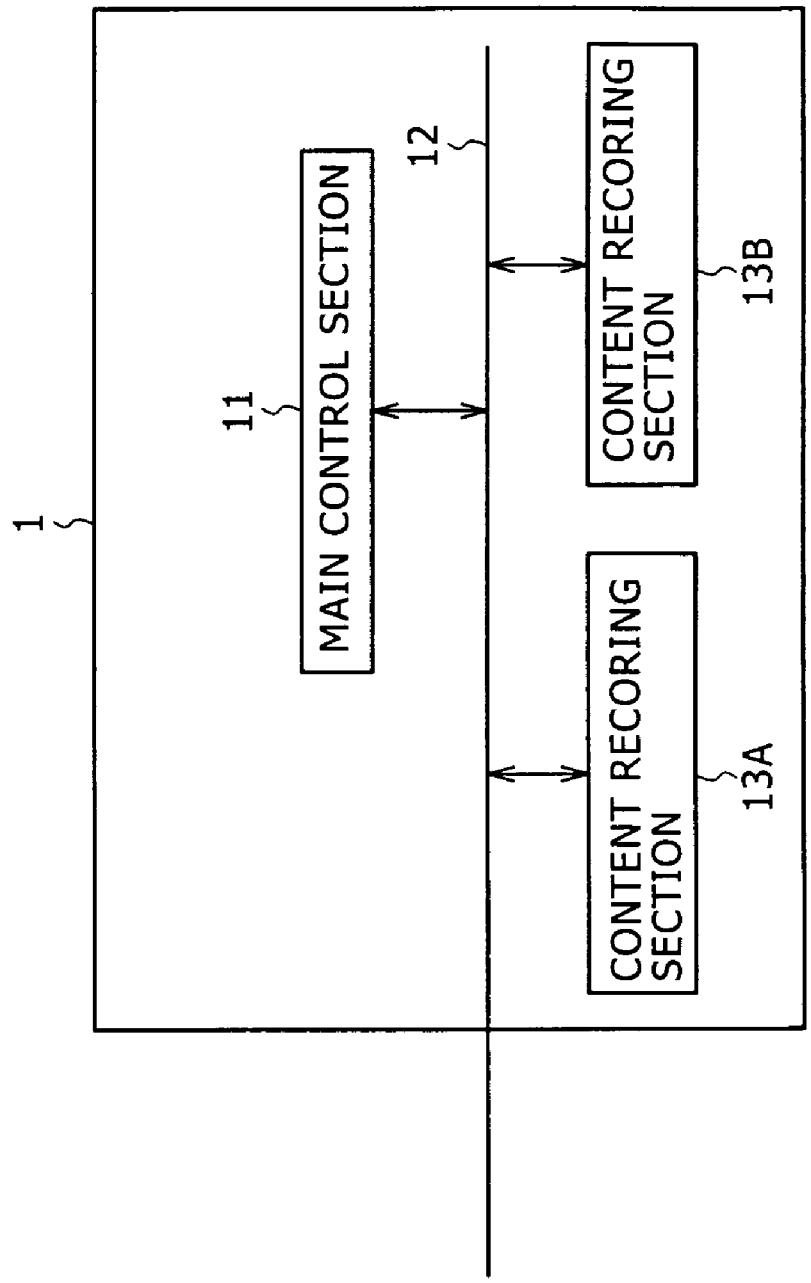
FIG. 1 is a view showing an example of hardware configuration of a content recoding/reproducing apparatus according to the present invention.
Figure 2:
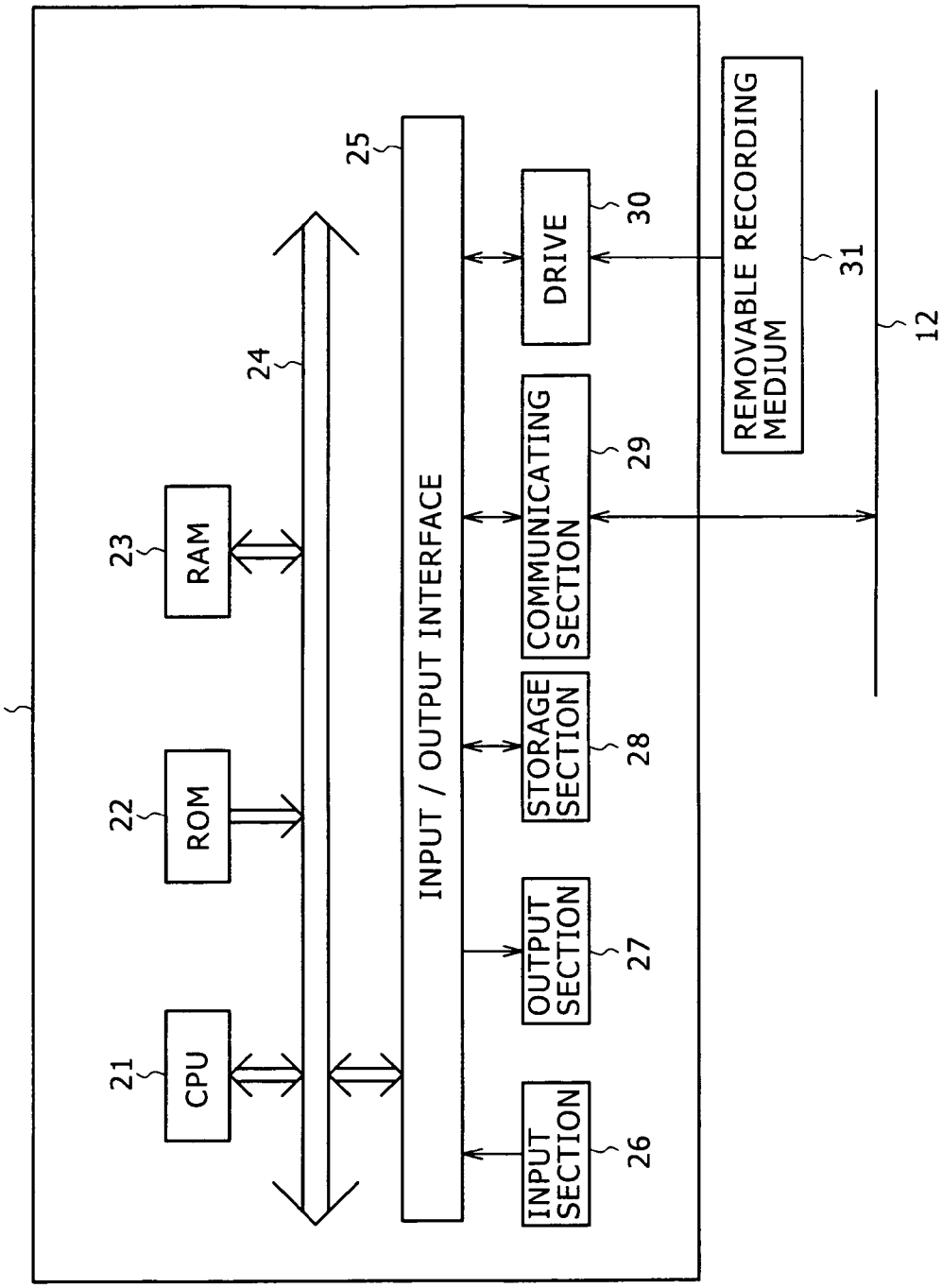
FIG. 2 is a block diagram showing details of hardware configuration of a main control section of the content recording/reproducing apparatus shown in FIG. 1.
Figure 3:
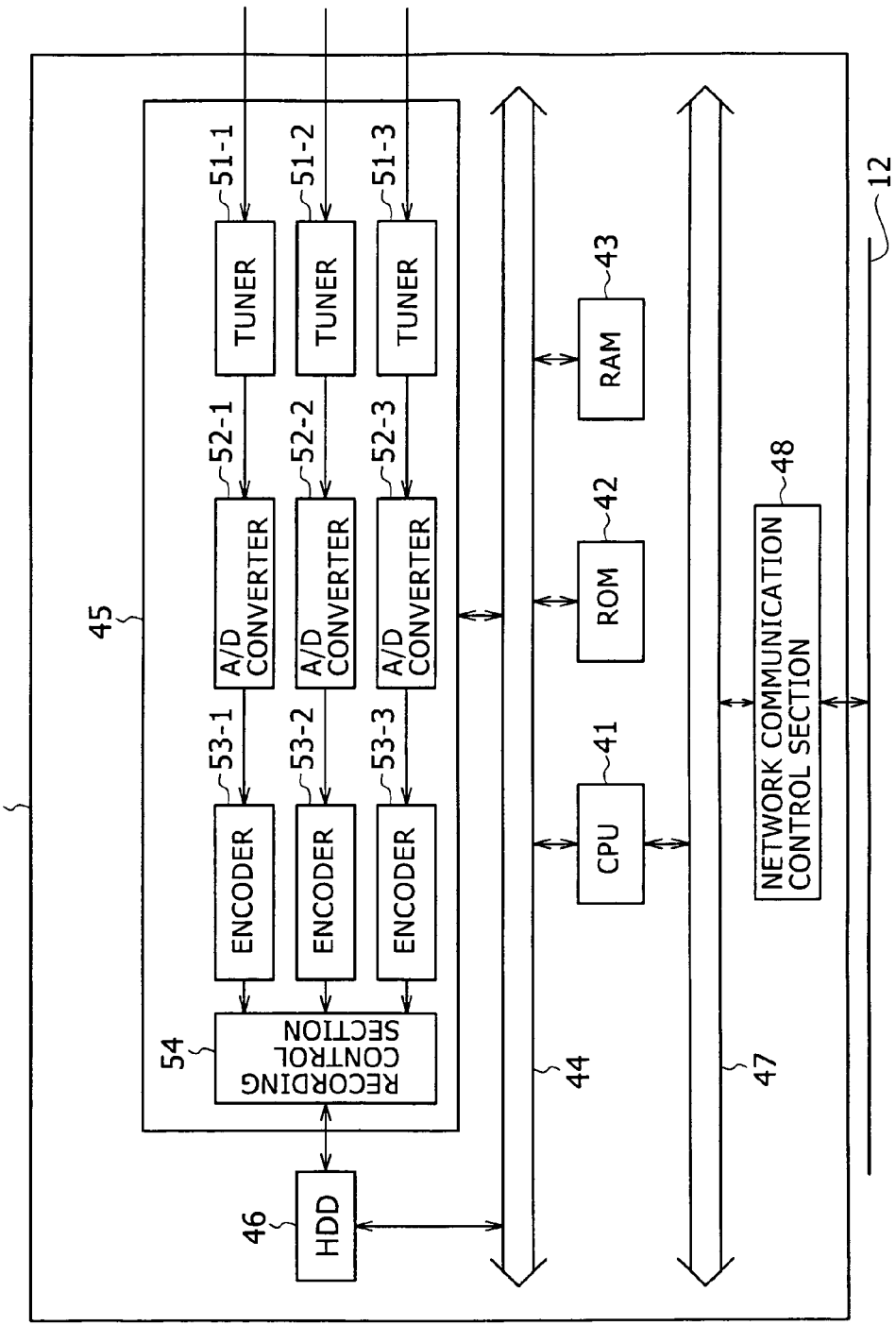
FIG. 3 is a block diagram showing details of hardware configuration of a content recording section of the content recording/reproducing apparatus shown in FIG. 1.
Figure 24:
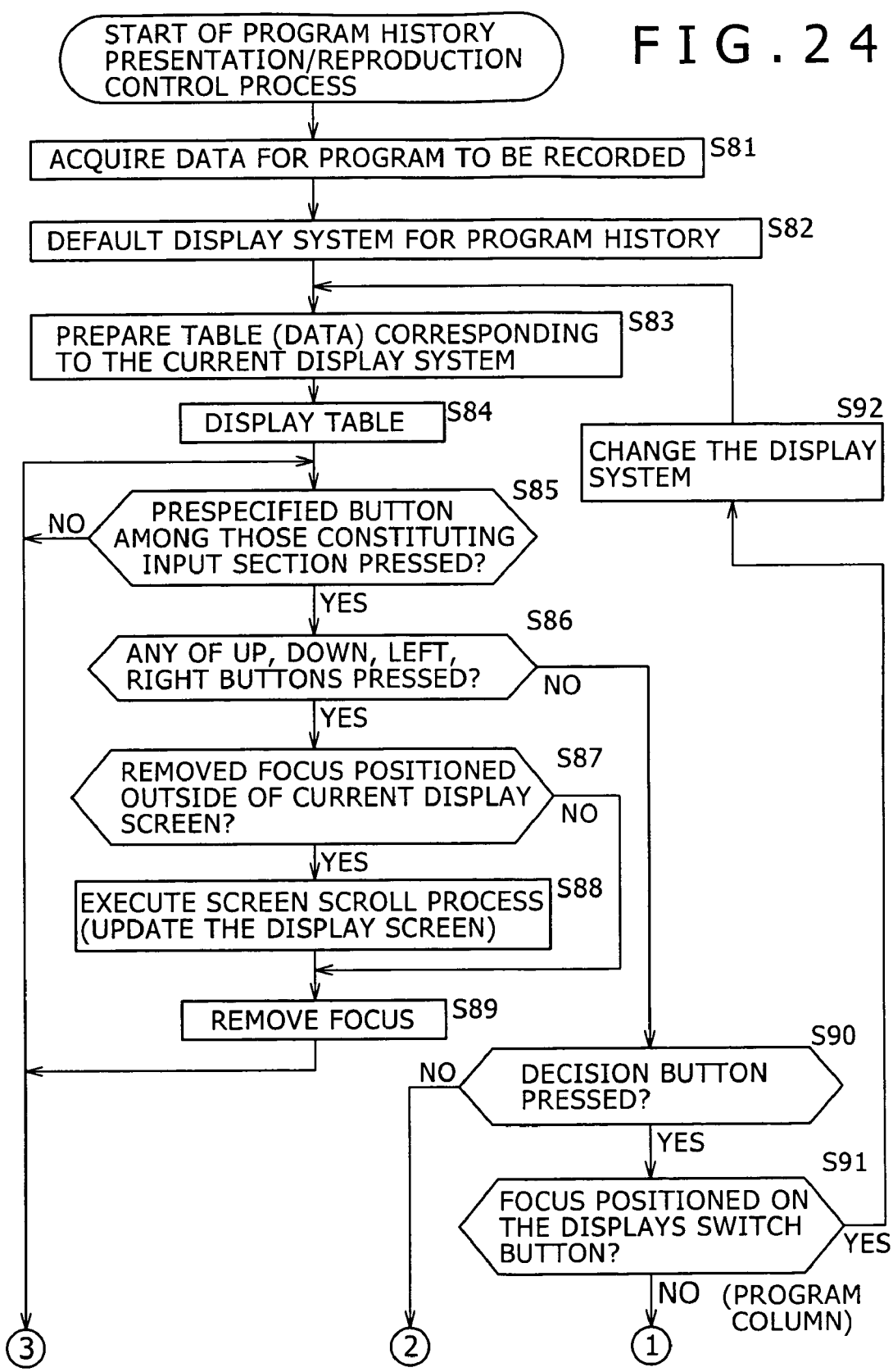
FIGS. 24 and 25 are flow charts illustrating an example of a "program history presentation/reproduction control process" executed by the content recording/reproducing apparatus shown in FIG. 1.
Figure 26:
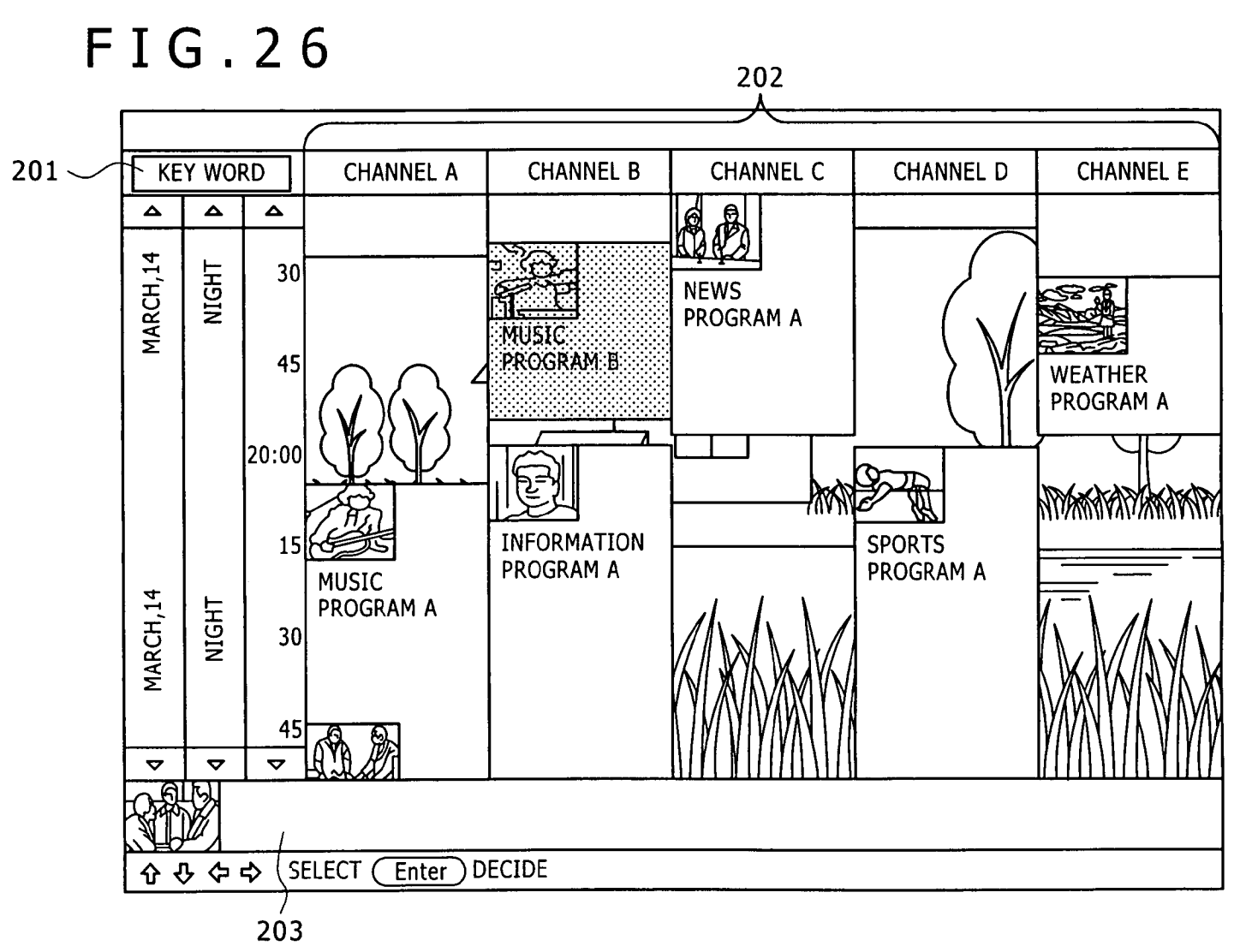

The present invention provides an information processing apparatus (such as, for instance, a content recording/reproducing apparatus 1 in FIG. 1) for providing controls to have contents recorded in a recording medium (such as, for instance, a hard disk constituting an HDD 46 shown in FIG. 3) for recording therein one or more broadcast programs broadcasted in the past as data displayed on a specified display device (such as, for instance, an output section 27 in FIG. 2), and the information processing apparatus includes a acquiring means for acquiring program information including at least first information indicating broadcast stations corresponding to one or more broadcast programs recorded in the recording medium, second information for start times of the broadcast programs, and third information indicating end times or time zones for the broadcast programs (such as a program history managing section 63 for executing a process in step S81 in FIG. 24); a program table generating means for generating a first table in which columns in one of the vertical direction and horizontal direction are allocated to broadcast stations, and columns in the other direction are allocated to time zones, generating a first program table by allocating program columns for the corresponding broadcast programs on each of one or more areas identified with the one or more program information acquiring by the acquiring means in the entire area constituting the first table, and outputting the first program table as first image data (such as, for instance, a program history managing section 63 for executing a process in step S83 in FIG. 24); and a display control means (such as, for instance, an information resenting integrated control section 61 for executing a process in step S84 in FIG. 24) for providing controls so that, when the first image data is outputted from the program table generating means while the control is being provided to have a background image corresponding to second image data displayed on the specified display device, data constituting each of the one or more program columns of the first image data is synthesized on corresponding data in the second image data with a first transmission percentage, the remaining data is synthesized on corresponding data in the second image data with a second transmission percentage higher than the first transmission percentage, and an image corresponding to the resultant synthesized image data is displayed on the specified display device (such as, for instance, providing controls to have an image shown in FIG. 26 displayed).

The program table generating means further can generate a second table in which information different from the broadcast stations or time zones (such as, for instance, keywords such as "news", or "weather" allocated to columns in the horizontal direction as shown in FIG. 27) is allocated to columns in the vertical direction or in the horizontal direction, generates a second program table in which the one or more program columns included in the first program table are arrayed according to a prespecified rule in the second table, and output the second program table as the first image data (such as a program table as shown in FIG. 27, and described as a program table by keyword in this specification as described below).

The present invention provides an information processing method for an information processor (such as, for instance, a content recording/reproducing apparatus 1 shown in FIG. 1) for providing controls to have contents recorded in a recording medium (such as, for instance, a hard disk constituting an HDD 46 shown in FIG. 3 for recording therein one or more broadcast programs broadcasted in the past as data displayed on a specified display device (such as, for instance, an output section 27 shown in FIG. 2), and the method includes a acquiring step (such as, for instance, a process in step S81 in FIG. 24) of acquiring program information including at least first information indicating broadcast stations corresponding to one or more broadcast programs recorded in the recording medium, second information for start times of the broadcast programs, and third information indicating end times or time zones for the broadcast programs; a program table generating step (such as, for instance, a process in step S83 in FIG. 24) of generating a first table in which columns in one of the vertical direction and horizontal direction are allocated to broadcast stations, and columns in the other direction are allocated to time zones, generating a first program table by allocating program columns for the corresponding broadcast programs on each of one or more areas identified with the one or more program information acquiring by the acquiring means in the entire area constituting the first table, and outputting the first program table as first image data; and a display control step (such as a processing in step S84 in FIG. 24) of providing controls so that, when the first image data is outputted from the program table generating means while the control is being provided to have a background image corresponding to second image data displayed on the specified display device, data constituting each of the one or more program columns of the first image data is synthesized on corresponding data in the second image data with a first transmission percentage, the remaining data is synthesized on corresponding data in the second image data with a second transmission percentage higher than the first transmission percentage, and an image corresponding to the resultant synthesized image data is displayed on the specified display device.

With an embodiment of the present invention, there is provided a program. The program is that corresponding to the information processing method according to the embodiment of the present invention described above, and is executed by, for instance, a computer having the hardware configuration as shown in FIG. 2.

Embodiments of the present invention are described hereinafter with reference to the drawings.

FIG. 1 is a view showing an example of hardware configuration for a content recording/reproducing apparatus 1 as an information processing apparatus to which an embodiment of the present invention is applied.

As shown in FIG. 1, in the content recording/reproducing apparatus 1, a main control section 11, a content recording section 13A and a content recording section 13B are connected one another via a network 12.

Configuration of the network 12 is not specifically limited, and can be built with, for instance, the Ethernet (registered trademark) or the like. The network 12 may be omitted. Namely, the main control section 11, the content recording section 13A and the content recording section 13B may directly communicate one another without employing the network 12.

It is to be noted that, when it is not necessary to distinguish between the content recording section 13A and the content recording section 13B, the content recording section 13A and the content recording section 13B are combined to be referred to as a content recording section 13 hereinafter.

In an example in FIG. 1, the content recording/reproducing apparatus 1 is equipped with two units of the content recording section 13, but the number of unit which the content recording/reproducing apparatus 1 has is not limited to that in the example in FIG. 1, and any number is allowable. Similarly, any number of units which the main control section 11 has is allowable.

Examples of detailed hardware configuration for the main control section 11 and the content recording section 13 are shown in FIG. 2 and FIG. 3 respectively. Hereinafter, with reference to each of FIG. 2 and FIG. 3, examples of detailed hardware configuration each for the main control section 11 and the content recording section 13 are described discretely in this order.

Firstly, with reference to FIG. 2, an example of detailed hardware configuration for the main control section 11 is described below.

In the main control section 11 in FIG. 2, a CPU 21 executes various types of processes according to a program stored in a ROM 22 or a program loaded from a storage section 28 to a RAM 23. In the RAM 23 is also stored data necessary for the CPU 21 to execute various processes according to the necessity.

The CPU 21, ROM 22 and RAM 23 are connected one another via a bus 24. To this bus 24 is also connected an input/output interface 25.

To the input/output interface 25 is connected an input section 26 comprising a keyboard, a mouse, and a remote controller (including a photo receiving section); an output section 27 comprising a speaker and a display; the storage section 28 comprising a hard disk; and a communicating section 29 for controlling communication processing via the network 12 (in FIG. 1) with other blocks (in an example in FIG. 1, the content recording section 13A or the content recording section 13B). Although not shown in FIG. 2, the communicating section 29 may be connected to a network having a different configuration from that of the network 12 (for instance, a network 304 shown in FIG. 29 and described hereinafter, or the like).

To the input/output interface 25 is also connected a drive 30 according to the necessity, and is accordingly attached a removable recording medium 31 such as a magnetic disk, an optical disk, a magnetic optical disk or a semiconductor memory, and a computer program read out from those media is installed in the storage section 28 according to the necessity.

Configuration of hardware in the main control section 11 is not limited to that in the example in FIG. 2, but any hardware configuration is operable as long as the main control section 11 has at least a functional configuration shown in FIG. 4 and described hereinafter.

Next, with reference to FIG. 3, an example of hardware configuration for the content recording section 13 is described.

In the content recording section 13 in FIG. 3, a CPU 41 executes various types of processes according to a program stored in a ROM 42. Alternatively, the CPU 41 receives, via a network communication control section 48 and a bus 47, a program transmitted from the main control section 11 in FIG. 1 via the network 12, and loads the program into a RAM 43. The CPU 41 may execute various processes according to the program. In the RAM 43 is also stored data necessary for the CPU 41 to execute various processes according to the necessity.

The CPU 41, ROM 42 and RAM 43 are connected one another via a bus 44. To this bus 44 is also connected a content acquiring section 45 and an HDD (Hard Disk Drive) 46.

The content acquiring section 45 is configured to be capable of simultaneously receiving (acquiring) each of the broadcast programs (contents) broadcasted from a plurality of broadcast stations in the same time zone of a day. Specifically, for instance, in an example in FIG. 3, the content acquiring section 45 is configured to be capable of simultaneously receiving three broadcast programs each broadcasted from three different broadcast stations. Namely, the content acquiring section 45 is provided with three tuners 51-1 to 51-3, three A/D converting (Analog to Digital Conversion) sections 52-1 to 52-3, and three encoders 53-1 to 53-3.

It is to be noted that, when it is not necessary to distinguish each of three tuners 51-1 to 51-3, the three tuners 51-1 to 51-3 are combined to be referred to as a tuner 51 hereinafter. Similarly, when it is not necessary to distinguish each of three A/D converting sections 52-1 to 52-3, the three A/D converting sections 52-1 to 52-3 are combined to be referred to as an A/D converting section 52 hereinafter. Further, when it is not necessary to distinguish each of three encoders 53-1 to 53-3, the three encoders 53-1 to 53-3 are combined to be referred to as an encoder 53 hereinafter.

The tuner 51 demodulates airwaves for a terrestrial or satellite TV broadcast received by an antenna not shown, and supplies the resultant video signals and audio signals with the A/D converting section 52.

Namely, when airwaves for a channel specified by the CPU 41 (accurately, a channel specified by, for instance, a reservation input section 62 in FIG. 4 described hereinafter), more accurately, airwaves constituting a broadcast program broadcasted by a broadcast station to which the channel is allocated are received by an antenna, the tuner 51 demodulates the airwaves, and supplies the resultant video signals and audio signals with the A/D converting section 52.

As described above, a broadcast program is what is broadcasted from a broadcast station, however, for convenience of description, the expression is used hereinafter in which a broadcast program is broadcasted on a channel (to which the broadcast station is allocated). For instance, the description is made hereinafter using an expression such as "a broadcast program broadcasted on Channel A".

The A/D converting section 52 makes an analog-digital conversion for analog video signals and audio signals supplied by the tuner 51, and supplies the resultant digital video signals and audio signals to the encoder 53. It is to be noted that the digital signals outputted from the A/D converting section 52, namely, digital video signals and audio signals constituting a specified broadcast program are combined to be referred to as content data hereinafter.

The encoder 53 encodes (converts into compressed code) content data supplied by the A/D converting section 52 with, for instance, the MPEG (Moving Picture Experts Group) method, and the encoder 53 then supplies the encoded content data to a recording control section 54. It is to be noted that the encoded content data outputted from the encoder 53 is hereinafter referred to as compressed content data.

The recording control section 54 makes an HDD 46 store therein each of compressed content data supplied from each of the encoders 53-1 to 53-3 in the file format.

Namely, in the HDD 46 is stored a file containing compressed content data. It is to be noted that the operation that "the compressed content data is stored in the HDD 46" is hereinafter expressed as "a broadcast program (corresponding to the compressed content data) is recorded". In other words, when it is not necessary to distinguish a broadcast program from the content data constituting the broadcast program or compressed content data, all of the above are simply referred to as a broadcast program hereinafter.

A unit for recording of the HDD 46 is not necessarily one broadcast program, and accurately, the unit is broadcasted contents on a specified channel identified with one reservation for recording described hereinafter. The broadcasted contents may include one or more broadcast programs (and further, as described later, the broadcasted contents do not necessarily include the entire broadcast program but may include only a portion of the broadcast program). Thus one file recorded in the HDD 46 may include one broadcast program broadcasted on a specified channel, or may include two or more broadcast programs broadcasted on the channel.

It is to be noted that the file described above is hereinafter referred to as a video capsule. Namely a video capsule includes at least a portion of each of one or more broadcast programs (compressed content data).

Further, the HDD 46 also stores program information concerning a recorded broadcast program (meta data).

In the present embodiment, the program information stored in the HDD 46 is supplied by a server (not shown) connected to the network 12. Namely, in the present embodiment, the CPU 41 acquires program information concerning each broadcast program via the network 12 and the network communicating control section 48 according to the necessity and makes the HDD 46 store therein the program information.

However, a method of acquiring the program information is not limited to that in the example according to the present embodiment, but any method is available. For instance, such a method is allowable in which the content acquiring section 45 extracts program information from a vertical blanking period for a received terrestrial TV broadcast signal, or extracts program information from a received satellite TV broadcast signal.

The CPU 41 is also connected to a bus 47, and to this bus 47 is further connected a network communicating control section 48. The network communicating control section 48 controls a communication process with other blocks (in the example in FIG. 1, the main control section 11 or the like) via the network 12.

Configuration of hardware for the content recording section 13 is not limited to that in the example in FIG. 3, but any hardware configuration is operable as long as the content recording section 13 has at least a functional configuration shown in FIG. 4 and described hereinafter.

Meanwhile, the description hereinafter may be made by once again distinguishing between the content recording section 13A and the content recording section 13B. In such a case, the CPU 41 through the network communicating control section 48 installed in the content recording section 13A are referred to as a CPU 41A through a network communicating control section 48A, respectively. Similarly, the CPU 41 through the network communicating control section 48 installed in the content recording section 13B are refereed to as a CPU 41B through a network communicating control section 48B, respectively.

In the example described above, the number of tuners installed in the content recording/reproducing apparatus 1 is configured to be six. Namely, in the content recording section 13A are installed three tuners 51-1A to 51-3A, while in the content recording section 13B are installed three tuners 51-1B to 51-3B (and shown in the figure as such). However, the number of tuners installed in the content recording/reproducing apparatus 1 is not limited to that in the example described above, but any number of tuners is allowable. In addition, location for equipping the tuner is not specifically limited, and for instance, any desired number of tuners may be installed in the main control section 11.

As described above, an example of hardware configuration for the content recording/reproducing apparatus 1 to which an embodiment of the present invention is applied is described with reference to FIG. 1 to FIG. 3.

Next functional configuration of the content recording/reproducing apparatus 1 is described below with reference to FIG. 4. Namely, FIG. 4 shows an example of functional configuration of the content recording/reproducing apparatus 1.

Hardware configuration of the main control section 11 is as shown in FIG. 2, and therefore an information presentation integrated control section 61, a reservation input section 62, and a program history managing section 63 are configured, for instance, as application software executed by a CPU 21 shown in FIG. 2. It is needless to say that, when hardware configuration of the main control section 11 is different from that shown in FIG. 2, the information presentation integrated control section 61, reservation input section 62, and program history managing section 63 may be configured with hardware respectively, or with a combination of software and hardware.

Similarly, because hardware configuration of the content recording section 13A and content recording section 13B is as shown in FIG. 3 respectively, each of a recording managing section 71A and content/meta data providing section 72A, and each of a recording managing section 71B and a content/meta data providing section 73B is configured as application software executed, for instance, by a CPU 41 shown in FIG. 3. It is needless to say that, by changing hardware configuration of each of the content recording section 13A and content recording section 13B from that shown in FIG. 3, each of the recording managing section 71A and content/meta data providing section 72A and each of the recording managing section 71B and content/meta data providing section 72B may be configured as a hardware unit or as a combination of software and hardware respectively.

Figure 4:
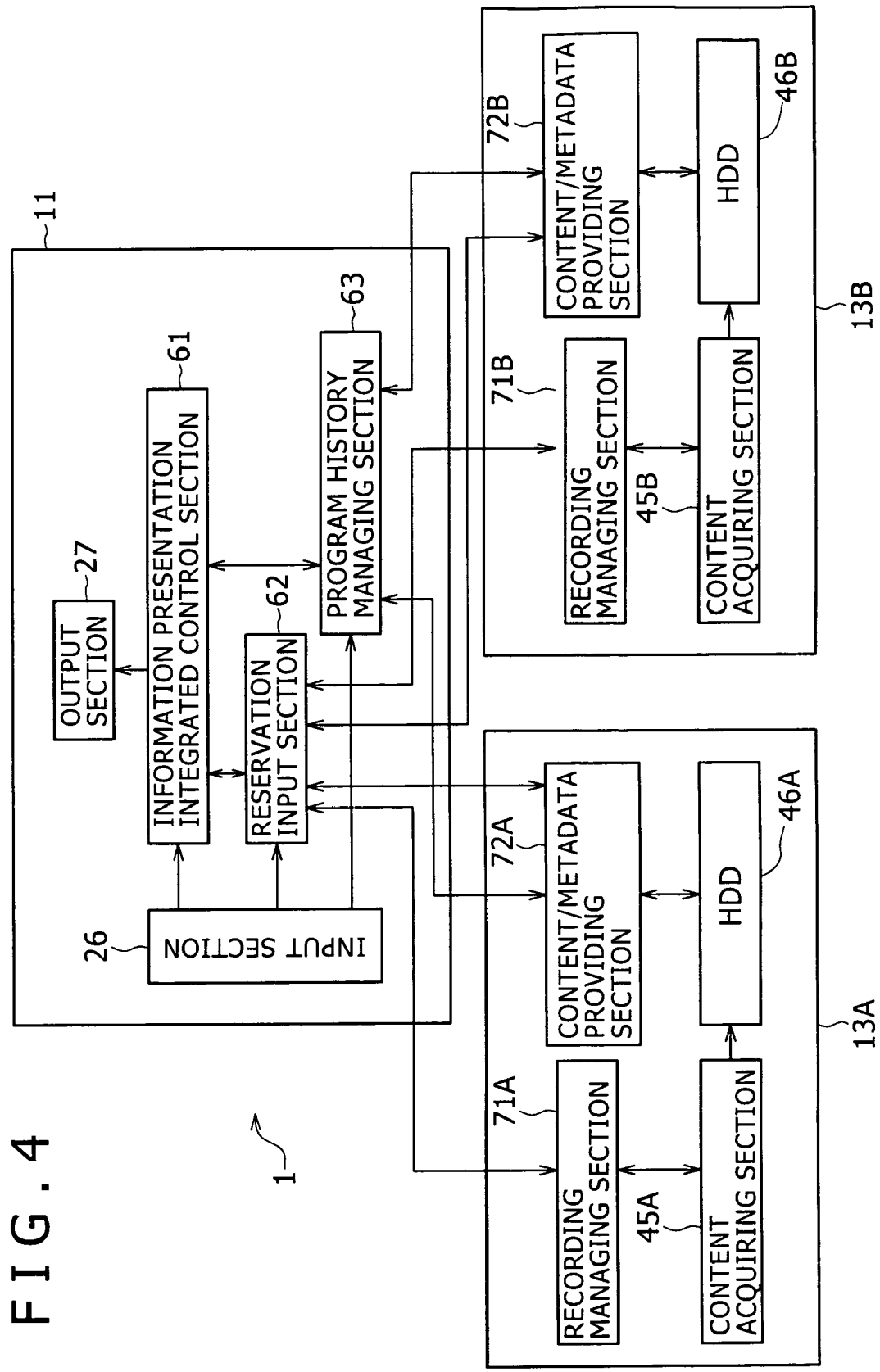
FIG. 4 is a functional block diagram showing functional configuration of the content recording/reproducing apparatus shown in FIG. 1.

In the main control section 11 shown in FIG. 4, the information presentation integrated control section 61 controls in such a manner that various types of information supplied from the reservation input section 62 or the program history managing section 63 are subjected to necessary processing and then outputted from the output section 27.

More specifically, there is a case, for instance, where image data corresponding to any of images (described in detail hereinafter) and the like shown in FIGS. 8 to 15, FIG. 26, and FIG. 27 is supplied from the reservation input section 62 or from the program history managing section 63 to the information presentation integrated control section 61. In the case as described above, the information presentation integrated control section 61 subjects the supplied image data to necessary image data processing, further converts the image data to an analog image signal, and outputs the analog image signal to the output section 27. Then the output section 27 displays an image corresponding to the image signal supplied from the information presentation integrated control section 61, namely any of the images shown in FIG. 8 to FIG. 15, FIG. 26, and FIG. 27.

Further there is a case, for instance, where a specified video capsule is supplied from the content recording section 13A or content recording section 13B via the program history managing section 63 to the information presentation integrated control section 61. In this case, the information presentation integrated control section 61 decodes compressed content data included in the supplied video capsule by means of the MPEG system or the like, and supplies a video signal and an audio signal obtained as a result of decoding to the output section 27. Then the output section 27 displays a video (moving picture) corresponding to the supplied video signal and also outputs voices and sounds corresponding to the supplied audio signal. Namely, the output section 27 reproduces a broadcast program included in the video capsule with a format of compressed data.

When the information presentation integrated control section 61 receives from the input section 26 an instruction (such as a volume change instruction for voices and sounds outputted from the output section 27, reproduction, suspension, stop, quick forwarding of a broadcast program and the like), the information presentation integrated control section 61 executes a process corresponding to the instruction.

The reservation input section 62 sets reservation for recording based on information inputted from the input section 26, namely the contents instructed by a user, and notifies the reservation to the recording managing section 71A in the content recording section 13A or to the recording managing section 71B in the content recording section 13B.

What is important herein is the point that information inputted from the input section 26 is a "a day of the week, channel, start time, and end time", and is also the point that the reservation input section 62 sets reservation for recording different from that in the conventional technology based on the information described above.

Namely, contents of reservation for recording in the past is "a specific broadcast program desired by a user is recorded", but with the present invention, contents of reservation for recording is "contents broadcasted in a time zone desired by a user (every week on a day of the week specified by the user and a time zone from a start time until an end time each specified by the user) from a specified channel specified by the user is recorded".

In the following description, the reservation for recording set in the reservation input section 62, namely the reservation for recording set with the information such as "a day of the week, a channel, start time, and end time" is described hereinafter as reservation for non-stop recording to differentiate it from the reservation for recording in the conventional technology.

Of the process executed in the reservation input section 62, the process for notifying contents of the set reservation for recording (including not only reservation for non-stop recording, but also reservation for recording divided from the reservation for non-stop recording described below) to the recording managing section 71A in the content recording section 13A or to the recording managing section 71B in the content recording section 13B is referred to as input of reservation for recording). To describe more accurately, input of reservation for recording includes, in addition to the process for notification executed by the reservation input section 62, the processing executed by either one having received the notification of the recording managing section 71A or the recording managing section 71B for preserving contents of the notified reservation for recording.

Namely, the reservation input section 62 sets and inputs a reservation for non-stop recording based on the contents of an operation by a user in the input section 26, namely based on the information such as "a day of the week, a channel, start time, and end time".

Further important matter is the point that a user can easily perform the operation for setting reservation for non-stop recording visually checking an image for GUI for setting reservation for non-stop recording (described as a non-stop recording reservation image), namely the non-stop recording reservation image as shown in FIG. 8 to FIG. 14.

Details of the process for setting reservation for non-stop recording and inputting the reservation and details of the non-stop recording reservation image are described hereinafter with reference to FIG. 6 to FIG. 15.

Further the reservation input section 62 can further divides the inputted reservation for non-stop recording to reservations each for recording a specified broadcast program.

For the following description, it is assumed that a reservation for non-stop recording with the contents of "to record contents broadcasted from the channel A in the time zone from 8:00 a.m. until 1:00 p.m. on Tuesday" has been inputted. Also it is assumed that a first broadcast program is broadcasted in the time zone from 8:00 a.m. until 11:00 a.m. next Tuesday, and then a second broadcast program is broadcasted in the time zone from 11:00 a.m. until 1:00 p.m. Namely it is assumed that program information for each of the first and second broadcast programs includes information allowing for identification of general contents of each program.

In this case, the reservation input section 62 automatically acquires program information for the first broadcast program and the second broadcast program stored in an HDD 46A or in an HDD 46B at a prespecified timing before 8:00 a.m. next Tuesday via the content/meta data providing section 72A or the content/meta data providing section 72B. Further the reservation input section 62 automatically divides the reservation for recording of the first broadcast program and the reservation for recording of the second broadcast program and inputs the divided reservations.

The term "automatically" as used herein indicates that a prespecified process is executed by the reservation input section 62 or other related sections based on the determination by themselves without requiring any input from the outside including the input section 26, namely without requiring any intervention by a user.

Details of the process for dividing a reservation for non-stop recording and inputting the divided reservations, for instance, the timing for the processing, or the processing executed where the start time or end time reserved for non-stop recording is during a broadcast program are described hereinafter with reference to FIG. 16 to FIG. 23.

The program history managing section 63 acquires meta data for a broadcast program currently being recorded in the HDD 46A or HDD 46B (described as a recorded program hereinafter) via the content/meta data providing section 72A or the content/meta data providing section 72B.

The program history managing section 63 generates, as image data, a table in which titles of programs to be recorded (more accurately, columns each indicating a program to be recorded, and described as a program column hereinafter) are arrayed in an order according to a broadcasting time of each program for each channel, and supplies the table to the information presentation integrated control section 61. An example of the program history is described with reference to FIG. 26.

When the image data for the program history is supplied to the information presentation integrated control section 61 as described above, the information presentation integrated control section 61 makes the output section 27 display an image corresponding to the image data, namely, for instance, the program history shown in FIG. 26.

What should be remarked herein is the following point

That is, in the program history based on the conventional technology, all of broadcast programs broadcasted in the past are shown regardless of whether or not each of the programs is recorded. Therefore, all broadcast programs including those not having been recorded are displayed equally in the program history based on the conventional technology, it is impossible to reproduce all of the displayed broadcast programs. Namely, with the program history in the conventional technology, a user can not determine which broadcast programs have been recorded, and which ones have not been recorded.

In contrast, although the details are described later, with the broadcast program history table generated by the program history managing section 63 (sometimes described as a program history according to the present invention for differentiation from the program history based on the conventional technology), only the programs recorded in the HDD 46A or HDD 46B are displayed, and those not having been recorded are not displayed, and therefore with the program history according to the present invention, all of the displayed broadcast programs can be reproduced. Further, when an area with no broadcast program displayed (without any program column) is long, a user can easily find a desired recorded program only by scrolling the area (by executing a corresponding operation).

As described above, by checking the program history according to the present invention displayed on the output section 27, a user can easily find a desired broadcast program. Further the user can easily perform an operation for selecting and reproducing the broadcast program.

Further details of user's operations and the program history according to the present invention are described hereinafter with reference to FIG. 24 and on.

The program history managing section 63 prepares the program history according to the present invention based on program information for recorded program, so that other program table can be easily generated only by changing a location of a program column included in the program history according to the present invention. Namely, the program history managing section 63 can easily prepare various types of program tables only by changing a positional layout of a program column for recorded programs.

For instance, the program history managing section 63 can classify recorded programs according to preset keywords and based on program information for each of the recorded programs. For instance, the program history managing section 63 can classify the recorded programs to the categories of "News", "Weather", "Music", "Sports", "Information" and the like as shown in FIG. 27. Further the program history managing section 63 can generate a table, in which recorded programs (program column) classified according to corresponding keywords respectively, as a form of image data, and can supply the image data for the table to the information presentation integrated control section 61. The table as described above is described as a keyword-classified program table to differentiate it from the ordinary program history. A specific example of the keyword-classified program table is described hereinafter with reference to FIG. 27.

When the image data for the keyword-classified program table is supplied to the information presentation integrated control section 61, as described above, the information presentation integrated control section 61 has an image corresponding to the image data, namely a keyword-classified program table described hereinafter as shown in FIG. 27 displayed on the output section 27.

In this step, the user can perform the completely same operations as those required when using the ordinary program table described above by making use of the keyword-classified program table. Namely, the user can easily find a desired program by checking the keyword-classified program table displayed on the output section 27, select the program, and reproduce the program.

Details of operations performed by a user and also further details of the keyword-classified program table are described hereinafter with reference to FIG. 24.

As a result of operations by the user as described above, an instruction for reproduction of a specified recorded program is supplied from the input section 26 to the program history managing section 63. The program history managing section 63 acquires the recorded program (or a video capsule including the recorded program) specified by the instruction for reproduction via the content/meta data providing section 72A or the content/meta data providing section 72B from the HDD 46A or HDD 46B and supplies the recorded program to the information presentation integrated control section 61.

Then, as described above, the information presentation integrated control section 61 decodes the recorded program (compressed content data) included in the video capsule by the MPEG system, and supplies the obtained video signal and audio signal to the output section 27. The output section 27 displays a video (moving picture) corresponding to the supplied video signal and also outputs voices and sounds corresponding to the supplied audio signal. Namely, the output section 27 reproduces the recorded program selected by the user.

An example of functional configuration of the main control section 11 was described above. Next, examples of functional configuration of the content recording section 13A and content recording section 13B are described below. Functional configuration of the content recording section 13A is basically the same as that of the content recording section 13B as shown in FIG. 4. In other words, it is not necessary to describe functional configuration of the content recording section 13A and that of the content recording section 13B discretely, functional configurations of the two components are described simply as an example of functional configuration of the content recording section 13. When describing functional configuration of the content recording section 13, the sign "A" or "B" shown in each block of FIG. 4 is omitted.

Namely a recording managing section 71 inputs a reservation for recording (a portion of the process for that purpose) as described above. Namely the recording managing section 71 preserves contents of the reservation for recording notified from the reservation input section 62. As described above, a reservation for recording notified (inputted) from the reservation input section 62 includes, in addition to a reservation for non-stop recording, divided reservations for recording.

Further the recording managing section 71 provides controls for recording a picture into the HDD 46 according to contents of the inputted (preserved) reservation for recording. Namely the recording managing section 71 makes the content acquiring section 45 acquire content broadcasted from a channel specified in the reservation for recording in a time zone specified in the inputted reservation for recording (a time zone identified with the start time, end time, and the day of the week included in the reservation for recording) so that the obtained video capsule is stored in the HDD 46.

With this operation, a video capsule including the content broadcasted from the channel in the time zone specified in the reservation for recording from the channel also specified in the reservation for recording is recorded in the HDD 46. (In this step as described above, only a content may be recorded, or a plurality of contents may be recorded).

The content/meta data providing section 72 acquires program information (meta data) from the HDD 46 for a broadcast program instruction instructed by the reservation input section 62 or by the program history managing section 63 as described above, and supplies the program information to the reservation input section 62.

Further, the content/meta data providing section 72 acquires a video capsule including the recorded program (compressed content data) instructed from the program history managing section 63 from the HDD 46, and supplies the recorded data to the program history managing section 63.

Functional configuration of the content recording/reproducing apparatus 1 was as described above.

The content recording/reproducing apparatus 1 having the functional configuration as described above can set and input a reservation for non-stop recording with the content that "contents broadcasted from a channel specified by a user in a prespecified time zone on a day of the week specified by the user is to be recorded every week".

The user can easily perform an operation for setting a reservation for non-stop recording with the content as described above visually checking the non-stop reservation images as shown in FIG. 8 to FIG. 14.

Further the content recording/reproducing apparatus 1 can divide the inputted reservation for non-stop recording based on program information for each broadcast program and input the divided reservations.

A block for executing the process for dividing a reservation for non-stop recording performed before actual recording is the reservation input section 62 in the description above, but the present invention is not limited to the example described above, and for instance, and the block may be one not shown and provided in the content recording section 13A or in the content recording section 13B. Namely, the configuration is allowable in which the reservation input section 62 inputs a reservation for non-stop recording, and each of the content recording section 13A and content recording section 13B receives necessary information from each of the content/meta data providing section 72A and content/meta data providing section 72B, divides the reservation for non-stop recording, and inputs the divided reservations for discrete programs.

The process for dividing a reservation for non-stop recording performed before actual recording is not always required to be carried out by the content recording/reproducing apparatus 1. Namely also the configuration is allowable in which the content recording/reproducing apparatus 1 once records a picture according to contents of a reservation for non-stop recording in place of the process for dividing the reservation for non-stop recording, and then executes the process for dividing the recorded contents (compressed content data) to discrete broadcast programs (compressed content data) based on program information for each program. Namely the process for dividing recorded contents and the process for dividing a reservation for non-stop recording are equivalent to each other when viewed from a result of processing (contents of each video capsule recorded in the HDD 46).

The post-recording dividing process is described in further details below. Namely, the content recording/reproducing apparatus 1 acquires a prespecified video capsule and program information for a broadcast program expected to be included in the video capsule from the HDD 46A or the HDD 46B. Then the content recording/reproducing apparatus 1 decodes, for instance, compressed content data included in the acquired video capsule, and divides the obtained content data into content data for each broadcast program based on the acquired program information. Further the content recording/reproducing apparatus 1 again encodes the content data for each broadcast program, and has compressed content data for each broadcast program included in new video capsules respectively and recorded in the HDD 46A or the HDD 46B.

Namely, when N broadcast programs (N is a given integral number) are included in the original capsule, the content recording/reproducing apparatus 1 executes the post-recording dividing process described above, when the original video capsule is divided to N video capsules each including one of the N broadcast programs, which are recorded in the HDD 46A or in the HDD 46B.

A block responsible for execution of the post-recording dividing process may be either the main control section 11 or the content recording section 13. To describe the latter case more accurately, the block is the recording managing section 71 or one not shown.

In other words, the content recording/reproducing apparatus 1 is required only to have the recording control functions for making a specified tuner receive broadcasted content identified according to the contents of the reservation for non-stop recording, dividing the broadcasted contents received as described above to one or more broadcast programs, digitalizing the data to include each program in each discrete capsule, and having the one or more video capsules recorded in a specified recording medium such as the HDD 46 shown in FIG. 3 or the like respectively. Further the timing for dividing the recorded contents may be either before or after the broadcasted contents are recorded on the condition that the broadcast programs included in the broadcasted contents identified with the contents of a reservation for non-stop recording are included in different video capsules respectively. Namely, the process for making necessary setting to divide contents to be recorded into discrete broadcast programs before recording is the non-stop recording reservation dividing process described above. On the other hand, the process for dividing recorded contents to discrete broadcast programs after recording is the post-recording dividing process.

Regardless of which of the non-stop recording reservation dividing process and post-recording dividing process is carried out, a user is required to perform simple operations such as that for setting the non-stop recording reservation or the like, and then a plurality of broadcast programs are recorded in different video capsules respectively. Namely, the user is not required to perform repetitive operations for reserving recording of a plurality of broadcast programs, and can perform operations for reservation for recording a plurality of broadcast programs only by carrying out the operation for setting the non-stop recording reservation (or can perform setting operations equivalent to complicated ones required for recording a plurality of broadcast programs in the conventional technology).

Further the content recording/reproducing apparatus 1 having the functional configuration as shown in FIG. 4 can present the recorded programs recorded in the HDD 46A or in the HDD 46B with a format such as a program history or a keyword-classified program table. Because of this feature, a user can easily select and visually check a desired broadcast program among the recorded broadcast programs recorded in the HDD 46A or in the HDD 46B.

An example of the configuration of the content recording/reproducing apparatus 1 was described above with reference to FIG. 1 to FIG. 4.

Next, of the processes carried out by the main control section 11 in the content recording/reproducing apparatus 1, the control process for recording and reproducing content (broadcast program) (described as recording/reproducing process hereinafter) is described below with reference to the flow chart shown in FIG. 5.

As described hereinafter, the main control section 11 can execute, in addition to controls over recording based on a reservation for recording, controls over recording according to direct instructions for recording from the input section 26. It is to be noted that only the control process for recording based on a reservation for recording is shown in the flow chart in FIG. 5.

Figure 5:
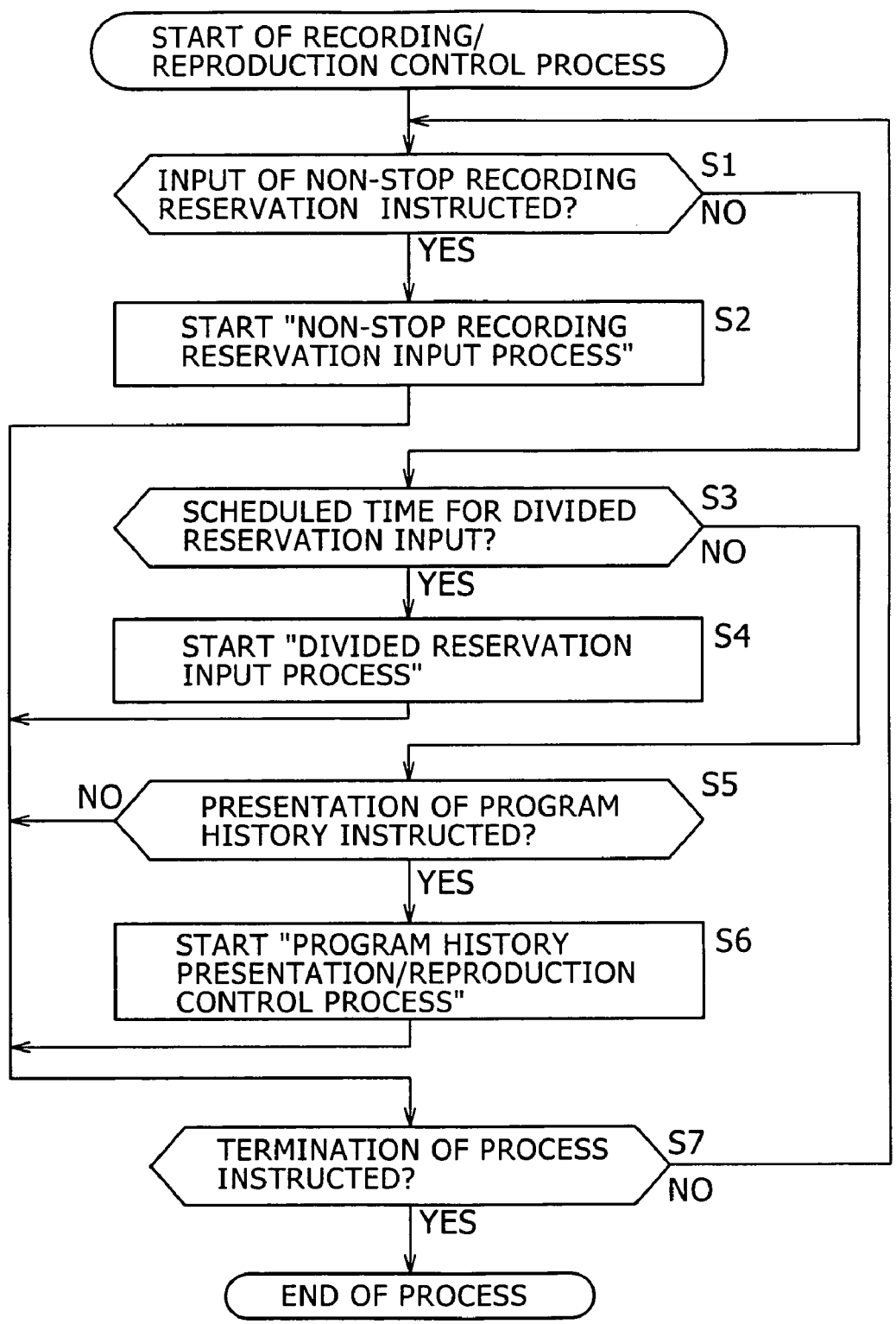
FIG. 5 is a flow chart illustrating an example of "recording/reproducing control process" executed by the content recording/reproducing apparatus shown in FIG. 1.

In step S1 in FIG. 5, the main control section 11 determines whether or not a reservation for non-stop recording has been instructed.

When it is determined that an instruction for a reservation for non-stop recording has been inputted from the input section 26, the main control section 11 determines in step S1 that an input of the reservation for non-stop recording has been instructed. Then in step S2, the main control section 11 starts the process for setting and inputting the non-stop recording reservation (described as a non-stop recording reservation input process hereinafter). Details of this "non-stop recording reservation input process" are described hereinafter with reference to the flow chart shown in FIG. 6 and FIG. 7.

Then the processing is shifted to step S7. In step S7, the main control section 11 determines whether or not an instruction for terminating the process has been issued. When it is determined in step S7 that termination of the process has been instructed, the "recording/reproducing process" is terminated. In contrast, when it is determined in step S7 that termination of the process has not been instructed, the processing step is returned to step S1, and the processing in step 1 and on is repeated.

By the way, when other information different from an instruction for input of a reservation for non-stop recording is inputted from the input section 26, or when no information is inputted from the input section 26, the main control section 11 determines in step S1 that input of a reservation for non-stop recording has not been instructed, and determines in step S3 whether or not the divided reservation input scheduled time has come.

The divided reservation input scheduled time is the timing for executing the process for dividing a next reservation for non-stop recording and inputting the divided reservations (described as divided reservation input process hereinafter), and indicates a prespecified time point before the start time for the next reservation for non-stop recording. For instance, in this embodiment, the divided reservation input scheduled time is one hour before the start time for the next reservation for non-stop recording. More specifically, assuming that the current time is a.m. 6.00, in the example shown in FIG. 18, a reservation for recording from channel A in a time zone from a.m. 8.00 until a.m. 11.00 (a reservation for recording the leftmost program in the gray zone for recording reservation in the figure) is the next non-stop recording reservation. Therefore, a.m. 7.00, one hour before a.m. 8.00 as the start time is the time for inputting the divided reservations.

Therefore, the main control section 11 always monitors the current time, and when the current time has come to the divided reservation input schedule time, the main control section 11 determines in step S3 that the current time is the divided reservation input schedule time. Then in step S4, the main control section 11 starts the "divided reservation input process". Then the process goes to step S7, and the subsequent processing is executed.

Details of this "divided reservation input process" are described hereinafter with reference to the flow chart shown in FIG. 16 and FIG. 17.

In contrast, when the current time is before the divided reservation input schedule time, the main control section 11 determines in step S3 that the current time is till before the divided reservation input scheduled time, and determines in step S5 whether or not presentation of the program history has been instructed.

When it is determined that an instruction for presentation of the program history (or a keyword-classified program table) has been inputted from the input section 26, the main control section 11 determines in step S5 that presentation of a program history has been instructed. Then in step S6, the main control section 11 presents a program history or a keyword-classified program table to a user, and starts the process for providing controls over reproduction of a program to be recorded specified by an instruction from a user who has visually checked the presentation (an instruction from the input section 26 corresponding to the user's instruction) (described as a program history presentation/reproduction control process). Then the process goes to step S7, where the subsequent processes are executed.

Details of the "program history presentation/reproduction control process" are described hereinafter with reference to the flow chart shown in FIG. 24 and FIG. 25.

However, when it is determined in step S5 that presentation of the program history has not been instructed, the process goes to step S7, and the subsequent processes are executed. Namely, when input of a reservation for non-stop recording has not been instructed, the current time is before the divided reservation input schedule time, and presentation of a program history has not been instructed, the processing loop from step S1 to step S7 is repeated.

As described above, the main control section 11 controls the timing for starting each of the "non-stop recording reservation input process", "divided reservation input process" and "program history presentation/reproduction control process" respectively.

In other words, the timing for starting each of the "non-stop recording reservation input process", "divided reservation input process" and "program history presentation/reproduction control process" is controlled with the "recording/reproducing control process", but no specific control is provided for other timing. Namely the "non-stop recording reservation input process", "divided reservation input process" and "program history presentation/reproduction control process" are processes independent from each other.

Details of the "non-stop recording reservation input process", "divided reservation input process" and "program history presentation/reproduction control process" are described below with reference to the related drawings in the order described above.

At first, details of the "non-stop recording reservation input process" are described with reference to the flow charts shown in FIG. 6 and FIG. 7.

Figure 6:
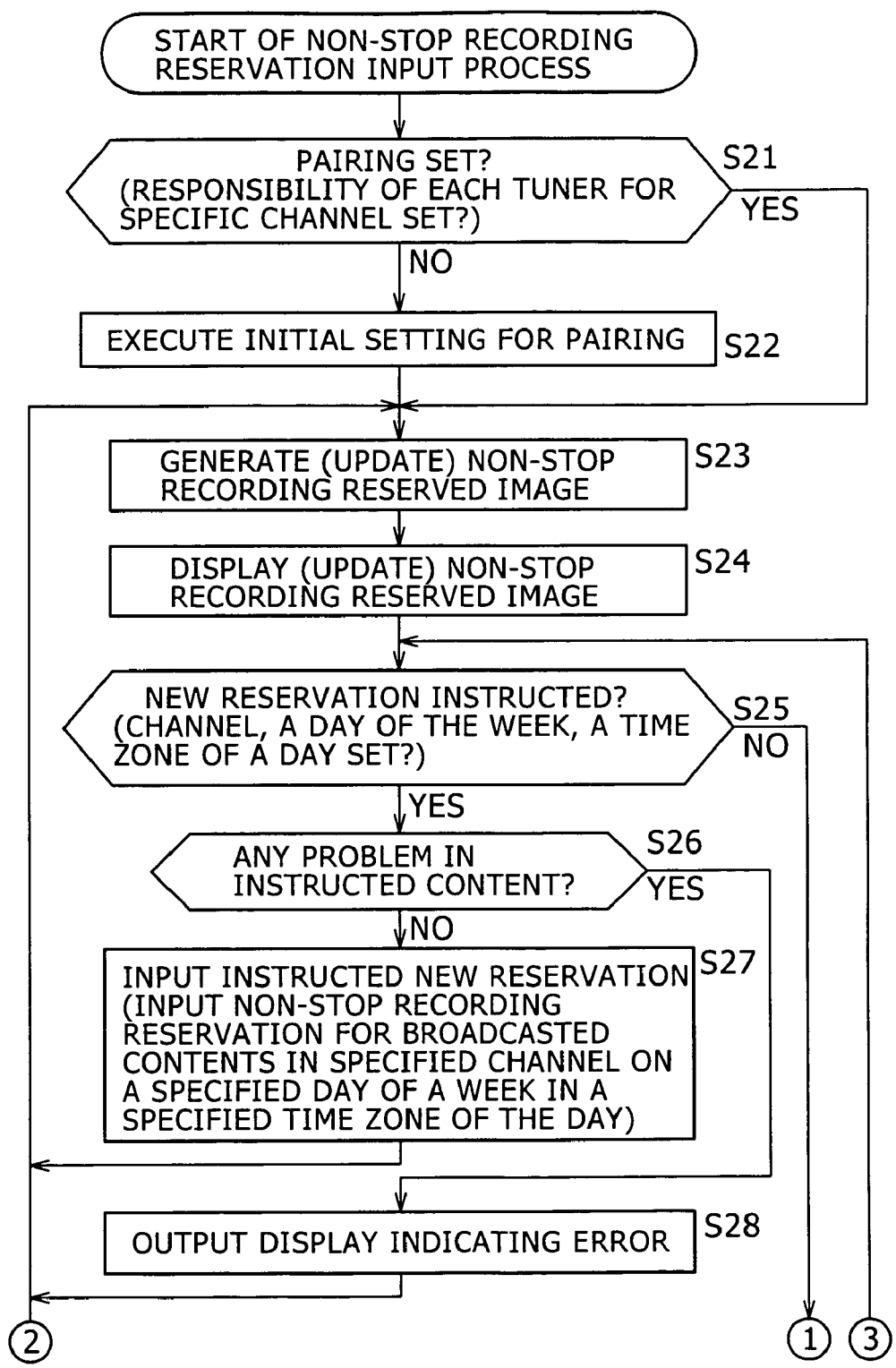
FIGS. 6 and 7 are flow charts illustrating an example of "non-stop recording input process" executed by the content recording/reproducing apparatus shown in FIG. 1.

In step S21 shown in FIG. 6, the reservation input section 62 shown in FIG. 4 determines whether or not setting for pairing has been made.

Pairing as used herein indicates correlating a specified tuner to a specified channel. Namely, pairing indicates specifying a channel responsible for a specified tuner (channel reserved for recording). In a case where setting for paring is made for a specified tuner and as a result of paring the tuner rejects a reservation for recording picture broadcasted from any other channel, the paring is expressed as strong pairing. On the other hand, in a case where setting for paring is made for a specified tuner but the tuner can accept a reservation of recording pictures broadcasted from any other channel, the paring is expressed as weak paring. When the weak paring is made, a channel mainly treated by any specified tuner is expressed herein as priority channel.

For instance, as described above, in this embodiment the content recording/reproducing apparatus 1 is equipped with six tuners. Namely, as shown in FIG. 3, the content recording section 13A is equipped with three tuners 51-1A to 51-3A, and the content recording section 13B is equipped with three tuners 51-1B to 51-3B.

Therefore, according to this embodiment, as a result, in step S21 it is determined whether or not each responsible channel (priority channel in the case where the weak paring is made) of the tuners 51-1A to 51-3A and tuners 51-1B to 51-3B is set.

When it is determined in step S21 that the paring is not set, the reservation input section 62 executes an initial setting for the pairing in step S22. For instance, in this embodiment, each responsible channel (priority channel in the case where the weak paring is made) of the tuners 51-1A to 51-3A and tuners 51-1B to 51-3B is set in step S22. Then the process goes to step S23.

On the contrary, when it is determined in step S21 that the paring has been set, the process of step S22 is not executed, and the process goes to step S23.

In step S23, the reservation input section 62 generates a GUI image for setting a non-stop recording reservation (hereinafter referred to as non-stop recording reserved image) in an image data format and supplies the GUI image to an information presentation integrated control section 61. Then, in step S24, the information presentation integrated control section 61 displays the non-stop recording reserved image on the output section 27.

Figure 8:
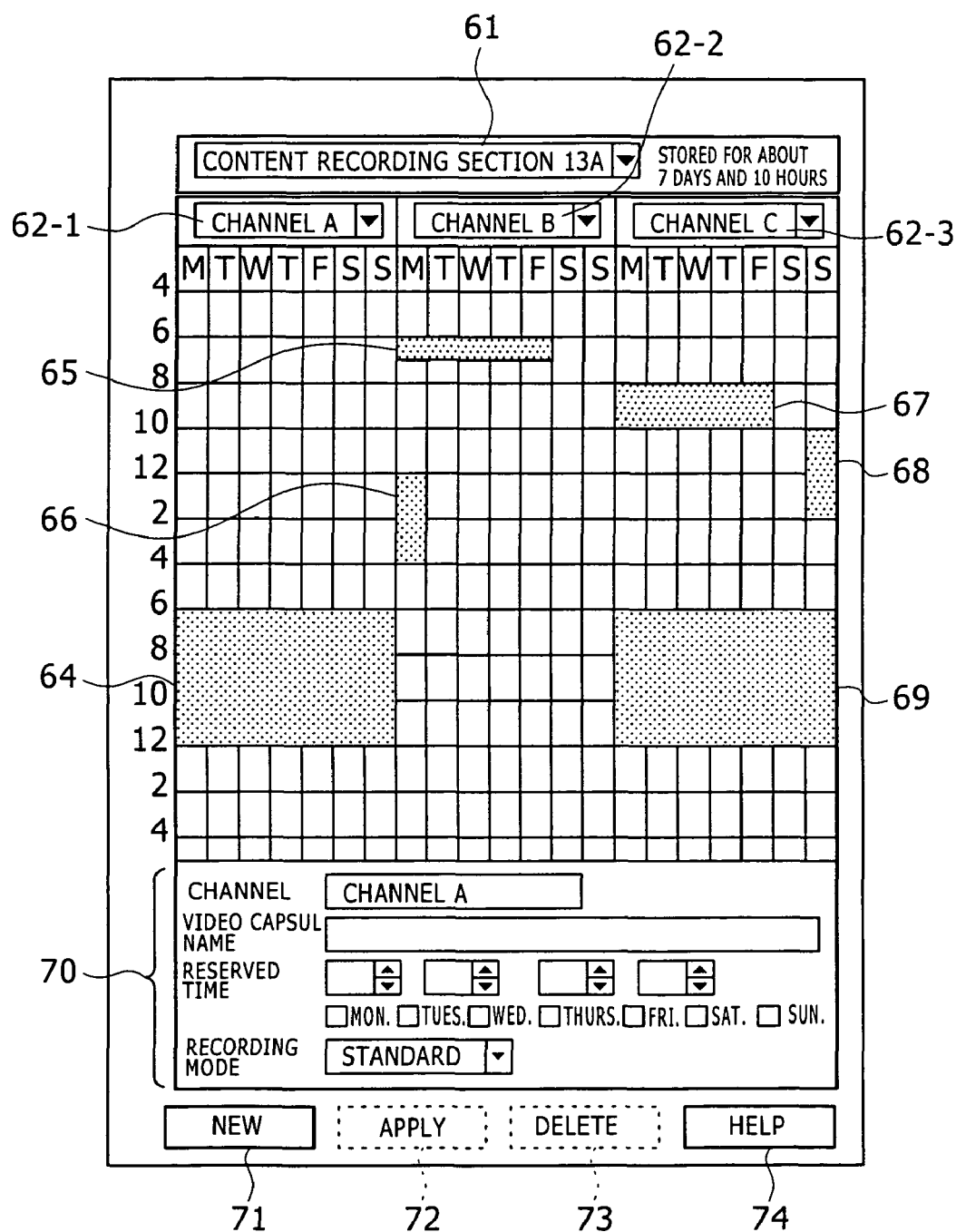
FIG. 8 is a view showing an example of a non-stop recording reserved image used in the "non-stop recording input process" shown in FIG. 6 and FIG. 7.

More specifically, for instance, a non-stop recording reserved image as shown in FIG. 8 is displayed in step S24. Namely, FIG. 8 shows an example of a non-stop recording reserved image used when a strong paring is made.

In the non-stop recording reserved image as shown in FIG. 8, a pull-down menu 61 shown at the top is a menu for selecting a set object from a plurality of content recording sections 13. Namely, according to this embodiment, the pull-down menu 61 is a menu in which either one of the content recording section 13A or the content recording section 13B in FIG. 1 is selected. For instance, in the example shown in FIG. 8, the content recording section 13A is selected as the set object.

Although the pull-down menu 61 indicates "content recording section 13A" in the example shown in FIG. 8, the actual indication shall be a name of the set object (for instance, Odoroku 1234 and the like). This enables a user to clearly recognize the current set object (object selected by the user).

Also, at the time of booting, namely in the first process of step S24 immediately after the "non-stop recording reservation input process" shown in FIG. 6 is started, a prespecified one of the content recording sections 13 is displayed.

At the lower section of the pull-down menu 61, there are provided three pull-down menus 62-1 to 62-3 as menus for selecting a responsible channel. Tuners 51-1 to 51-3 each shown in FIG. 3 as having a current set object (content recording section 13 currently displayed on the pull-down menu 61) correspond to these pull-down menus 62-1 to 62-3 respectively. Therefore, each of the pull-down menus 62-1 to 62-3 becomes a menu for selecting a responsible channel for each of the tuners 51-1 to 51-3.

In an example shown in FIG. 8, display contents for the pull-down menus 62-1 to 62-3 indicates that channel A, channel B, and channel C are set as channels responsible for the tuners 51-1 to 51-3 respectively.

At the time of booting, namely in the first process of step S24 immediately after "non-stop recording reservation input process" shown in FIG. 6 is started, each of the pull-down menus 62-1 to 62-3 displays the description of the pairing set at the current point of time (name of the responsible channel).

At the lower section of the pull-down menu 61-1, a table showing the input condition of the non-stop reservation in regard to the channel displayed in the pull-down menu 62-1, namely the responsible channel of the tuner 51-1 (channel A in the example shown in FIG. 8), is displayed (hereinafter such a time table is referred to as a time table).

As shown in FIG. 8, this timetable allocates days of the week (Monday=M, Tuesday=T, Wednesday=W, Thursday=T, Friday=F, Saturday=S and Sunday=S) in the items in the lateral direction (hereinafter referred to as a lateral axis) and time (4:00 in the morning (=4) or 4:00 in the next morning (=4) of 24 hours, in the example shown in FIG. 8) in the items in the longitudinal direction (hereinafter referred to as a longitudinal axis).

Also, an area 64 with a color (gray in the example shown in FIG. 8) among all the areas constituting this timetable indicates an inputted non-stop recording reservation. Namely, in order to indicate the time zone (including the day of the week) reserved for channel A, the area 64 corresponding to the time zone is displayed in a display state different from that of other areas (each cell specified by the day and time). Namely, for instance, in the example shown in FIG. 8, while other areas are displayed in white, the area 64 is displayed in gray.

This enables a user to easily recognize by looking at the gray area 64 that there is an inputted non-stop recording reservation such as "recording a broadcast content (broadcast program) broadcasted from channel A in the time zone from six p.m. to twelve a.m. from Monday to Saturday every week".

Similarly, at the lower section of the pull-down menu 62-2, a table showing the reserved state of the non-stop recording in regard to the channel displayed in the pull-down menu 62-2, namely the responsible channel of the tuner 51-2 (channel B in the example shown in FIG. 8), is displayed.

Areas 65 and 66 with a color (gray in the example shown in FIG. 8) among all the areas constituting this timetable also indicate inputted non-stop recording reservations. This enables the user to easily recognize by looking at the gray area 65 that there is an inputted non-stop recording reservation such as "recording a broadcast content (broadcast program) broadcasted from channel B in the time zone from 6:00 a.m. to 7:00 p.m. from Monday to Friday every week". Furthermore, the user can easily recognize by looking at the gray area 66 that there is an inputted non-stop recording reservation such as "recording a broadcast content (broadcast program) broadcasted from channel B in the time zone from 12:00 p.m. to 4:00 p.m. every Monday".

Similarly, at the lower section of the pull-down menu 62-3, a table showing the reservation state of the non-stop recording in regard to the channel displayed in the pull-down menu 62-3, namely the responsible channel of the tuner 51-3 (channel C in the example shown in FIG. 8), is displayed.

Areas 67 to 69 with a color (gray in the example shown in FIG. 8) among all the areas constituting this timetable also indicate inputted non-stop recording reservations. This enables the user to easily recognize by looking at the gray areas 67 to 69 that there are inputted non-stop recording reservations such as "recording a broadcast content (broadcast program) broadcasted from channel C in the time zone from 8:00 a.m. to 10:00 a.m. from Monday to Friday every week", "recording a broadcast content (broadcast program) broadcasted from channel C in the time zone from 10:00 a.m. to 2:00 p.m. every Sunday", and "recording a broadcast content (broadcast program) broadcasted from channel C in the time zone from 6:00 p.m. to 12:00 a.m. from Monday to Saturday every week".

In the area 70 at the lower section in each of these three timetables, there are provided input boxes and pull-down menus to execute setting operations (to set a channel, day, time zone, and the like) for a new non-stop recording reservation (hereinafter referred to as a new reservation) and to execute updating operations of details of the inputted non-stop recording reservation (channel, day, time zone, and the like).

At the lower section of the area 70, there are provided four soft buttons 71 to 74.

Hereinafter, each of the soft buttons 71 to 74 is referred to as new button 71, application button 72, delete button 73, and help button 74 using the characters described therein respectively. Other soft buttons are called in the same manner hereafter.

In the drawings shown in FIG. 8 and on, soft buttons drawn with dotted line (application button 72 and delete button 73 in the example shown in FIG. 8) indicate that the buttons are not operable by pressing at the current point of time.

Other details of the area 70 and the new button 71 through help button 74 will be described hereinafter.

Returning to FIG. 6, when the non-stop recording reserved image explained above is displayed in step S24, the reservation input section 62 determines whether or not a new reservation order (to set a channel, day, time zone, and the like) is made in step S25. A specific example of the way to order the new reservation (operation method) will be described with reference to FIGS. 9 to 12.

Figure 7:
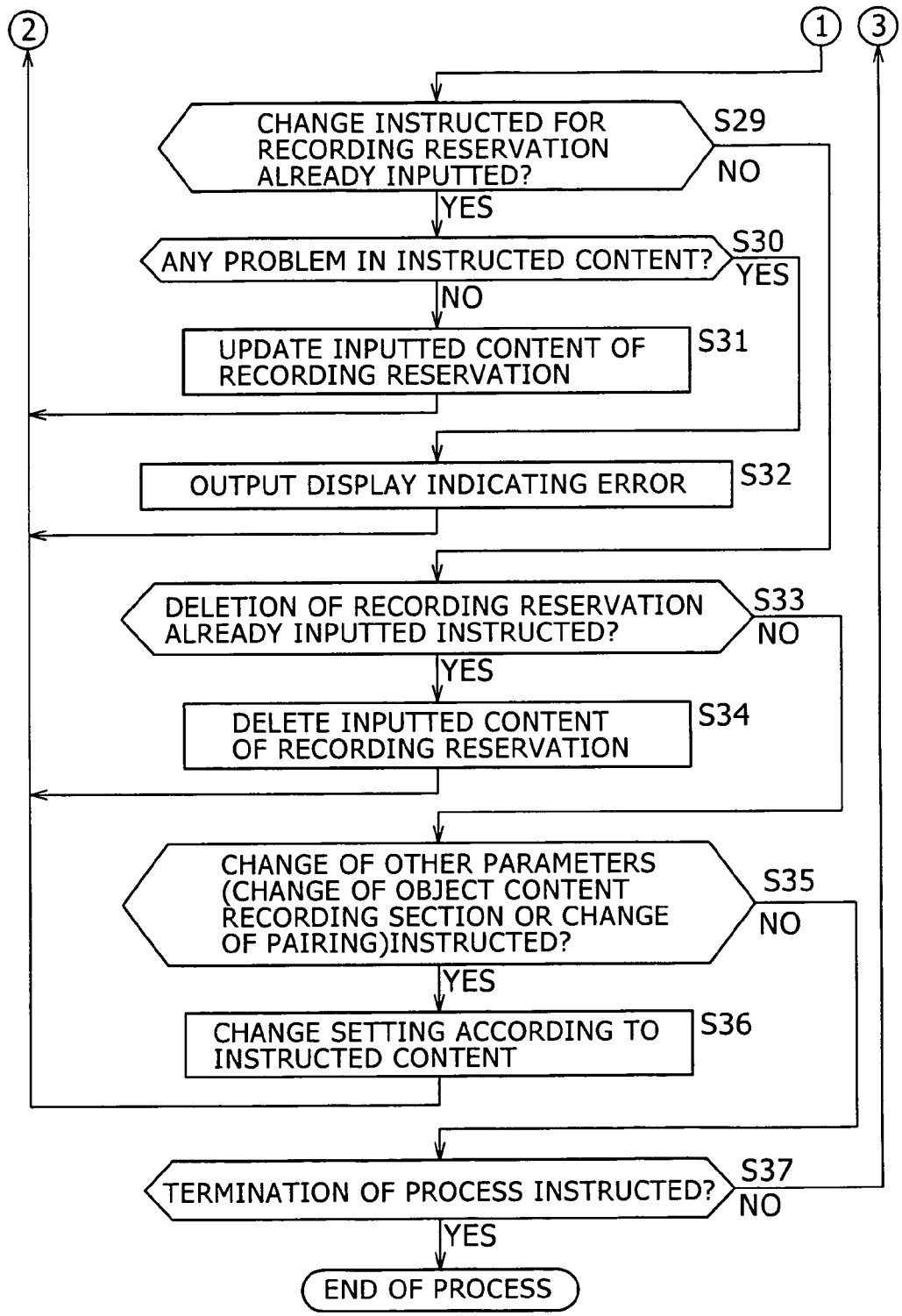

When it is determined in step S25 that a new reservation has not been made, the process goes to step S29 in FIG. 7. The processes in step S29 and on are to be described hereinafter.

On the other hand, when it is determined in step S25 that a new reservation has been made, the reservation input section 62 determines whether or not the order involves any problem in step S26.

Namely, the reservation input section 62 checks the consistency of the instructed items (setting information of a channel, day, time zone, and the like) and shortage of the inputted information, and determines that the order involves a problem when there is even one defect among these check results, at step S26. Then, the reservation input section 62 executes a prespecified error output operation from the output section 27 through the information presentation integrated control section 61 at step S28. After that, the process is returned to step S23, and the subsequent processes are repeated.

Also, the reservation input section 62 checks whether or not the new reservation overlaps another inputted recording reservation, and if the result indicates that at least a part of the new reservation overlaps at least a part of another inputted recording reservation, it is determined in step S26 that the order involves a problem, and a prespecified error output operation is implemented in step S28. After that, the process returns to step S23, and the subsequent processes are repeated.

On the contrary, when the results of all the checks described above are normal, the reservation input section 62 determines in step S26 that the order does not involve any problem, and inputs the specified new reservation in step S27. Namely, the reservation input section 62 inputs the non-stop recording reservation of the broadcast program from the specified broadcast station in the specified time zone of the specified day.

After that, the process returns to step S23, and the subsequent processes are repeated. Namely, in the current case, the gray area indicating the new reservation is added to the corresponding time table, and a non-stop recording reserved image including the timetable is generated (updated) to be displayed in the output section 27.

Now, with reference to FIGS. 8 to 13, an example of a method of ordering a new reservation (operation method) and an example of the process in FIG. 6 corresponding thereto, namely, a series of processes implemented in the order of steps S25 (YES), S26 (NO), S27, S23, and S 24 are described.

An operation for the non-stop recording reserved image in FIG. 8 is explained with reference to a case where the mouse is used in the input section 26 in FIG. 4, for the simplicity of the explanation. Naturally, a user can order a new reservation with the operation exactly the same as (or similar to) the operation explained below, even when using any other input device in the input section 26 such as a remote controller.

For instance, suppose the user places a mouse pointer of the mouse (not shown) on a new button 71 and clicks the button in the state where the non-stop recording reserved image in FIG. 8 is displayed on the output section 27. Namely, suppose the new button 71 is pressed down. In this case, in the area 70, a name of a channel currently selected is indicated in a box on the right side of the indication of "channel", and other boxes and pull-down menus are blank.

There is no specific restriction over a method of selecting a channel, but in this case, the following method is selected. Namely, in the selected method, the user moves the mouse pointer, and locates a position in the timetable corresponding to the desired channel, namely the timetable at the lower section of the pull-down menu indicating the desired channel among the pull-down menus 62-1 to 62-3, and to click the mouse.

More specifically, for instance, though not shown in figures, if the mouse pointer is placed in the timetable at the lower section of the pull-down menu 62-1 and is clicked thereon, it is regarded that channel A is selected. In this case, display of the area 70 is as shown in FIG. 9.

The process, after the new button 71 is pressed down until the non-stop recording reserved image including an image in FIG. 9, corresponds to a series of processes executed in the order of steps S35 (YES) in FIG. 7, S36, S23, and S24 in FIG. 6, as described hereinafter.

Figure 9:
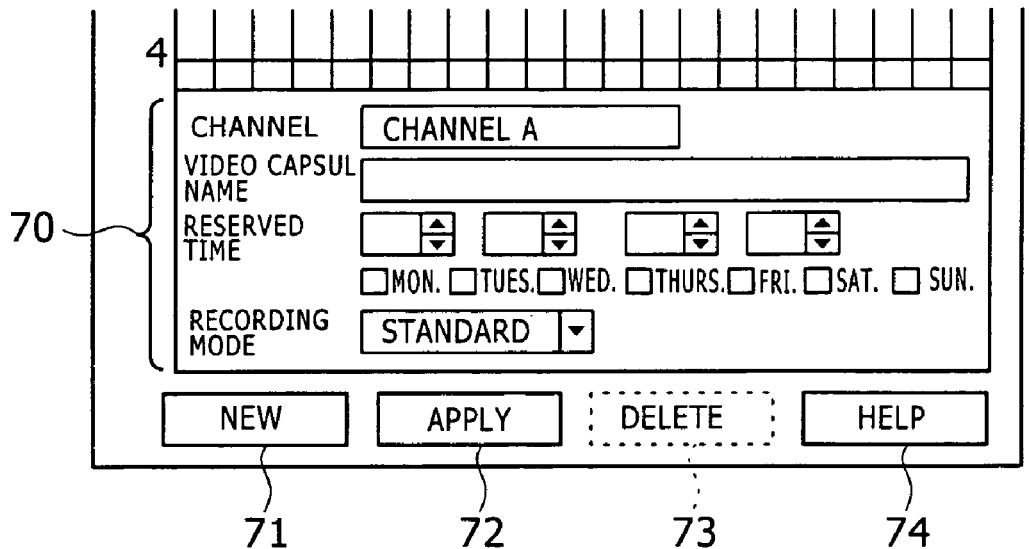
FIGS. 9 to 12 are views illustrating an example of an operation for setting non-stop recording reservation by making use of the non-stop recording reserved image shown in FIG. 8.

In the state where the non-stop recording reserved image including an image in FIG. 9 is displayed, the user can specify "time zone (start time and end time)" of the new reservation by using the pull-down menu on the right of an indication of "reservation time" in the area 70, namely by executing the corresponding operation with a mouse. The user can also specify "day of the week" of the new reservation by using a box on the left of each indications of "month" to "day" in the lower section of these pull-down menus, namely by executing the corresponding operation with a mouse. The user can also specify "recording mode" by using the pull-down menu on the right of an indication of "recording mode" in the lower section of the boxes, namely by executing the corresponding operation with a mouse. The recording mode means herein a mode to specify image qualities and sound qualities such as, for instance, standard mode and long-time mode.

The user can also specify (update) "channel" of the new prescription by clicking after moving the mouse pointer into a timetable corresponding to a desired channel as described above.

Figure 10:
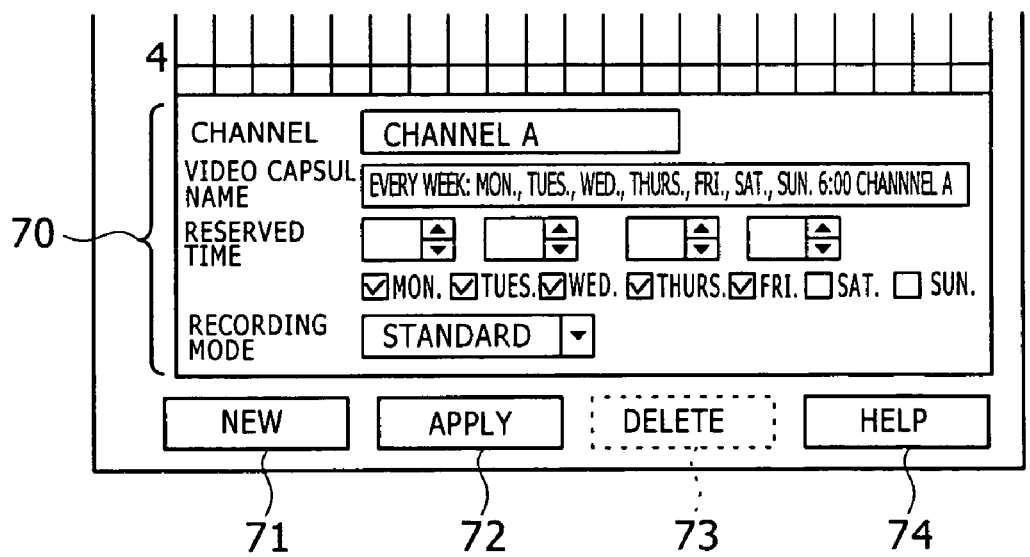

More specifically, for example, suppose the user now desires to specify (input) a new reservation to "record broadcast contents (broadcast program) broadcasted from channel A in the time zone from 6:00 a.m. to 11:00 a.m. from Monday to Friday every week". In this case, the user inputs necessary information in each box and pull-down menu in the area 70 by operating the mouse. When input of the information is completed, for instance, the area 70 provides a display as shown in FIG. 10.

In a box on the right of an indication of "video capsule name" in the area 70, descriptions of the new reservation are displayed automatically (generated by the reservation input section 62). This indication becomes a name of the video capsule to be recorded according to the descriptions of the new reservation. Naturally, the user can change description of the input in the box, namely a name of the video capsule.

After that, when the application button 72 is pressed down, the reservation input section 62 determines that the new reservation was instructed in step S25 shown in FIG. 6, and recognizes the description in the area 70 as formally specified information.

Then, when the reservation input section 62 determines that there is no problem with the specified information as recognized, namely when it is determined that the specified contents have no problem in step S26 in FIG. 6, the specified new reservation is inputted in step S27. Then, in step S23, the reservation input section 62 generates the non-stop recording reserved image (data) with additional gray color indicating a new reservation, namely, updates the non-stop recording reserved image as shown in FIG. 11.

Figure 11:
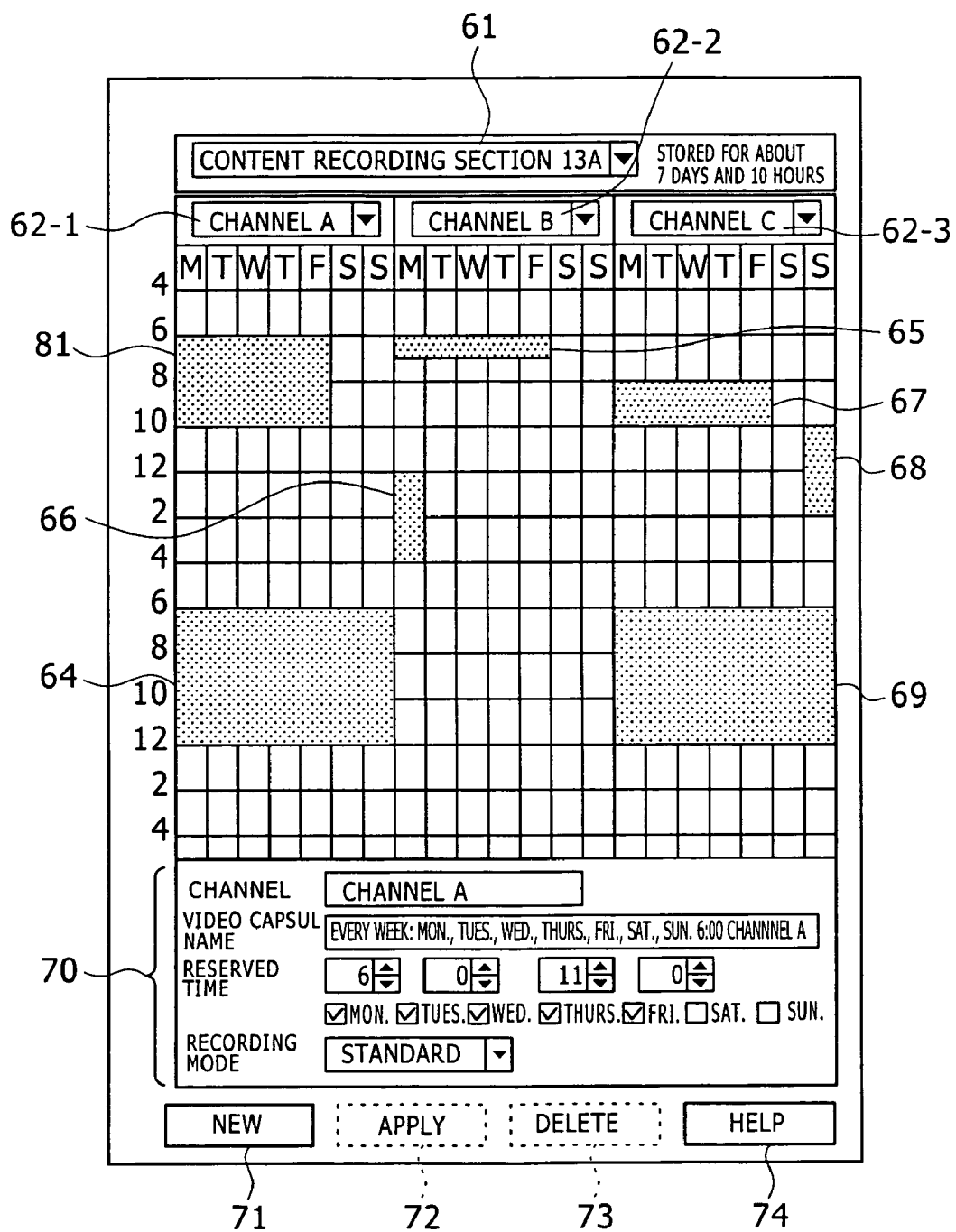

When supplied to the information presentation integrated control section 61, the non-stop recording reserved image as shown in FIG. 11 is displayed in the output section 27 by the process of step S24 in FIG. 6.

The non-stop recording reserved image in FIG. 11 indicates that a new gray area 81 indicating the contents of the new reservation has been added to the timetable in the lower section of the pull-down menu 62-1. Therefore, the user can easily check the contents of the new reservation visually by looking at the new gray area 81. Namely, the user can easily recognize that there has been inputted (specified) a non-stop recording reservation such as "recording a broadcast content (broadcast program) broadcasted from channel A in the time zone from 6:00 a.m. to 10:00 a.m. from Monday to Friday every week".

With reference to FIGS. 9 to 11, as an example of the ordering method (operation method) of a new reservation, a method in which "after pressing down the new button 71, each item is inputted in the area 70 and the application button 72 is pressed" was described above.

Figure 12:
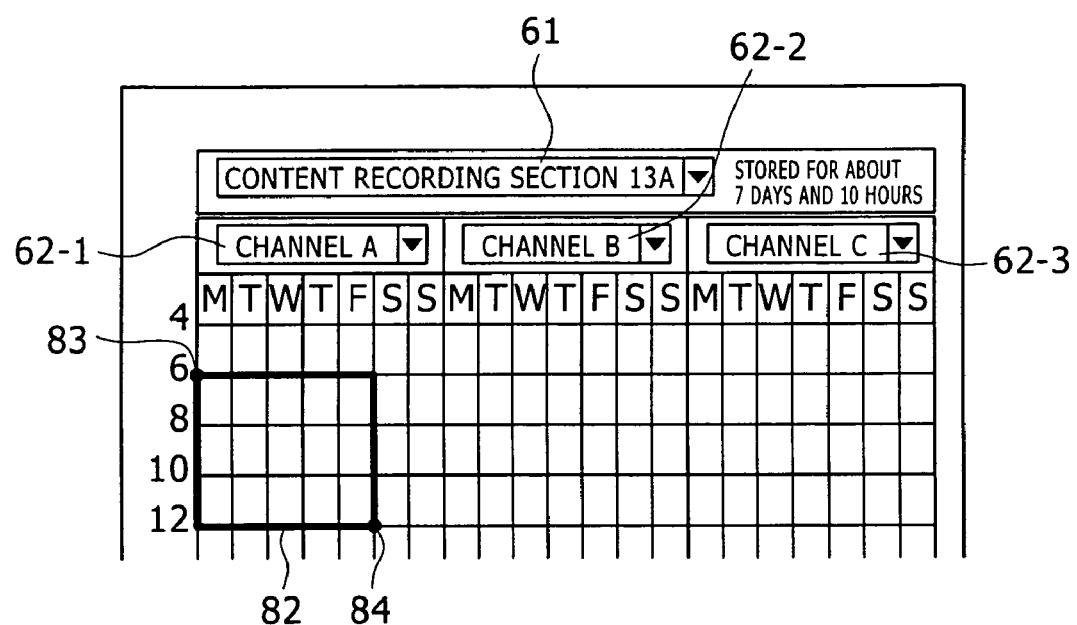

However, the method of ordering a new reservation is not limited to this example but various ordering methods may be employed. More specifically, for instance, such a method as "to order a new reservation by dragging a mouse in the timetable, generating (displaying) a frame (square rubber band) 82 shown in FIG. 12, then dropping the mouse" as if drawing a square shape with a graphic editor, may also be employed. Namely, FIG. 12 illustrates another example of ordering a new reservation.

In this case, each of the day including a dragging start point 83 (Monday in the example shown in FIG. 12) and the time of the start point 83 (6:00 a.m. in the example shown in FIG. 12) is reflected in each of the setting of "a day of the week" of the new reservation (setting indicating a day of the week for recording, and referred to as weekly setting as needed hereinafter) and the setting of "start time" respectively. Also, each of a day of the week including a bottom right dragging point 84 (Friday in the example shown in FIG. 12) and the time of the point 84 12:00 a.m. in the example shown in FIG. 12) is reflected in each of the weekly setting and "finish time" respectively.

Although not shown in figures, when the dragging point 84 reaches a gray area indicating another inputted non-stop recording reservation, the frame (square rubber band) 82 cannot expand any more.

Also, contents indicated in the frame (square rubber band) 82 formed at the time of dropping operation will be inputted as a new reservation.

More specifically, for instance, suppose the dropping operation is executed in the state as shown in FIG. 12. In this case, 6:00 a.m. indicated by the dragging start point 83 is set as "start time", 12:00 a.m. indicated by the bottom right point 84 of the drag is set as "finish time", and the range from Monday including the dragging start point 83 to Friday including the bottom right point 84 of the drag is set as "a day of the week" (as weekly setting). Namely, there is inputted a non-stop recording reservation such as "recording a broadcast content (broadcast program) broadcasted from channel A in the time zone surrounded by the frame 82, or from 6:00 a.m. to 12:00 a.m. from Monday to Friday every week". As a result, though not shown in figures, a gray area indicating the inputted non-stop recording reservation is displayed. Namely, the area corresponding to the frame 82 is indicated in gray.

By the way, though not shown in figures, in this embodiment, for instance, when a mouse pointer is placed on any of the gray areas indicating the inputted non-stop recording reservation (for instance, in the example shown in FIG. 11, areas 64 to 69 and 81) and a clicking operation is executed, contents of the non-stop recording reservation indicated by the gray area located by the mouse pointer is shown in the area 70, and at the same time, a pressing operation of the delete button 73 becomes possible.

Namely, when the user wants to update the contents of the inputted non-stop recording reservation or to delete the non-stop recording reservation, the user has only to place the mouse pointer on the gray area indicating the non-stop recording reservation and execute the clicking operation. And when the user wants to update the contents of the non-stop recording reservation, the user has only to update the contents indicated in the area 70, and when the user wants to delete the non-stop recording reservation, the user has only to press down the delete button 73.

The process corresponding to updating operation and deleting operation of the contents of such an inputted non-stop recording reservation is shown in the flow chart in FIG. 7 of "non-stop recording reservation input process". Now, returning to FIG. 7, the process shown in FIG. 7 of the "non-stop recording reservation input process" is described below.

As described above, when it is determined in step S25 in FIG. 6 that a new reservation is not instructed, the process proceeds to step S29 in FIG. 7.

In step S29, the reservation input section 62 shown in FIG. 4 determines whether or not change of the inputted recording reservation has been instructed.

For instance, as described above, when at least a part of the contents (items) of the corresponding non-stop recording reservation is changed after a mouse pointer is placed on any of the gray areas indicating the inputted non-stop recording reservation (for instance, in the example shown in FIG. 11, areas 64 to 69 and 81) and a clicking operation is executed, it is determined that change of the inputted recording reservation has been instructed in step S29, and the process proceeds to step S30.

Otherwise, also when the operation as described above with reference to FIG. 12 is executed, namely when the size of the square rubber band (frame 82 in the example shown in FIG. 12) is changed to a different size from that of the gray area dragged by a mouse and dropping operation is executed, it is determined in step S29 that change of the inputted recording reservation has been instructed, and the process proceeds to step S30.

In step S30, the reservation input section 62 determines whether order involves any problem or not.

Namely, the reservation input section 62 performs same checks as performed in step S26 described with reference to FIG. 6, and if any of the checked results present a defect, it is determined in step S30 that the order involves a problem, and a prespecified error output is executed from the output section 27 through the information presentation integrated control section 61 in step S32. After, that, the process is returned to step S23 in FIG. 6, and subsequent processes are repeated.

On the contrary, if the results of all the checks described above are normal, the reservation input section 62 determines in step S30 that the order does not involve any problem, and updates the inputted contents of the recording reservation in step S31. Namely, the reservation input section 62 notifies recording control section 71A or the recording control section 71B of the change instructed in step S29. The recording control section 71A or the recording control section 71B then updates and stores the contents of the non-stop recording reservation.

Then, the process is returned to step S23 in FIG. 6, and the subsequent processes are repeated. Namely, in this case, the size of the gray area is updated according to the revised non-stop recording reservation, and the non-stop recording reserved image including the updated gray area is generated (updated) and displayed on the output section 27.

By the way, when it is determined in step S29 described above that the change of the inputted recording reservation has not been instructed, the process proceeds to step S33.

In step S33, the reservation input section 62 determines whether or not deletion of the inputted recording reservation has been instructed.

For instance, as described above, when the delete button 73 is pressed down after a mouse pointer is placed on any of the gray areas indicating the inputted non-stop recording reservation (for instance, in the example shown in FIG. 11, areas 64 to 69 and 81) and a clicking operation is executed, it is determined in step S33 that deletion of the inputted recording reservation has been instructed, and the process proceeds to step S34.

Otherwise, also when the operation as described above with reference to FIG. 12 is executed, namely when the dragging operation is executed to match the point lower right to the drop (point 84 in an example shown in FIG. 12) with the start point (point 83 in the example shown in FIG. 12), and the dropping operation is executed after the square rubber band (frame 82 in the example shown in FIG. 12) is consequently deleted, it is determined that deletion of the inputted recording reservation has been instructed in step S33, and the process proceeds to step S34.

In step S34, the reservation input section 62 deletes inputted contents of the recording reservation. Namely, the reservation input section 62 notifies the recording control section 71A or the recording control section 71B of an order of deleting the corresponding non-stop recording reservation. The recording control section 71A or the recording control section 71B then deletes the contents of the non-stop recording reservation as instructed.

After that, the process is returned to step S23 in FIG. 6, and the subsequent processes are repeated. Namely, in this case, the gray area corresponding to the deleted non-stop recording reservation is also deleted, and a non-stop recording reserved image reflecting the result of the deletion is generated (updated) and displayed on the output section 27.

In step S33 described above, in a case where it is determined that an instruction for deleting the inputted reservation for recording has not been made, the process goes to step S35.

In step S35, the reservation input section 62 determines whether or not an instruction for changing for any other settings has been made.

In a case where, for instance, the user changes the content recording section 13 required to be set using pull-down menu 61 shown in FIG. 11, or setting for the pairing (namely, setting for the responsible channel) using any of the pull-down menus 62-1 to 62-3, the reservation input section 62 determines that change for setting has been instructed in step S35, and the process proceeds to step S36.

In step S36, the reservation input section 62 executes change for setting based on the instruction, returns the process to step S23, and repeats the subsequent processes. Namely a non-stop recording reserved image is regenerated (updated) based on the change for setting and displayed on the output section 27.

On the contrary, in a case where it is determined in step S35 that other change for setting has not been instructed, the reservation input section 62 determines in step S37 whether or not termination of the process has been instructed. In step S37, when it is determined that termination of the process has not been instructed yet, the process returns to step S25 shown in FIG. 6 and the subsequent processes are repeated. On the other hand, when it is determined in step S37 that termination of processing has been instructed, the "non-stop recording reservation input process" is terminated.

The "non-stop recording reservation input process" using the non-stop recording reserved images shown in FIGS. 8 to 12 was described above with reference to flow charts in FIG. 6 and FIG. 7.

However description of a help button 74 at the upper right section of the delete button 73 is omitted herefrom because the help button 74 is not used in the example of the "non-stop recording reservation input process" above described. The help button 74 is a soft button for displaying the help menu, as the name indicates itself.

The non-stop recording reserved image used in the "non-stop recording reservation input process" is not limited to the examples shown in FIGS. 8 to 12 and various images may be used.

More specifically, it is assumed as described above that the strong pairing is made in the examples of the non-stop recording reserved input images shown in FIGS. 8 to 12. Namely, only one channel is allocated to a tuner in the examples of the inputted non-stop recording reserved images in FIGS. 8 to 12.

Figure 13:
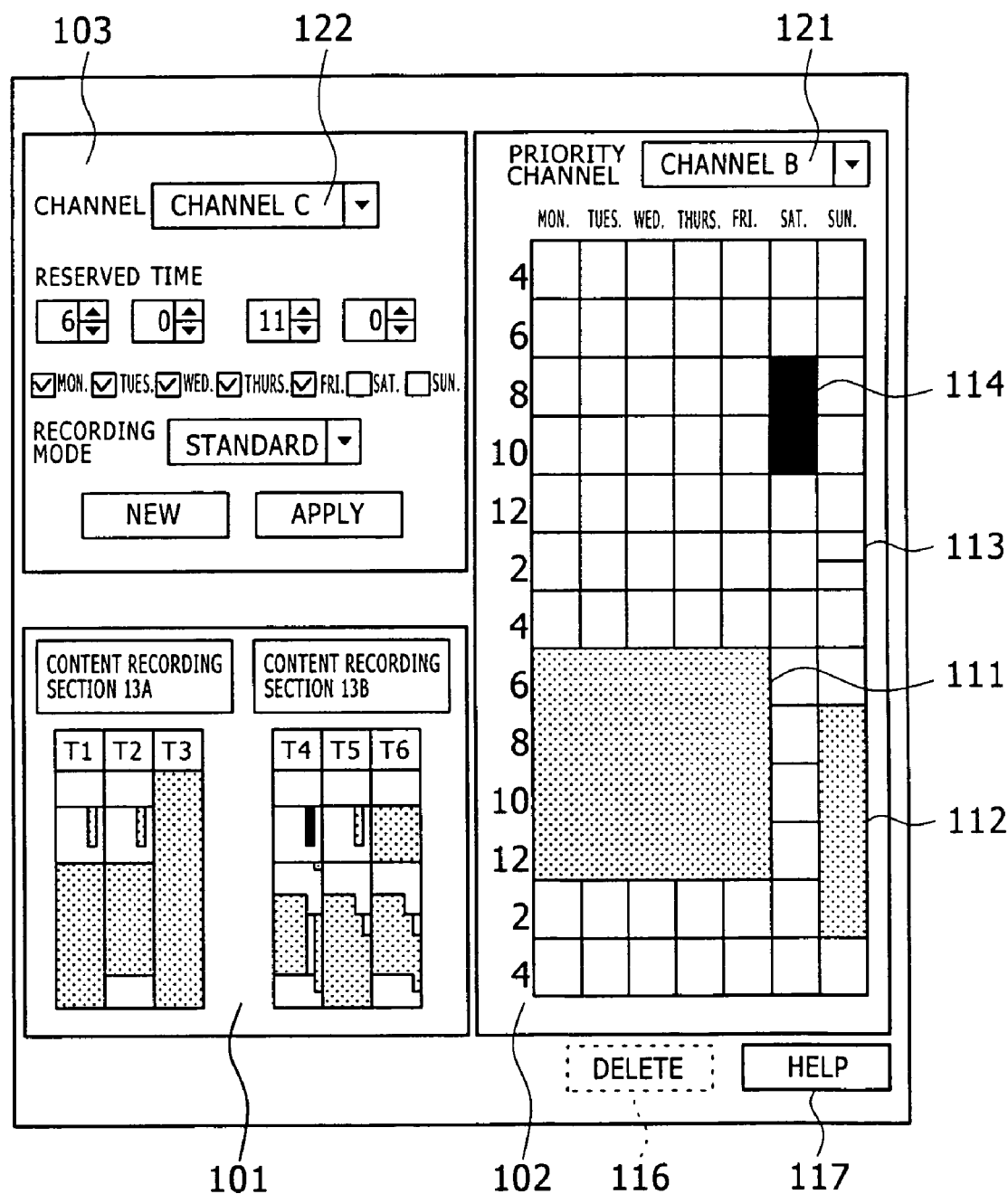
FIG. 13 is a view showing another example of a non-stop recording reserved image used in the "non-stop recording reservation input process" shown in FIG. 6 and FIG. 7.

By using the non-stop recording reserved input image shown in FIG. 13 or the like, the weak pairing can be made. Namely FIG. 13 shows an example of the non-stop recording reserved input image capable of making the weak pairing.

In the example shown in FIG. 13, the non-stop recording reserved input image includes areas 101 to 103.

The area 101 displays an outline of the input state for the non-stop recording reservation to each of the content recording section 13A and 13B shown in FIG. 1. Namely the area 101 displays names and outlines of the time table in the content recording section 13A and 13B. In FIG. 13, T1 to T6 correspond to the tuners 51-1A to 51-3A and the tuners 51-1B to 51-3B in FIG. 3 respectively. In other words, with the example in FIG. 13, time tables for the tuners 51-1A to 51-3A and the tuners 51-1B to 51-3B are shown under the descriptions for T1 to T6

For instance, when the user places the mouse pointer within a time table for a desired tuner in the area 101 and clicks the mouse on the time table, details of time table indicated by the pointer are displayed in the area 102.

In the area 102, the pull-down menu 121 on the right of the display of "priority channel" is used for selecting a priority channel for a targeted tuner. In the example shown in FIG. 13, it is understood that the channel B has been set as the priority channel for the target tuner. On start-up, namely in step S24 which is the first step immediately after the "non-stop recording reservation input process" shown in FIG. 6 is started, details of pairing to be set at the point of time (a name of the priority channel) is displayed on the pull-down menu 121.

Details of the time table indicating the input state for the non-stop recording reservation are displayed under the pull-down menu 121.

It is described hereinabove that the time table in FIG. 8 indicates the input state for a non-stop recording reservation for a target channel, while the time table shown in FIG. 13 indicates the input state for a non-stop recording reservation for a target tuner. For, as described above, the non-stop recording reserved input image of the example shown in FIG. 8, images of strong pairing are assumed, while the non-stop recording reserved input image of the example shown in FIG. 13, images of weak pairing are assumed. In other words, in the example of FIG. 8, a tuner corresponds to a channel one by one, while in the example of FIG. 13, a tuner does not necessarily correspond to a channel one by one.

More specifically, of all areas constituting the time table in the area 102 in FIG. 13, areas 111 to 113 identified with a first color (pale gray in FIG. 13) indicate the inputted non-stop recording reservation for the priority channel.

On the contrary, an area 114 identified with a second color (dark gray in FIG. 13) indicates the inputted non-stop recording reservation for any other channel than the priority channel.

In order to realize such weak pairing, namely to realize to input a non-stop recording reservation for a plurality of channels with one tuner, the area 103 including the pull-down menu 122 is provided with the non-stop reserved image shown in FIG. 13.

Namely the area 103 corresponds to the area 70 shown in FIG. 8, and this area is used for inputting or displaying contents (item) of the non-stop recording reservation to be inputted. The area 103 is provided with the pull-down menu 122 capable of selecting any channels including the priority channel to realize the weak pairing. In the example shown in FIG. 13, for instance, as shown by the displayed content of the pull-down menu 121, channel B is selected as the priority channel, however as shown by the displayed content of the pull-down menu 122, channel C which is not the priority channel, is set. As described above, in the pull-down menu 122, the user can select a channel other than the priority channel.

Figure 14:
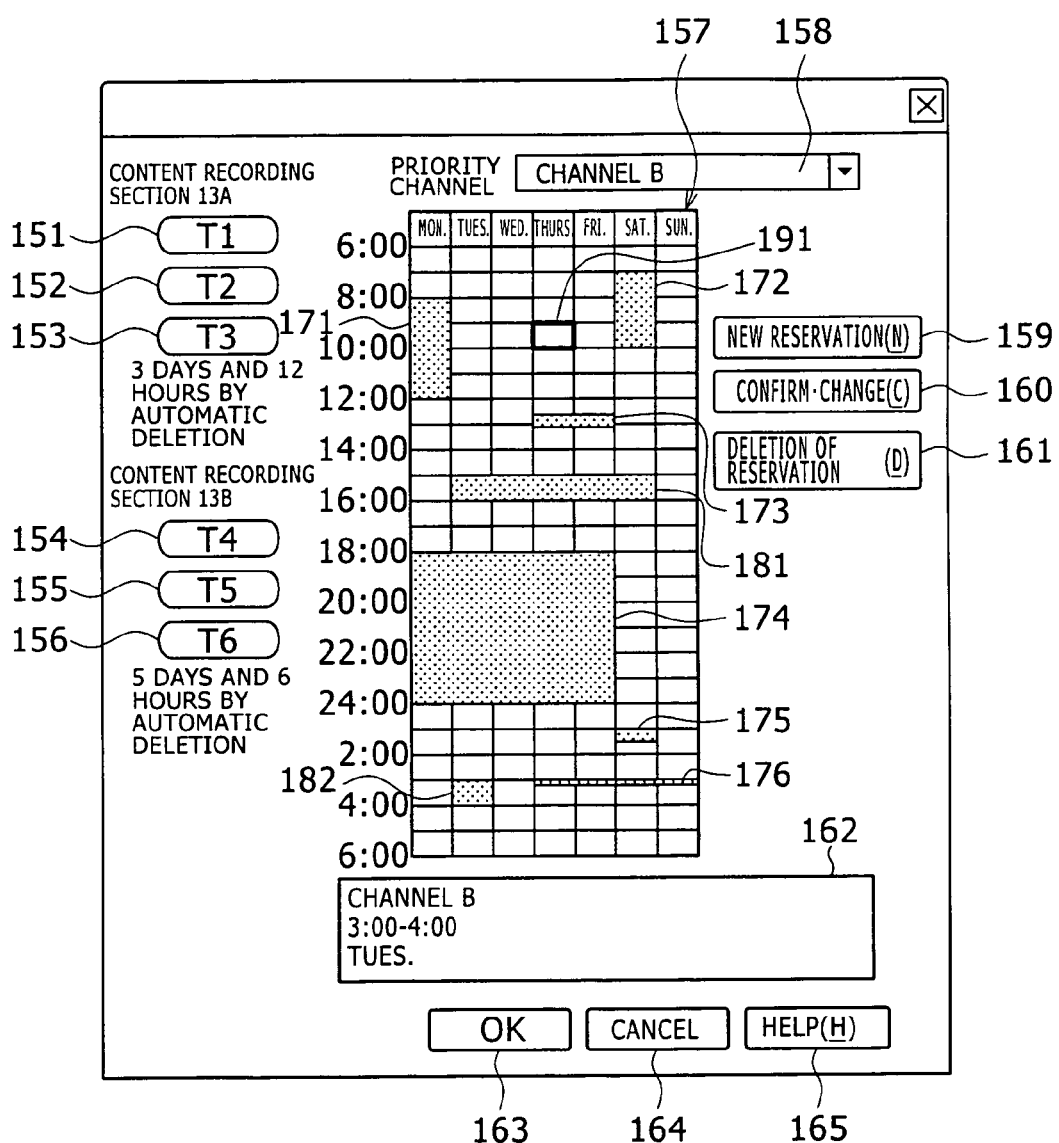
FIG. 14 is a view showing still another example of a non-stop recording reserved image used in the "non-stop recording reservation input process" shown in FIG. 6 and FIG. 7.

The image shown in FIG. 13 is described above as an example of the non-stop reserved input image capable of realizing the weak pairing. It is possible to use other images as shown in FIG. 14 or FIG. 15 as an example of the non-stop reserved input image capable of realizing the weak pairing. In other words, FIG. 14 or FIG. 15 indicates another example of the non-stop reserved input image.

In the non-stop reserved input image shown in FIG. 14, soft buttons 151 to 156 are allocated to the tuners 51-1A to 51-3A shown in FIG. 3 and mounted on the content recording section 13A in FIG. 1 and the tuners 51-1B to 51-3B shown in FIG. 3 and mounted on the content recording section 13B in FIG. 1 respectively. Therefore the user can select a desired tuner by clicking the soft button corresponding to the desired tuner from the soft buttons 151 to 156 with a mouse operation.

In a case where the soft button 151 is pressed, as shown in FIG. 14, the color of the soft button 151 is changed and simultaneously a time table 157 concerning the tuner 51-1A allocated in the soft button 151 is displayed on the right side of the soft button 151.

Of the time table 157, areas 171 to 176 shown with the first color (pale gray in FIG. 14) indicate the inputted non-stop recording reservation for the priority channel.

On the other hand, areas 181 and 182 shown with the second color (dark gray in FIG. 14) indicate the non-stop recording reservation to be set for a channel other than the priority channel.

A frame 191 is described hereinafter.

A pull-down menu 158 above the time table 157 and on the right of the display of "Priority channel" is used for selecting the priority channel for the target tuner (in this case, the tuner 51-1A) like the pull down menu 121 shown in FIG. 13.

A new reservation button 159 to a reservation delete button 161 is provided under the pull-down menu 158 and on the right of the time table 157.

The new reservation button 159 corresponds to the new button 71 shown in FIG. 8. Namely the user pushes down the new reservation button 159 to make an instruction for a new reservation.

Then an image (dialog) shown in FIG. 15 is displayed. However nothing is actually displayed within each box or pull-down menu in the image. The user enters desirable information within each box or pull-down menu as an instruction for the new reservation.

As this image in FIG. 15 corresponds to the area 103 shown in FIG. 13 described above, details thereof are omitted herefrom and only the differences from the area 103 shown in FIG. 13 are described below.

In the example shown in FIG. 13, the start time and the end time are set each as the reservation time, but in the example shown in FIG. 15, the start time (recording start time shown in FIG. 15) and the end time (recording end time shown in FIG. 15) are set separately.

An OK button shown in FIG. 15 corresponds to the application button shown in FIG. 13. Therefore, when the OK button is pressed, contents displayed within each box or pull-down menu above the OK button are fixed, and the non-stop recording reservation with the confirmed contents is inputted. In the example shown in FIG. 15, for instance, a non-stop recording reservation with the contents of "to record contents broadcasted from the channel A in the time zone from 9:00 a.m. until 10:00 a.m. on Monday" is inputted.

Further, a cancel button shown in FIG. 15 is used for deleting inputted contents displayed within each box or pull-down menu above the cancel button. A help button shown in FIG. 15 corresponds to the help button 117 shown in FIG. 13.

The user can make an instruction for new reservation by selecting one of cells within the time table 157 instead of pressing the new reservation button 159 in FIG. 14. Namely the user places the mouse pointer on the desired cell and clicks (selects) the cell to make an instruction for a new reservation.

More specifically, for instance, in a case where a cell 191 is selected (clicked), the image (dialog) in FIG. 15 is displayed, like in a case where the new reservation button 159 is pressed. It is to be noted that, when the new reservation button 159 is pressed, while nothing is displayed within each box or pull-down menu as described above, when the cell 191 is selected (clicked), various information corresponding to the cell 191 shown in FIG. 15 is displayed.

Further, the user makes an instruction for a new reservation by a drag-and-drop operation with a mouse similar to the operation shown in FIG. 12 described above. Namely when the user places the mouse pointer on one of blank cells (a cell other than the inputted non-stop recording reservation area), and drags the pointer from an upper-left edge thereof, then a frame (a square rubber band) is displayed and expanded by one hour unit to the extent where the pointer goes. When the user drops the pointer, the image (dialog) shown in FIG. 15 is displayed. In this case, various information corresponding to the frame (the square rubber band) at a point of time when the dropping operation is made is displayed within each box or pull-down menu in FIG. 15.

Returning to FIG. 14, a confirm and change button 160 is pressed when the user needs to confirm or change the contents of the inputted non-stop recording reservation.

In other words, when the user places the pointer on one of the inputted non-stop recording reservation areas such as the areas 171 to 176, 181, and 182 shown in FIG. 14, and clicks (selects) the area and presses down the confirm and change button 160, the image (dialog) shown in FIG. 15 is displayed. In this case, actually the contents of non-stop recording reservation corresponding to the selected area (the square rubber band) are displayed within each box or pull-down menu.

Therefore, the user can confirm the contents of inputted non-stop recording reservation by checking the displayed contents within each box or pull-down menu in FIG. 15. The user can also change the contents of inputted non-stop recording reservation by changing the displayed contents (inputted contents) within each box or pull-down menu in FIG. 15 and pressing the OK button.

Also, the user can confirm and change the contents of inputted non-stop recording reservation, by an alternative operation such as to place the pointer on one of the inputted non-stop recording reservation areas and double-click the area to display the image (dialog) in FIG. 15 as well as by the operation of clicking the confirm and change button 160 described above.

A reservation delete button 161 corresponds to the delete button 73 in FIG. 8, and is used for deleting the inputted non-stop recording reservation.

Namely at first, the user places the mouse pointer on a specified area out of the inputted non-stop recording reservation areas, clicks (selects) the area, and presses down the reservation delete button 161, then the contents of non-stop recording reservation corresponding to the selected area are deleted.

In order to delete the inputted non-stop recording reservation, the user can also execute an operation described below. At first, as described above, the user places the mouse pointer on a specified area of the inputted non-stop recording reservation areas, and clicks the mouse on (selects) the area. Then the image (dialog) is displayed as described above, and the contents of non-stop recording reservation corresponding to the selected area are displayed within each box or pull-down menu of the image. As a result, the user can delete the non-stop recording reservation by deleting all displayed contents (inputted contents) displayed within each box or pull-down menu in the image in FIG. 15, and pressing down the OK button.

The contents of inputted non-stop recording reservations currently selected are displayed on the area 162 under the reservation button 161 and under the time table 157. In the example of FIG. 14, for instance, contents of inputted non-stop recording reservations corresponding to the area 182 is displayed on this area 162.

The OK button 163 to the help button 165 under the area 162 correspond to the OK button to the help button in FIG. 15 respectively.

Details of the "non-stop recording reservation input process" using the non-stop recording reserved images shown in FIGS. 8 to 12 are described above with reference to the flow charts in FIG. 6 and FIG. 7, and two other examples of the reservation images available in the "non-stop recording reservation input process" are also described above with reference to FIGS. 13 to 15.

It is noted again that the non-stop recording reserved image is not limited to the examples described above, and various images may be employed. Suppose that a plurality of non-stop recording reservations for programs broadcasted by different channels have been made for one tuner. In this case, in the examples above described, the user can identify a group of areas indicating the non-stop recording reservations for a specified channel out of all areas constituting the time table corresponding to the tuner by a specified color (display). The method for identifying the non-stop recording reservation is not limited, however, to the example described above. Such methods are allowed as to display a channel number on the area indicating the non-stop recording reservation, and to display the corresponding area with different formats (such as flickering or the like).

To facilitate the understanding of "divided reservation input process", it is described below with reference to FIG. 18 to FIG. 23 as needed. Namely, figures from FIG. 18 to FIG. 23 show specific examples of results of "divided reservation input process". In more details, a program table for channel A (a table describing schedules of broadcast programs) in the time zone from 6:00 until 21:00 (9:00 p.m.) on a day is shown in respective figures, and below this table, another table indicating contents of the inputted reservation for image recording with respect to channel A (hereinafter referred to as contents of reservation for channel A) is shown.

Figure 18:
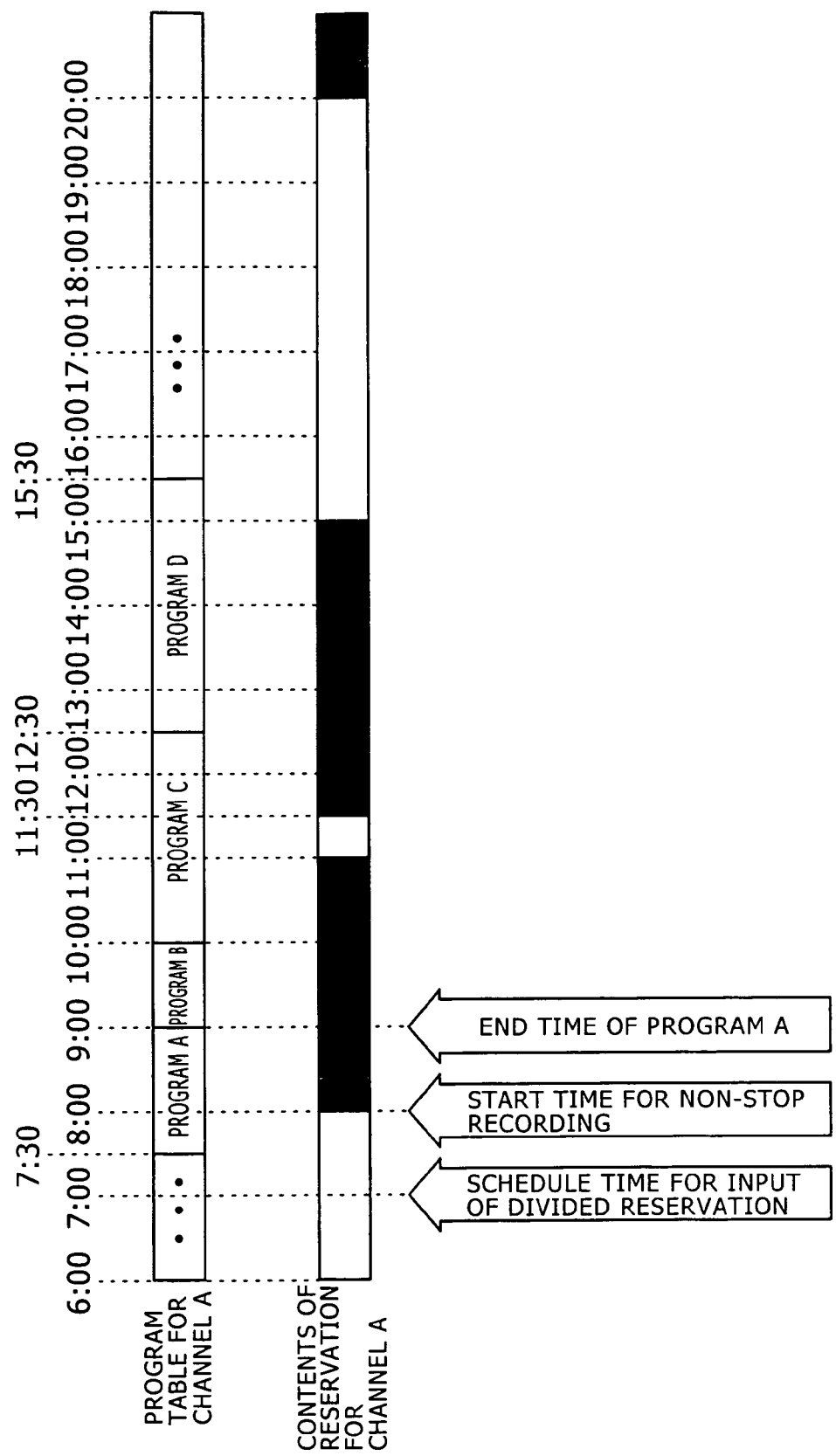
FIGS. 18 to 23 are views showing a specified example of the "divided reservation input process" shown in FIG. 16 and in FIG. 17.

For instance, according to contents of reservation for channel A shown in FIG. 18, it can be seen that a non-stop recording reservation in the time zone from 8:00 until 11:00, a non-stop recording reservation in the time zone from 11:30 until 15:00, a non-stop recording reservation in the time zone after 20:00 are inputted respectively.

Therefore, for instance, if a time of an hour before the start time for a next non-stop recording reservation has been determined and the current time is 6:00, since the start time for the non-stop recording reservation is 8:00 as shown in FIG. 18, the divided reservation input scheduled time is 7:00.

In this case, until 7:00, it is always determined in step S3 in FIG. 5 that the divided reservation input scheduled time has not come as described above, so that the "divided reservation input process" is not executed.

When the time comes to 7:00, it is determined in step S3 that the divided reservation input scheduled time has come, and then the "divided reservation input process" is started in step S4.

Figure 16:
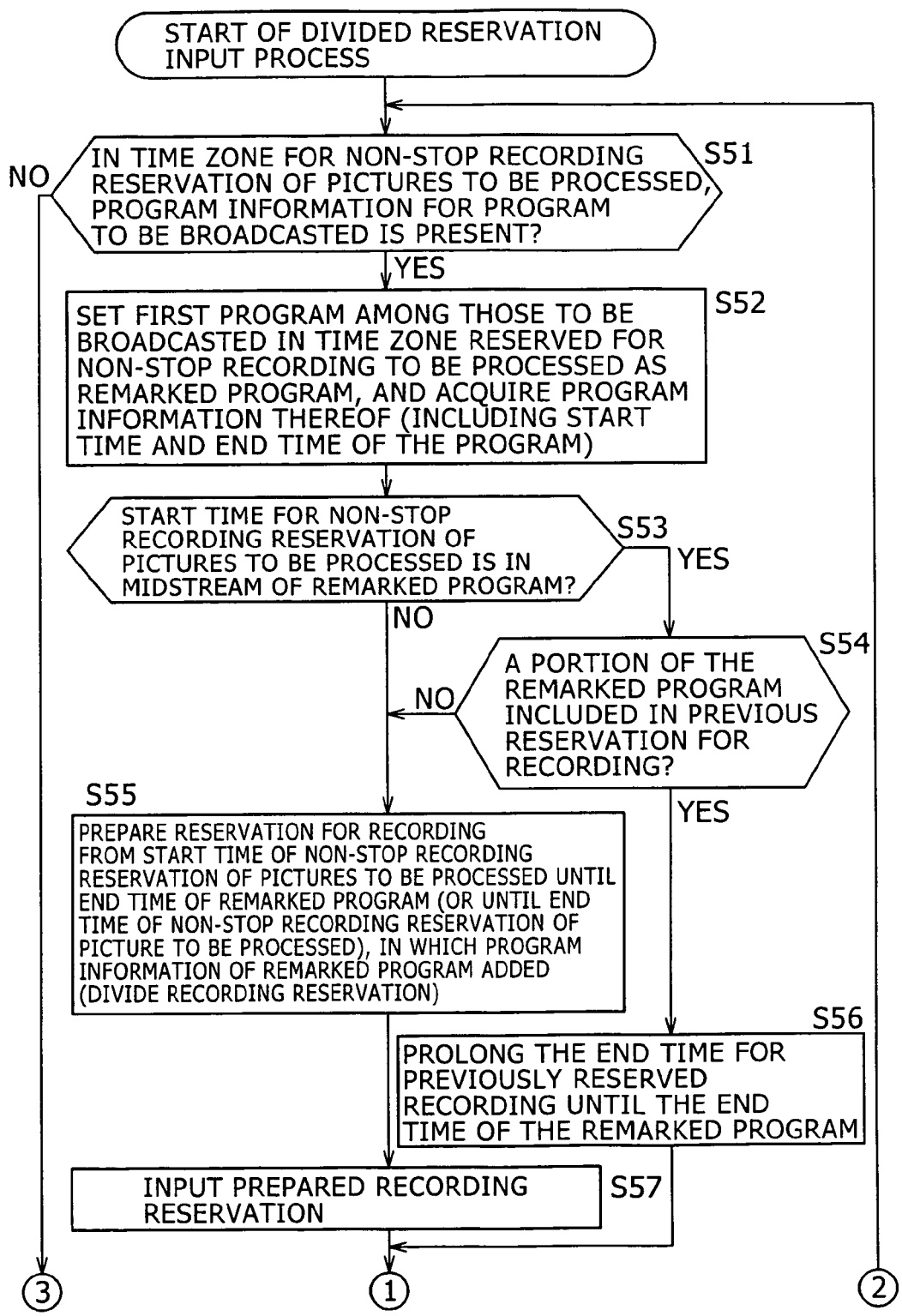
FIGS. 16 and 17 are flow charts illustrating an example of a "divided reservation input process" executed by the content recording/reproducing apparatus shown in FIG. 1.

Namely, when it comes to 7:00, for instance, the "divided reservation input process" shown in FIG. 16 is started, and the reservation input section 62 in FIG. 4 determines in step S51 whether program information for a program to be broadcasted in a time zone reserved for non-stop recording to be processed is present or not.

For instance, in this case, according to the contents of reservation for channel A in FIG. 18, the time zone reserved for non-stop recording to be processed is from 8:00 until 11:00. The reservation input section 62 requests to the content/metadata providing section 72A of the content recording section 13A and the content/metadata providing section 72B of the content recording section 13B respectively for program information for programs to be broadcasted from channel A during this time zone.

Then, the content/metadata providing section 72A determines whether the requested program information is recorded on HDD 46A or not, and a result of this determination is notified to the reservation input section 62. Similarly, the content/metadata providing section 72B determines whether the requested program information is recorded on HDD 46B or not, and a result of this determination is notified to the reservation input section 62.

Figure 17:
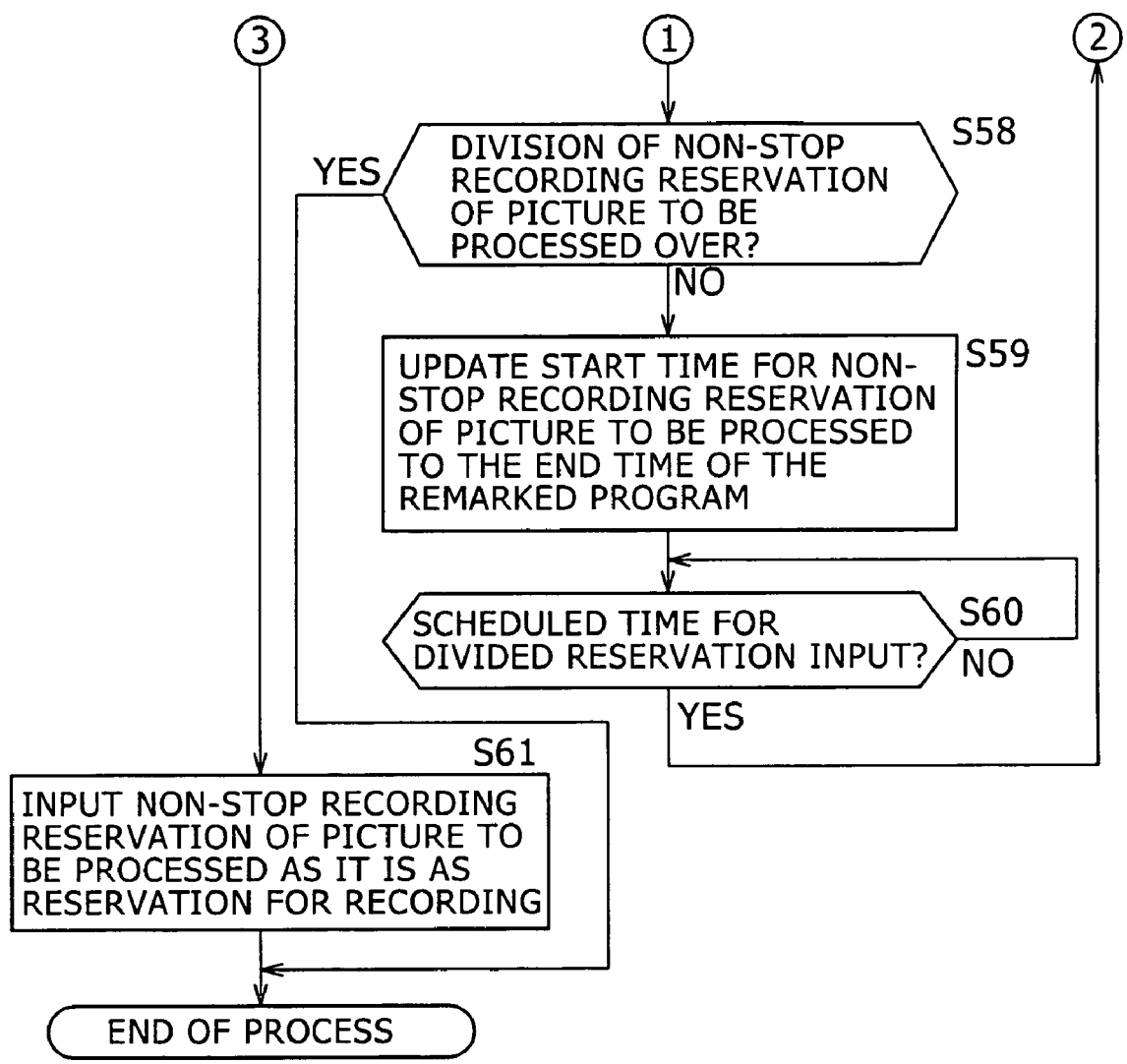

When both the content/metadata providing section 72A and the content/metadata providing section 72B notify a determined result that the requested program information is not present, in step S51, the reservation input section 62 determines that program information for a program to be broadcasted is not present in the time zone reserved for non-stop recording to be processed, then the process goes to step S61 in FIG. 17.

In step S61, the reservation input section 62 inputs the non-stop recording reservation to be processed as it is as a reservation for recording, to terminate the "divided reservation input process". For instance, in the present case, contents of a reservation for recording (a non-stop recording reservation) is inputted such as "to record broadcast contents (broadcast programs) to be broadcasted from channel A during the time zone from 8:00 to until 11:00", as shown in FIG. 18.

In this case, the start time for the next non-stop recording reservation is 11:30, and the next divided reservation input scheduled time is 10:30. Namely, when the time comes to 10:30, the "divided reservation input process" is in turn re-executed with respect to a non-stop recording reservation in the time zone from 11:30 until 15:00.

In contrast, in the present case, according to the contents of reservation for channel A in FIG. 18, programs to be broadcasted in the time zone from 8:00 until 11:00 are program A, program B and program C. From at least one of the content/metadata providing section 72A and the content/metadata providing section 72B, a determined result is notified such that at least one piece of program information of program A, program B and program C is present to the reservation imput section 62, then in step S51 in FIG. 16, it is determined that program information for a program to be broadcasted in a time zone reserved for non-stop recording to be processed is present, so that the process goes to step S52.

In step S52, the reservation input section 62 sets a first program among those to be broadcasted in the time zone reserved for non-stop recording to be processed as a remarked program, and acquires the program information (including start time and end time of the program) from the content/metadata providing section 72A or the content/metadata providing section 72B.

In step S53, the reservation input section 62 determines whether the start time reserved for non-stop recording to be processed is during the remarked program or not, based on the start time and end time (program information) of the remarked program acquired in step S52.

For instance, in the present case, according to the program table for channel A in FIG. 18, program A is remarked in step S52, and the program information of program A is acquired. The program information of program A includes information indicating that the start time for program A is 7:30 and the end time is 9:00.

According to contents of reservation for channel A in FIG. 18, the start time for the non-stop recording reservation to be processed, namely, the start time reserved for non-stop recording is set at 8:00. Therefore, in the present case, the reservation input section 62 determines that the start time reserved for non-stop recording to be processed is during the remarked program, in step S53, then the process goes to step S54.

In step S54, the reservation input section 62 determines whether a portion of the remarked program is included in previous reservation for recording or not.

For instance, in the present case, a previous reservation is not present as shown in FIG. 18, and therefore it is determined in step S54 that a portion of the remarked program is not included in the previous reservation for recording, and then the process goes to step S55.

In step S55, the reservation input section 62 prepares a reservation for recording pictures from the start time for non-stop recording to be processed until the end time of the remarked program (or until the end time of non-stop recording to be processed) with program information for the remarked program added thereto. Namely, with the process in step S55, one reservation for recording is divided from the non-stop recording reservation to be processed.

In step S57, the reservation input section 62 inputs the reservation for recording prepared in step S55.

Figure 19:
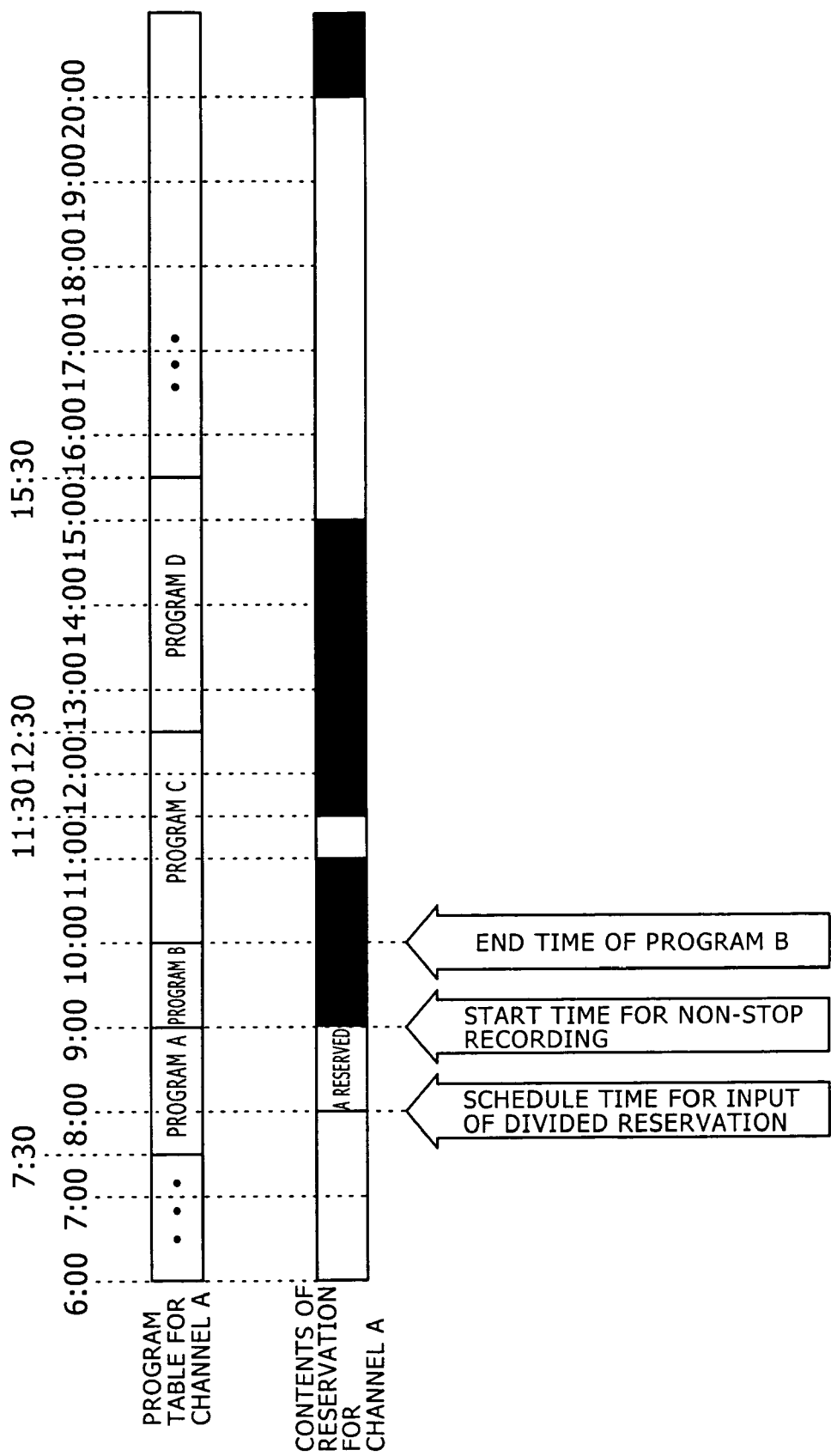

For instance, in the present case, in step S55, a reservation for recording pictures from 8:00 (the start time for non-stop recording reservation to be processed) until 9:00 (the end time of program A) with program information for program A added thereto is prepared as reservation A as shown in FIG. 19. Then the reservation A is inputted in step S57, and the process goes to step S58 in FIG. 17.

In step S58, the reservation input section 62 determines whether division of non-stop recording reservation to be processed is over or not.

For instance, in the present case, it is determined in step S58 that division of non-stop recording reservation to be processed is over, and then the process goes to step S59.

In step S59, the reservation input section 62 updates the start time for non-stop recording reservation to be processed, namely, the start time reserved for non-stop recording to the end time of the remarked program, and then determines in step S60 whether the divided reservation input scheduled time has come or not.

For instance, in the present case, as shown in FIG. 19, the start time reserved for non-stop recording is updated in step S59 to 9:00 that is the end time of program A.

Therefore, the divided reservation input scheduled time is in turn set to 8:00, so that, until 8:00, it is determined in step S60 that the divided reservation input scheduled time has not come, and the process goes back to step S60, wherein it is re-determined whether the divided reservation input scheduled time has come or not. Namely, the reservation input section 62 always monitors the current time to wait the proceeding of the "divided reservation input process" by repeating the determining process in step S60 until the current time comes to 8:00.

When the current time comes to 8:00, the reservation input section 62 determines in step S60 that the divided reservation input scheduled time has come, and the process goes back to step S51, and the subsequent processes are executed.

For instance, in the present case, it is determined as "YES" in step S51, then program B is, in turn, remarked in step S52, and the program information of program B is acquired.

According to the program table for channel A in FIG. 19, the start time for program B is 9:00, which corresponds to the start time reserved for non-stop recording, so that it is determined in step S53 that the start time for non-stop recording reservation to be processed is not during the remarked program, and then the process goes to step S55.

Figure 20:
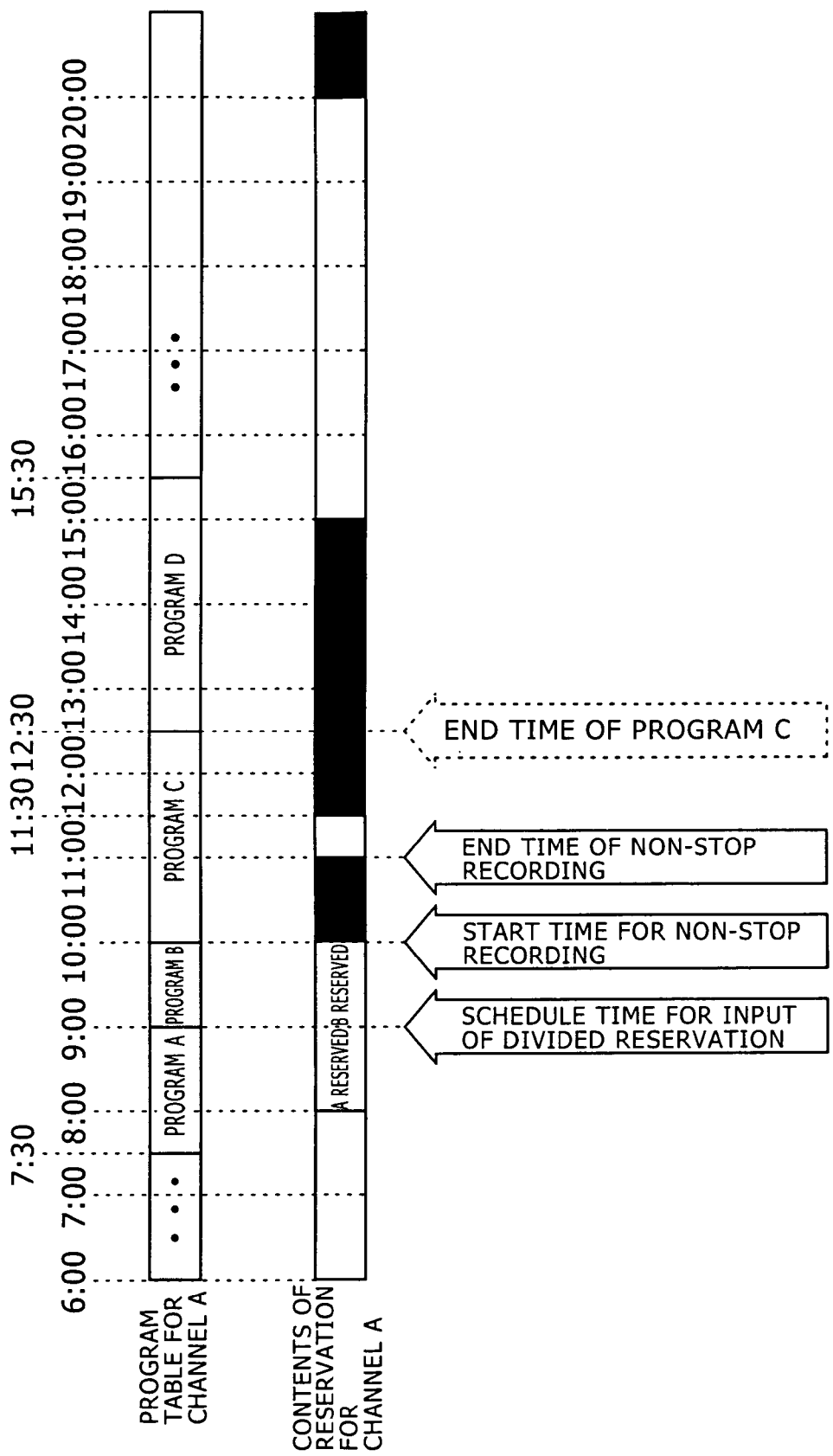

In step S55, in turn, a reservation for recording pictures from 9:00 (the start time for non-stop recording reservation to be processed) until 10:00 (the end time of program B) with program information for program B added thereto is prepared as a reservation B as shown in FIG. 20. Then reservation B is inputted in step S57, and the process goes to step S58 in FIG. 17.

When it is determined as "NO" in step S58, subsequently in step S59, the start time reserved for non-stop recording is updated to 10:00 that is the end time of program B as shown in FIG. 20.

Therefore, the divided reservation input scheduled time is in turn 9:00, so that, when the time comes to 9:00, it is determined in step S60 that the divided reservation input scheduled time has come, and the process goes back to step S51 in FIG. 16, and the subsequent processes are executed.

Namely, for instance, in the present case, it is determined as "YES" in step S51, and then program C is, in turn, remarked in step S52, and the program information of program C is acquired.

According to the program table for channel A shown in FIG. 20, the start time for program C is 10:00, which corresponds to the start time reserved for non-stop recording, so that this time is also determined in step S53 that the start time for non-stop recording reservation to be processed (10:00) is not during the remarked program (program C), then the process goes to step S55.

Figure 21:
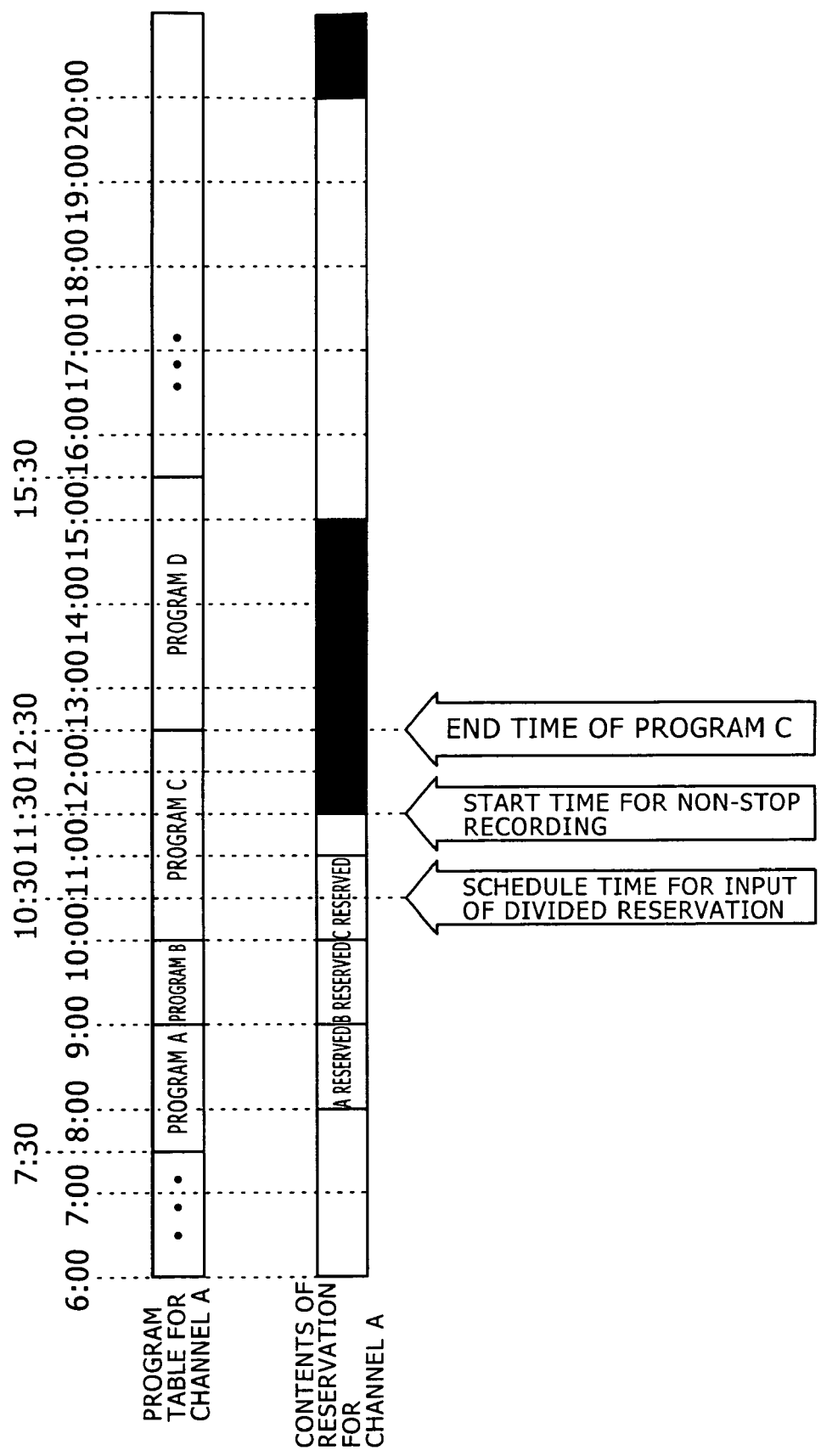

In step S55, in turn, a reservation for recording pictures from 10:00 (the start time for non-stop recording reservation to be processed) until 11:00 (the end time of non-stop recording reservation to be processed) with program information for program C added thereto is prepared as reservation C as shown in FIG. 21. Then reservation C is inputted in step S57, and the process goes to step S58 in FIG. 17.

In this way, the non-stop recording reservation to be processed has been divided into reservation A, reservation B and reservation C respectively, thus it is determined in step S58 that division of non-stop recording reservation to be processed is over, and then the "divided reservation input process" is terminated.

In the present case, according to the contents of reservation for channel A in FIG. 21, the start time of the next non-stop recording reservation is set at 11:30, so that the next divided reservation input scheduled time is 10:30. Until 10:30, it is always determined in step S3 shown in FIG. 5 that the divided reservation input scheduled time has not come, so that the "divided reservation input process" is not executed.

When the time comes to 10:30, it is determined in step S3 that the divided reservation input scheduled time has come, and the "divided reservation input process" is restarted in step S4.

Namely, as shown in FIG. 21, non-stop recording reservations in the time zone from 11:30 until 15:00 are set as reservations to be processed, and the "divided reservation input process" in FIG. 16 is executed.

In this case, according to contents of reservation for channel A in FIG. 21, the time zone for non-stop recording reservations is set from 11:30 until 15:00. And according to the program table for channel A, programs to be broadcasted in the time zone are program C and program D.

For instance, when respective program information for program C and program D is stored in HDD 46A or HDD 46B, it is determined as "YES" in step S51, and then program C is remarked in step S52, and the program information of program C is acquired.

As shown in FIG. 21, in turn, in step S53, it is determined that the start time for non-stop recording reservation to be processed (11:30) is during the remarked program (program C), and then the process goes to step S54.

For instance, in the present case, the previous reservation for recording is reservation C, and, as shown in FIG. 21, program C is included in reservation C, so that it is determined in step S54 that a portion of the remarked program is included in the previous reservation for recording, and then the process goes to step S56.

In step S56, the reservation input section 62 prolongs the end time for previously reserved recording until the end time of the remarked program.

Figure 22:
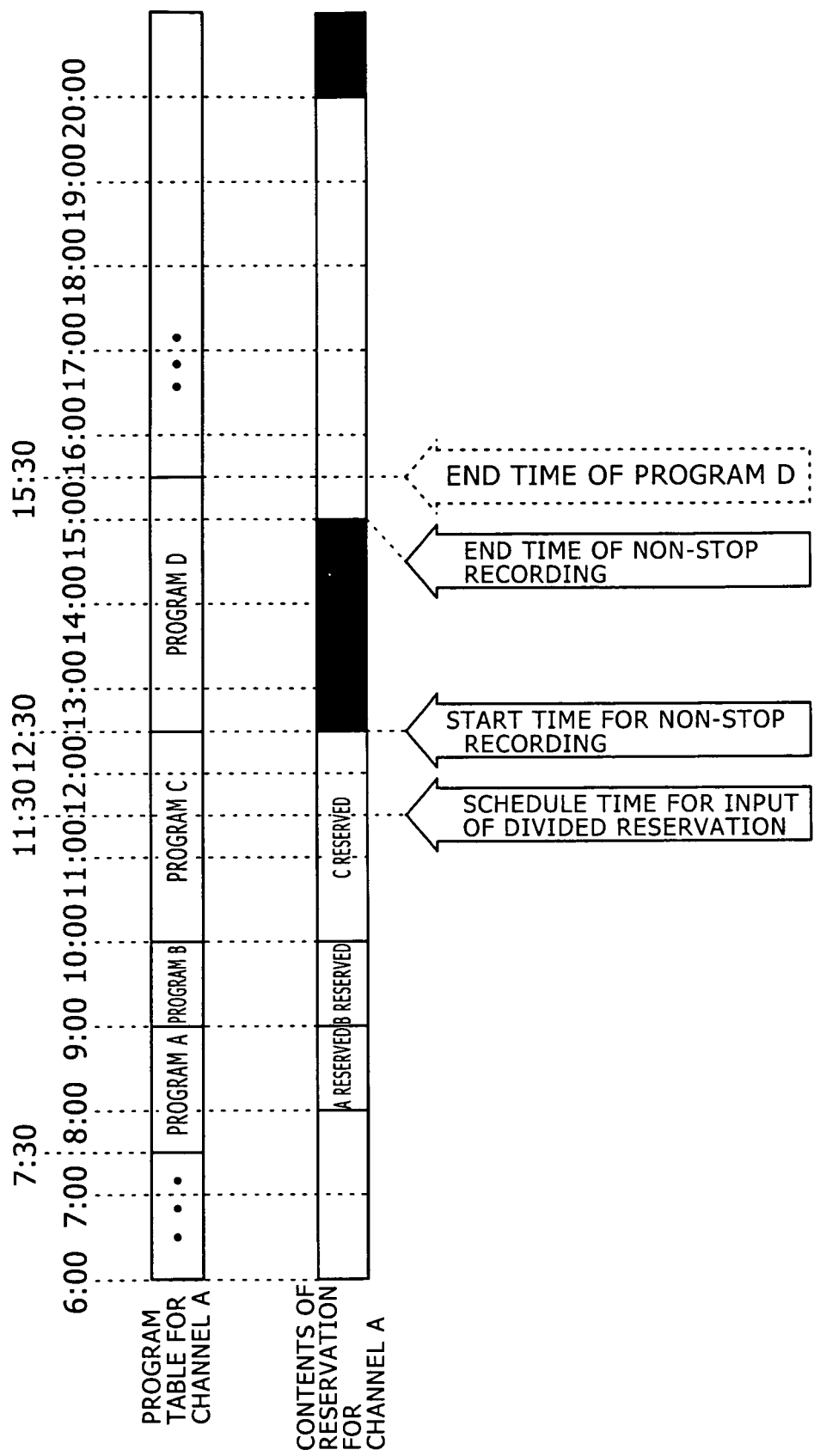

For instance, in the present case, in step S56, the end time for reservation C, which is previously reserved for recording, is prolonged to 12:30 that is the end time of program C as shown in FIG. 22.

Subsequently, it is determined in step S58 in FIG. 17 that division of non-stop recording reservation to be processed is not over, and then the start time reserved for non-stop recording is updated in step S59 to 12:30 that is the end time of program C as shown in FIG. 22.

Therefore, the divided reservation input scheduled time is in turn set to 11:30, so that, when the time come to 11:30, it is determined in step S60 that the divided reservation input scheduled time has come, and the process goes back to step S51 in FIG. 16, and the subsequent processes are executed.

Namely, for instance, in the present case, it is determined as "YES" in step S51, and then program D is in turn remarked in step S52, and the program information of program D is acquired.

According to the program table for channel A in FIG. 22, the start time for program D is 12:30, which corresponds to the start time reserved for non-stop recording, so that it is determined in step S53 that the start time for non-stop recording reservation to be processed (12:30) is not during the remarked program (program D), then the process goes to step S55.

Figure 23:
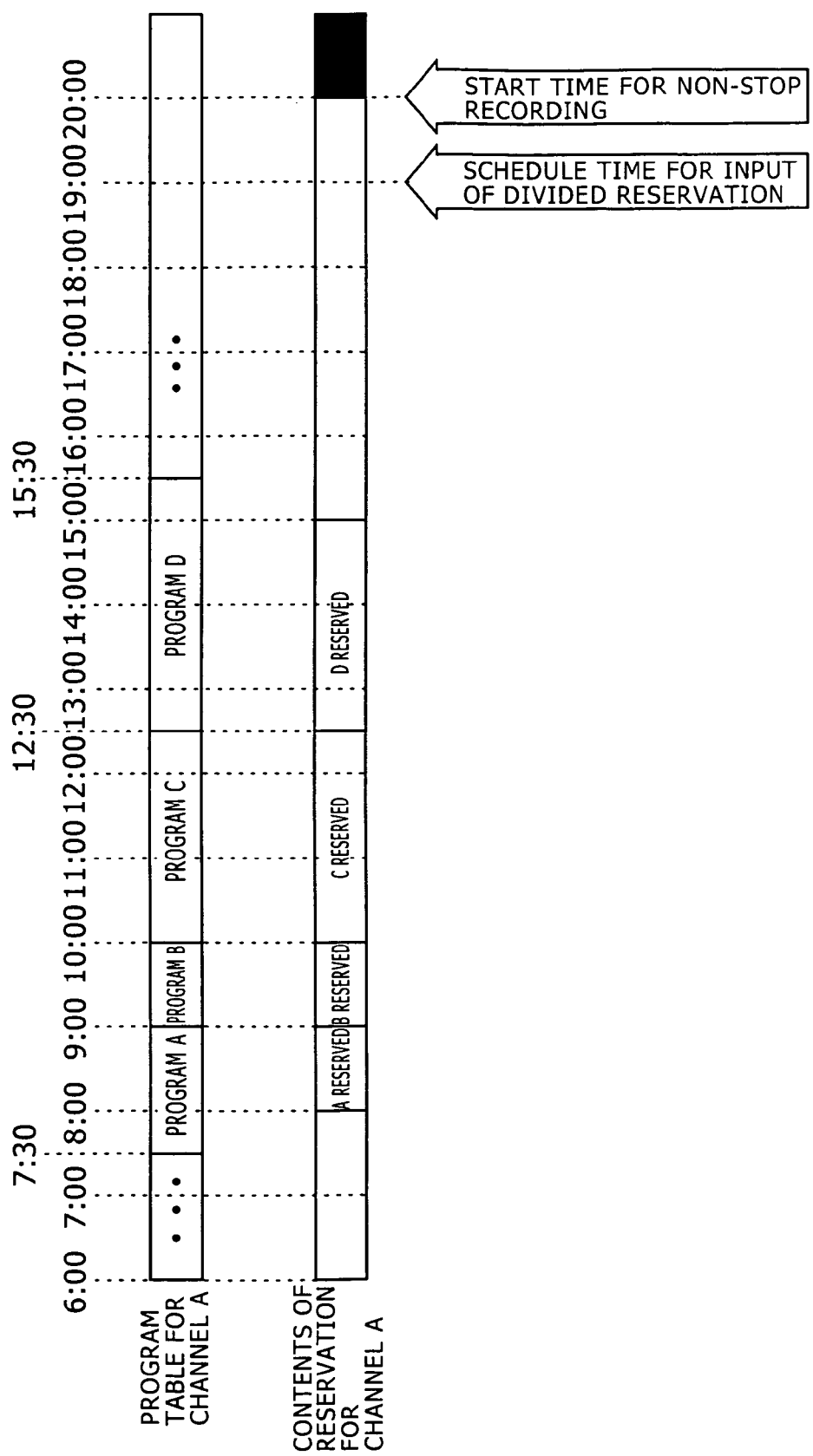

In step S55, a reservation for recording pictures from 12:30 (the start time for non-stop recording reservation to be processed) until 15:00 (the end time of non-stop recording reservation to be processed) with program information for program D added thereto is prepared as reservation D as shown in FIG. 23. Then the reservation D is inputted in step S57, and the process goes to step S58 in FIG. 17.

In this way, a portion of the non-stop recording reservation to be processed is integrated to reservation C of the previous reservation for recording, (as the end time of reservation C is prlonged) as well as a part of the rest of the reservation has been divided as reservation D, then it is determined in step S58 that division of non-stop recording reservation to be processed is over, then the "divided reservation input process" is terminated.

In the present case, according to the contents of reservation for channel A in FIG. 23, the start time of the next non-stop recording reservation is set at 20:00, so that the next divided reservation input scheduled time is 19:00. Until 19:00, in step S3 in FIG. 5, it is always determined that the divided reservation input scheduled time has not come, so that the "divided reservation input process" is not executed.

When the time comes to 19:00, it is determined in step S3 that the divided reservation input scheduled time has come, the "divided reservation input process" is restarted in step S4.

Namely, the non-stop recording reservations in the time zone after 20:00 are set as reservations to be processed, the "divided reservation input process" in FIG. 16 is executed. However, the end time of the non-stop recording reservation to be processed is not shown in the figure, description about the process is omitted.

With reference to the flow charts in FIG. 16 and FIG. 17, examples for "divided reservation input process" have been described. Furthermore, specific examples of "divided reservation input process" (examples for specific results of processing) have been also described with reference to FIG. 18 to 23.

To repeat some of the above mentioned, a block for operating the "divided reservation input process" is described as the reservation input section 62 in the description above, but the present invention is not limited to the example described above, and for instance, it may also be a block, not shown, provided inside the content recording section 13A or 13B.

Furthermore, the "divided reservation input process" is not limited to examples shown in FIG. 16 and FIG. 17, and various types of process may be employed for the purpose.

For instance, according to the contents of reservation for channel A in FIG. 23, only a portion of program A is recorded contents according to the reservation for recording with reservation A. Because, the example in FIG. 16 and FIG. 17 described above is for the following purposes. The purpose is to give priority to the fact that a non-stop recording reservation is a reservation for recording inputted with instructions by a user, in other words, to the fact that it is a private reservation for recording based on the user's intention. For this purpose, in the example in FIG. 16 and FIG. 17 described above, the reservation A is prepared such that the start time for non-stop recording reservation has the higher priority than the start time for program A.

As described above, in the examples for "divided reservation input process" in FIG. 16 and FIG. 17, reservation D is also prepared such that the end time of the non-stop recording reservation has a priority to the end time of program D. Namely, reservation D having contents that only a part of program D is to be recorded (the last part of program D is not to be recorded) is prepared.

Therefore, when such purpose is not necessary to be achieved, another "divided reservation input process" can be used such that, for instance, the start time and end time of a broadcast program have priority. When such "divided reservation input process" is used, but not shown in figures, reservation A is prepared to have contents that "broadcast contents (broadcast programs) to be broadcasted from channel A in the time zone from 7:30 until 9:00 are to be recorded". Similarly, reservation D is prepared to have contents that "broadcast contents (broadcast programs) to be broadcasted from channel A in the time zone from 12:30 until 15:30 are to be recorded".

The "divided reservation input process" described above is to be executed individually for each of tuners installed in a content recording/reproducing apparatus 1 in FIG. 1. Namely, according to an embodiment of the present invention, the "divided reservation input process" is individually (separately) executed for each of tuners 51-1A to 51-3A in FIG. 3 installed in the content recording section 13A and tuners 51-1B to 51-3B in FIG. 3 installed in the content recording section 13B.

Therefore, the recording managing section 71A in the content recording section 13A in FIG. 4 performs recording onto HDD 46A, by controlling content acquiring section 45A in accordance with a result from "divided reservation input process" separately executed for respective tuners 51-1A to 51-3A, namely, in accordance with contents of the inputted reservation for recording. As a result, each video capsule including compressed content data corresponding to each reservation for recording is prepared, to be stored (recorded) onto HDD 46A.

Similarly, the recording managing section 71B in the content recording section 13B in FIG. 4 performs recording onto HDD 46B, by controlling content acquiring section 45B in accordance with a result from "divided reservation input process" separately executed for respective tuners 51-1B to 51-3B, namely, in accordance with contents of the inputted reservation for recording. As a result, each video capsule including compressed content data corresponding to each reservation for recording is prepared, to be stored (recorded) onto HDD 46B.

As a result, a number of video capsules are stored in HDD 46A and HDD 46B, so that a problem may occur that it is difficult for a user to find a desired video capsules, unless contents of picture recorded in HDD 46A and HDD 46B is properly managed.

Although contents of picture recorded in HDD 46A and HDD 46B is managed by using, for instance, conventional program historys, the problem described above occurs. Namely, a conventional program history is a table prepared based on program information of all broadcast programs broadcasted in the past as described above, that is a table indicating all broadcast programs (program columns indicating thereof) regardless whether those programs have been actually recorded or not. As a result, in the conventional program history, recorded programs and unrecorded broadcast programs are not distinguished, and a problem occurs that it is very difficult for a user to find a desired recorded program.

In addition, in the conventional program table, another problem is present that all broadcast programs indicated cannot be reproduced.

As described above, Patent document 2 and Patent document 3 disclose a technique by which recorded programs included in a program history (program column) are marked with a certain sign or displayed in a modified representation. Thereby it is possible to distinguish recorded programs and not recorded programs to some degree.

However, even the technique disclosed in Patent document 2 and Patent document 3 is assumed to use the conventional program history indicating all broadcast programs (program columns indicating thereof). Accordingly, with the technologies disclosed in the Patent Document 2 and 3, After distinguish broadcast table which are marked with a certain sign or displayed in different representations in all the broadcast tables as a broadcast table, then the user perform to select desired broadcast tables among distinguished recorded programs. As long as such troublesome operation required, the former problems as described above, namely, the difficulty for a user in finding a desired recorded program is not solved thoroughly.

In addition, the technique disclosed in Patent document 2 and Patent document 3 naturally has the latter problem, namely, it is impossible to reproduce all indicated broadcast programs.

In the present invention, in order to solve these problems at the same time, contents of picture recorded (recorded programs) in HDD 46A and HDD 46B are managed in the form of a table, such as a program history according to an embodiment of the present invention (for instance, as described below in FIG. 26) or a keyword-classified program history (for instance, as described below in FIG. 27).

This program history and keyword-classified program history according to an embodiment of the present invention, which will be described below in detail, includes program information of recorded programs included in actually recorded video capsules. Namely, only recorded programs (program columns indicating thereof) are indicated, so that all indicated broadcast programs can be reproduced.

Therefore, a user can easily find a desired recorded program by seeing a program history or a keyword-classified program history according to an embodiment of the present invention. Further, the user can easily operate instructions for reproduction of the recorded program found in this way, by using the program history or keyword-classified program history according to an embodiment of the present invention.

These processes by the program history managing section 63, namely, a process to present a program history or a keyword-classified program history according to an embodiment of the present invention to a user, and a process to execute operations performed by a user based on the program history or keyword-classified program history according to an embodiment of the present invention, are called "program history presentation/reproduction control process" as described above.

Figure 25:
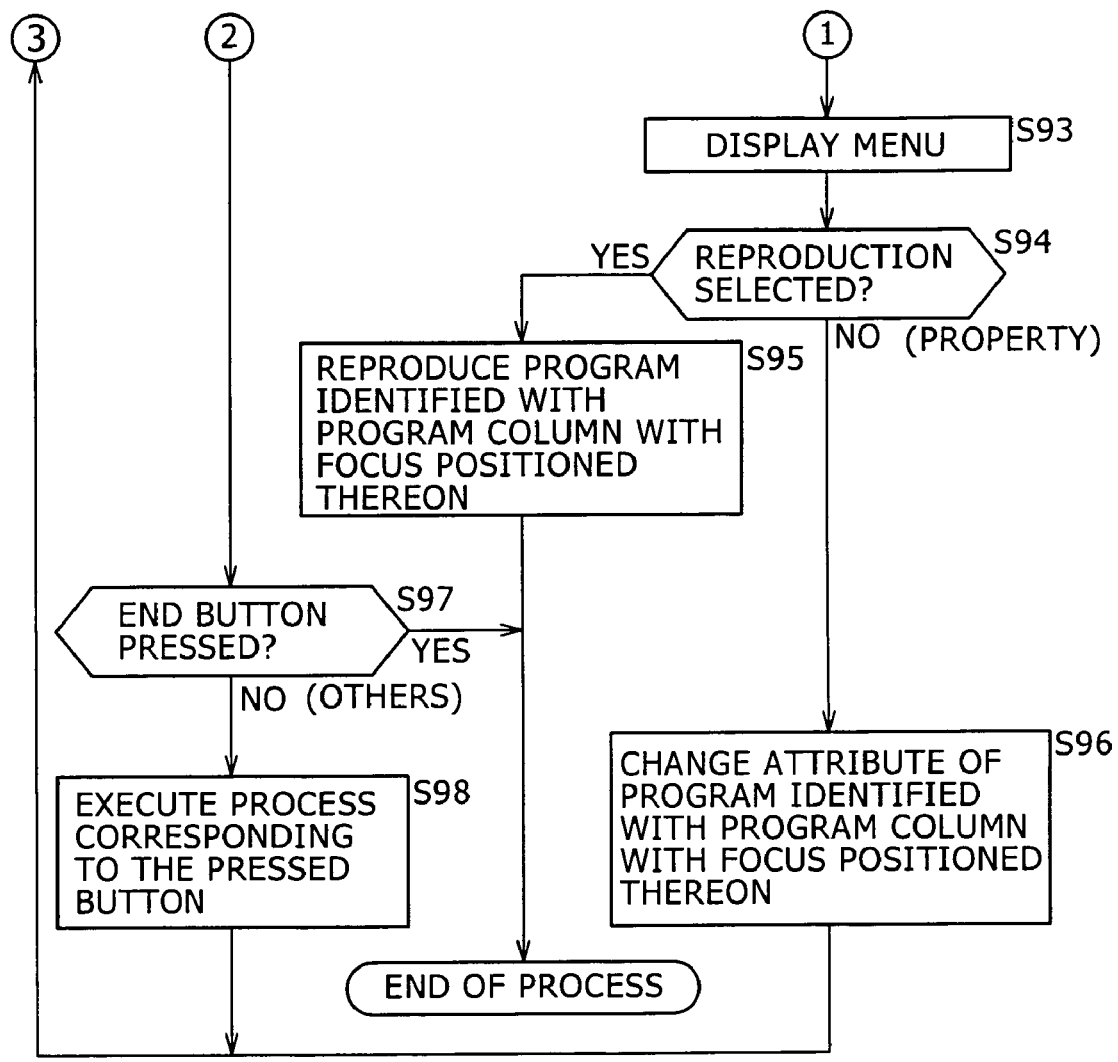

An example for this "program history presentation/reproduction control process" is shown in flow charts in FIG. 24 and FIG. 25. An example for "program history presentation/reproduction control process" is described below with reference to the flow charts in FIG. 24 and FIG. 25.

As described above, although one video capsule may include a plurality of recorded programs in some cases, to simplify explanation, in the description for "program history presentation/reproduction control process", it is assumed that one video capsule includes one recorded program. Accordingly, a recorded program and a video capsule including thereof are collectively referred to as a recorded program hereinafter, unless they have to be separately identified.

In step S81, the program history managing section 63 in FIG. 4 acquires recorded program data from HDD 46A and HDD 46B via the content/metadata providing section 72A and the content/metadata providing section 72B respectively.

Recorded program data includes program information of recorded programs (metadata), as well as image data displayed as thumbnails in program columns of the recorded programs, as described below. This image data may be compressed content data themselves, or other image data included in a video capsule together with the compressed content data, for instance, still image data or moving picture data displayed in reduced resolution or the like.

However, in the latter case, the content acquiring section 45A and content acquiring section 45B have to prepare these still image data or moving picture data reduced with respect to resolution or the like separately from compressed content data, and to set those together with compressed content data into a video capsule to be stored in HDD 46A or HDD 46B.

Or, even in the former case, the program history managing section 63 may newly prepare still image data or moving picture data reduced with respect to resolution or the like from the compressed content data and use those as image data for thumbnails, without using the compressed content data themselves as image data for thumbnails.

In step S82, the program history managing section 63 initializes a display system with "the program history" as the default.

Namely, as described above, according to an embodiment of the present invention, a keyword-classified program history can be displayed as well as a program history. Therefore, it has to be decided in initialization which of the program history and the keyword-classified program history is to be displayed first as the default. Although the default of the display system is set to "the program history" in the example in FIG. 24, naturally it may also be "the keyword-classified program history".

In step S83, the program history managing section 63 generates a table (data) corresponding to the current display system and supplies the table to the information presentation integrated control section 61. For instance, in the present case, in step S83, a program history (data) is generated and is supplied to the information presentation integrated control section 61.

Then, in step S84, the information presentation integrated control section 61 displays a table corresponding to the supplied data on the output section 27. For instance, in the present case, a program history as shown in FIG. 26 is displayed with a process in step S84.

Namely, FIG. 26 shows an example of a display of a program history according to the present invention. Thus an example of program history according to the present invention is described below with reference to FIG. 26.

A soft button 201 shown at the upper left of FIG. 26 is a button for switching a display system. The soft button 201 is thus referred to as a switching button 201 hereinafter. It is to be noted that a process made by the program history managing section 63 is described later in a case where the switching button 201 is pressed down.

In an area 202 is displayed a program column (a display area) in a format similar to a TV page in the newspaper as a paper medium. Namely, in the area 202 is displayed each program column indicating each of the recorded programs by channel arranged in an area indicating a recorded time zone.

Namely, each program column is displayed in a longitudinally extending manner each having a length corresponding to a recorded time thereof.

In a program column for one recorded program is usually displayed an image (a moving image or a still image) for a thumbnail and a title of the broadcast program. It is to be noted that in a program column for a recorded program having a short recorded time is not displayed a thumbnail as the case may be. This is because a program column for a recorded program having a short recorded time does not have a length (size) enough to display a thumbnail thereof.

More specifically, for instance, in a case shown in FIG. 26, in a column for channel A is displayed a program column indicating a music A program recorded in a time zone from 20:10 to 20:50, so that it can be seen that the music A program broadcasted from channel A is recorded during this time zone. In the meantime, a program column is not displayed in an area indicating a time zone from 19:30 to 20:10, so that it can be seen that the music A program broadcasted from channel A is not recorded during this time zone.

Similarly, in a column for channel B are displayed a program column indicating a music B program recorded in a time zone from 19:30 to 19:55 and a program column indicating an information A program recorded in a time zone from 20:05 onward, so that it can be seen that each of the music B program and the information A program broadcasted from channel B is recorded in each of these time zones. In the meantime, a program column is not displayed in an area indicating a time zone from 19:55 to 20:05, so that it can be seen that the broadcasted contents (broadcast program) broadcasted from channel B is not recorded during this time zone.

In a column for channel C is displayed a program column indicating a news A program recorded from a prespecified time before 19:25 to 20:00, so that it can be seen that the news A program broadcasted from channel C is recorded during this time zone. In the meantime, a program column is not displayed in an area indicating a time zone from 20:00 to 21:00, so that it can be seen that the broadcasted contents (broadcast program) broadcasted from channel C is not recorded during this time zone.

In a column for channel D is displayed a program column indicating a sports A program recorded in a time zone from 20:00 to 20:55, so that it can be seen that the sports A program broadcasted from channel D is recorded during this time zone. In the meantime, a program column is not displayed in an area indicating a time zone from 19:25 to 20:00, so that it can be seen that the broadcasted contents (broadcast program) broadcasted from channel D is not recorded during this time zone.

In a column for channel E is displayed a program column indicating a weather A program recorded in a time zone from 19:40 to 19:55, so that it can be seen that the weather A program broadcasted from channel E is recorded during this time zone. In the meantime, a program column is not displayed in an area indicating a time zone from 19:55 to 20:55, so that it can be seen that the broadcasted contents (broadcast program) broadcasted from channel E is not recorded during this time zone.

On the other hand, in the area 202 is displayed an image of a broadcast program on the air or during reproduction and the like (referred to as a background image) under the program history including the program columns described above. For a user, however, the background image appears to be displayed, as shown in FIG. 26, as if the background image is displayed only in an area without a program column display (in an area of a time zone in which a recorded program does not exist) within the area 202.

Further a program column being selected at the moment, for instance, in the example shown in FIG. 26, a music B program from channel B is displayed in gray in the example shown in FIG. 26, however, the program column is highlighted in practice. It is to be noted that being selected a prespecified area including a program column or a display switching button 201 is referred to as being arranged a focus for the sake of convenience. Namely, an area with a focus arranged thereon is highlighted in practice.

In the meantime, a program column not being selected at the moment, namely a program column with a focus not arranged thereon is displayed in white in the example shown in FIG. 26, however, the program column is displayed semi-transparent in practice. Thus the program column not being selected becomes see-through, so that the background image thereunder (a broadcast program on the air or during reproduction and the like) is displayed.

In other words, a synthetic image having a program history with a background image synthesized thereabove is displayed in the area 202. However, the synthesizing ratio between the background image and the program history (the transparent ratio) is not constant in the area 202. Namely, for instance, in the area in which a program column does not exist, the synthesizing ratio is 100% (It is to be noted that the synthesizing ratio of 100% indicates a complete transparency, while that of 0% indicates no transparency), in the meantime, in the area in which the program column is selected, the synthesizing ratio is 0%, and in the area in which the program column is not selected, it is an intermediate ratio (50% or the like).

In the area 203 are displayed various types of detailed information concerning a selected program column (namely, a recorded program corresponding thereto). It is to be noted that in the example shown in FIG. 26 is only displayed a thumbnail, but actually, information indicated by, for instance, the following A) through K) is displayed.

A) Broadcast station
B) Broadcast date, start time, end time, and recording time
C) Name of a program (title)
D) Detailed information concerning the program (contents, personage, and names of actors/actresses)
E) Recording mode (extended definition, standard, or the like)
F) File size
G) State of automatic delete (in a case of the attribution "OK", as well as an expected time until deletion)
H) Validated date (if any setting is made)
I) State of a safety lug
J) Genre
K) Thumbnail Information G), H) and I) represents attributions which the recorded program (video capsule) has. It is to be noted that, as each of these attributions can be changed with operations by a user, description of each attribution is given hereinafter in the description of operations by a user.

In addition, information J) can be represented without displaying it in the area 203 (or with displaying it in the area 203) and (at the same time) with a program column displayed using different colors.

Next are described operations by a user employing a program history as described above (and a keyword-classified program table) according to the present invention.

Hereinafter description is made supposing that, for operations by a user employing a program history or a keyword-classified program table described later, a remote controller (referred to as a RC hereinafter) in the input section 26 in FIG. 4 is used. Naturally, however, a user can conduct a set of operations described below exactly in the same way even when using a mouth or a keyboard instead of the RC.

For instance, a user can move a focus onto a desired area by pressing down any of the up/down/left/right buttons, and make the program history managing section 63 execute a process corresponding to an area with a focus arranged thereon by pressing down and operating a decision button.

More specifically, for instance, in the state where a focus is arranged on the switching button 201, when a decision button on a RC is pressed down, the display system switches from the current "program history" to the "keyword-classified program table", and a keyword-classified program table as shown in FIG. 27 is displayed from the output section 27. It is to be noted that detailed description of a process when the switching button 201 is pressed down and of a keyword-classified program table is given hereinafter.

In addition, for instance, in the state where a focus is arranged on a prespecified program column, namely, in the state where a prespecified program column is selected, when a decision button on a RC is pressed down, though not shown, a menu (image) is displayed.

Display contents of the menu are, for instance, as those shown in the following 1) to 5). Similarly on the menu, a user can move a focus onto a desired area among the areas indicating 1) to 5) by pressing down any of the up/down/left/right buttons, and make the program history managing section 63 execute a process corresponding to a process among those indicated by the processes 1) to 5), by pressing down and operating a decision button.

1) Reproduction
2) Reproduction starting from the end of the point having been reproduced last
3) Delete
4) Copy
5) Property Process 1): The display of a program history goes out, and a recorded program corresponding to the program column is reproduced from the start point (displayed in the area 202).

Process 2): The display of a program history goes out, and a recorded program corresponding to the program column is reproduced starting from the end of the point having been reproduced last (displayed in the area 202). Incidentally, the selection of 2) can be implemented only in the case that the program has been reproduced once.

Process 3): A recorded program corresponding to the program column is deleted from the HDD 46A or HDD 46B.

Process 4): A recorded program corresponding to the program column is copied from the HDD 46A or HDD 46B into the storage section 28 in the main control section 11 in FIG. 2.

Property 5): A property window is opened.

Although not shown, the property window refers to a menu which can change attributions of a recorded program corresponding to the program column.

More specifically, for instance, attributions which can be changed utilizing the property window is as shown in the following a) to c).

a) Attribution of au automatic delete
b) Validated date
c) Attribution of a safety lug Automatic delete in a) refers to, for instance, when a storable capacity (remaining capacity) of the HDD 46A or HDD 46B is decreased less or equal to a prespecified threshold level, according to a prespecified rule (for instance, deleting a recorded program in the order in which the start time thereof is older), an operation in which the recording managing section 71A or recording managing section 71B automatically deletes a recorded program (video capsule) of interest from the HDD 46A or HDD 46B. Therefore, as an attribution of automatic delete, provided are one attribution of "OK" which permits automatic delete of a recorded program (video capsule) of interest, and another attribution of "not OK" which does not permit automatic delete of a recorded program (video capsule) of interest. Namely, a recorded program having the attribution "not OK" is excluded from a target for automatic delete. A user can thus set either "OK" or "not OK" with the property window.

The validated date in b) refers to one of the rules for the automatic delete, and a broadcast program which is overdue in terms of a set validated date will be automatically deleted.

The safety lug in c) refers to a concept corresponding to a "safety lug" of video tape or the like in hardware. Namely, as an attribution of a safety lug, one attribution of "a safety lug is broken" and another attribution of "a safety lug is not broken" are provided. A recorded program (video capsule) having the attribution "a safety lug is broken" will never be deleted. Therefore, for instance, for a recorded program or the like which is a so-called recorded program that a user wants to keep permanently, the user can set the attribution "a safety lug is broken" with the property window. Further, when delete of a recorded program is required, a user can set the attribution "a safety lug is not broken" with the property window.

Although the detailed description is omitted, since a recorded program (video capsule) has a various types of attributions as described above, a number of levels having various stages can be set as a reference in determining the order of deletion in each of the recorded programs. It is to be noted that, for instance, the higher the stage of a recorded program is, the more difficult becomes the deletion thereof. For instance, a recorded program having the attribution "a safety lug is broken" can be set to the highest stage (the highest level).

In response to the operations by a user employing the program history (and the keyword-classified program table described later) according to the present invention as described above, an example of a process which the program history managing section 63 in FIG. 4 executes is shown as a process in step S85 and onwards in FIG. 24. Thus the process in step S85 and onwards in FIG. 24 is described below.

In step S85, the program history managing section 63 determines whether or not a prespecified button of the buttons constituting the input section 26 (RC) is pressed down.

In step S85, when it is determined that any one of the buttons constituting the input section 26 (RC) is not pressed down, the process is returned to step S85, and it is determined once again whether or not a prespecified button of the buttons constituting the input section 26 (RC) is pressed down. Namely, the program history managing section 63 constantly monitors input contents from the input section 26.

When any one of the buttons constituting the input section 26 (RC) is pressed down, the program history managing section 63 determines in step S85 that a prespecified button of the buttons constituting the input section 26 (RC) is pressed down. Then the program history managing section 63 detects which button is pressed down, after which the program history managing section 63 proceeds with a process to step S86.

In step S86, the program history managing section 63 determines wheter the pressed button is any one of the up/down/left/right buttons or not.

When the pressed button is any one of the up/down/left/right buttons, the program history managing section 63 determines in step S86 that the pressed button is one of the up/down/left/right buttons, and the process goes to the step S87.

As described above, the up/down/left/right buttons function as a button for moving a focus, so that a process for moving the focus is executed in step S87 and onwards.

Namely, the program history managing section 63 determines in step S87 whether or not the focus after moving (in response to pressing and operating the up/down/left/right buttons) is arranged outside the actual display screen.

In step S87, when the program history managing section 63 determines that the focus after moving is arranged outside the actual display screen, the program history managing section 63 executes a screen scroll process in step S88.

Namely, in response to pressing and operating the up/down/left/right buttons, when a program column not displayed within the screen of the output section 27 in FIG. 4, or a program column having only a portion of which is displayed within the screen is selected, display contents (each of the program columns) in the area 202 are scrolled until the top of the selected program column is displayed. More precisely, the program history managing section 63 generates image data indicating a portion displayed on a screen of the entire program history, when the program history is scrolled in the direction corresponding to the button pressed down, and sequentially supplies the image data to the information presentation integrated control section 61. The information presentation integrated control section 61 sequentially makes the output section 27 display an image corresponding to each piece of image data sequentially supplied.

In step S89, the program history managing section 63 moves a focus onto the selected area. Namely, the display screen (display contents in the area 292) is updated so that the selected area is highlighted.

On the other hand, when it is determined in step S87 that a focus after moving is not arranged outside the current display screen, because the selected area exists within the display screen, the process in step S88 is not executed, but the focus is moved onto the selected area with a process in step S89 (and the display screen is updated as such).

Then the process is returned to step S85, and the subsequent processes are repeated. Namely, the program history managing section 63 monitors the next press of a button on the RC (the output section 26).

Next it is assumed that, for instance, a decision button is pressed down.

In this case, the program history managing section 63 determines that the process in step S85 results in YES, while the process in step S86 results in NO, and the process in step S90 results in the decision button, so that the process goes to step S91.

In step S91, the program history managing section 63 determines whether or not a focus is arranged on the display switching button 201.

In step S91, when it is determined that a focus is arranged on the display switching button 201, the process goes to step S92. The process in step S92 and onwards is described later.

It is to be noted that the position on which the focus is arranged is any of the display switching button 201 and each of the program columns displayed in the area 202.

In this case, when a focus is arranged on a prespecified program column displayed in the area 202, it is determined in step S91 that the focus is not arranged on the display switching button 201, and the process goes to step S93 in FIG. 25.

In step S93, the program history managing section 63 makes the output section 27 display a menu via information presentation integrated control section 61.

Display contents of the menu are in practice as shown in 1) to 5) described above, however, for simplification of description, it is assumed that the display contents herein are only 1) reproduction and 5) property. In addition, as described above, also in the menu, in response to pressing down and operating the up/down/left/right buttons and the decision button on the RC, either 1) reproduction or 5) property is to be selected. Namely, in practice, a process corresponding to the menu operation is also required for the "program history presentation/reproduction control process", however, for simplification of description, explanation of the process is omitted herein (the explanation is also omitted in the flowcharts in FIG. 24 and FIG. 25).

In this case, when 1) reproduction is selected, it is determined in step S94 that reproduction is selected, and the process goes to step S95.

In step S95, the program history managing section 63 reproduces a recorded program specified in the program column with a focus arranged thereon. In detail, the program history managing section 63 acquires a recorded program (video capsule) specified in the program column with a focus arranged thereon from the HDD 46A or the HDD 46B via the content/meta data providing section 72A or the content/meta data providing section 72B, and supplies the recorded program to the information presentation integrated control section 61. The information presentation integrated control section 61 supplies a video signal and an audio signal constituting the supplied recorded program (video capsule) to the output section 27. The output section 27 displays a video picture (moving picture) corresponding to the supplied video signal, and outputs a voice and sound corresponding to the supplied audio signal. Namely, the output section 27 reproduces the recorded program.

Then, when reproduction of the recorded program is terminated, the "program history presentation/reproduction control process" is completed.

On the other hand, when 5) property is selected, and further when a change of any one of a) attribution of automatic delete, b) validated date, and c) state of a safety lug described above is instructed, the program history managing section 63 determines in step S94 that reproduction is not selected, and changes, in step S96, according to the instruction, the attribution of a recorded program specified in a program column with a focus arranged thereon.

Then the process is returned to step S85 in FIG. 24, and the subsequent processes are repeated.

As described above, the process is described when each of the up/down/left/right buttons and the decision button is pressed down.

In addition, various buttons are provided on the remote controller, and processes when the buttons are pressed are as described below respectively.

For instance, when the end button on the remote controller is pressed, it is determined as YES in step S85 shown in FIG. 24 or as NO in step 86, and as NO in step S90, and further it is determined in step S97 shown in FIG. 25 that the end button has been pressed, and the "program history presentation/reproduction control process" is terminated.

In contrast, for instance, any button other than the up, down, right, and left buttons, decision button, and end button is pressed, it is determined as YES in step S85 shown in FIG. 24, as NO in step S86, and as NO in step S90, and further it is determined as NO in step S97 shown in FIG. 25, and the process goes to step S98.

In step S98, the program history managing section 63 executes a process corresponding to the pressed button. When the process is terminated, the process is returned to step S85 shown in FIG. 24, and processes in step S24 and on are executed.

However, as described above, the decision button on the remote controller is pressed in the state where a focus is located on a display switch button 201 shown in FIG. 26, it is determined as YES in step S85 shown in FIG. 24, as NO in step S86, as YES in step S90, and further as YES in step S91, and then the process goes to step S92.

In step S92, the program history managing section 63 changes the display format with the process returned to step S83, and the processes in step S83 and on are repeated. Namely, in step S83, a table corresponding to the selected display format is generated and displayed in response to the process in step S84, and then a process corresponding to a user's operation is executed in the step S85 and on.

More specifically, for instance, when the displays which button 201 is pressed in the state where the program history shown in FIG. 26 is displayed, as described above, a program table by keyword as shown in FIG. 27 is displayed.

Namely, FIG. 27 shows an example of a display of the program table by keyword. The program table by keyword is described below with reference to FIG. 27.

A soft button 211 shown at the top left position in FIG. 27 is a button corresponding to the switch button 201 shown in FIG. 26. Namely when the display switch button 211 is pressed in the state where the program table by keyword shown in FIG. 27 is displayed, then the program history as shown in FIG. 26 is displayed.

An area 212 corresponds to the area 202 shown in FIG. 26. In the area 212, program columns (display areas) showing program histories respectively are displayed in the state where the program histories are classified for each keyword. In other words, program columns capable of being displayed in the area 202 are displayed in the area 212, and the arrangement layout for the program columns is different from that in the area 202.

The reason why the program history and the program table by keyword can be switched only with the simple operation of pressing the switch button is that, as described above, both the program history and the program table by keyword display program columns based on program information for recorded programs.

In this case, each of the program columns (display areas) has the same size as shown in FIG. 27. Also in the program table by keyword, generally a program column for one recorded program displays an image for a thumb nail (moving image or still image) and a title for the recorded program.

In other words, in the program history shown in FIG. 26, the vertical axis indicates time, while in the program table by keyword shown in FIG. 27, the vertical axis indicates a number of recorded programs. As a result, in the program table by keyword, size of each program column has the same area regardless of the length of time required for recording each program. Because of this feature, each program table displays a thumb nail and a title for a program regardless of whether each recorded program is long or short.

Further in the program history shown in FIG. 26, the horizontal axis indicates channels, but in the program table by keyword shown in FIG. 27, the horizontal axis indicates keywords. Namely in the program history shown in FIG. 26, each row shows recorded programs for a corresponding channel, but in the program table by keyword shown in FIG. 27, each row shows recorded programs classified according to a corresponding keywords (including programs from different channels).

As a keyword, for instance, a word previously registered in the content recording/reproducing apparatus 1 itself may be used. In this case, when the specified word used as a keyword is included in the program information, the program history managing section 63 classifies the recorded program identified with the program information as a program corresponding to the keyword (word). Namely, a program column indicating the recorded program is displayed in a row corresponding to the keyword among rows in the program table by keyword.

For the reasons as described above, when a plurality of keywords are included in one program information, a recorded program identified with the program information is classified as a program corresponding to each of the keywords. Namely, a program column indicating the same recorded program may be shown on a plurality of rows corresponding to the plurality of keywords respectively in the program table by keyword.

Further a genre included in program table for a recorded program may be used as a keyword for classification. Further, information optionally set by a user may be used as a keyword for classification.

For convenience in description, support herein that, for instance, the terms of "news", "whether", "music", "sports", "information", "drama" and "variety program" have been employed as keywords.

In this case, the table (data) generated in step S83 shown in FIG. 24 is actually as shown in FIG. 28. Namely the table shown in FIG. 28 shows a program table by keyword as a whole, and only a portion enclosed with a bold line in the entire program table by keyword is displayed in the area 212 shown in FIG. 27.

The program table by keyword shown in FIG. 28 is described in further details.

In each row in the program table by keyword shown in FIG. 28, a program column located at a lower position in the figure indicates a timely new program (the start time when the program was started closer to the current time) and a program column located at a higher position in the figure indicates a timely old program (the start time when the program was started further from the current time).

As described above, the program table by keyword has a display format in which program columns are piled up with a program started at time closer to the current time located at a lower position regardless of the time zone for broadcasting. Therefore, in the program table by keyword, there is no clearance between adjoining program columns as found in the program history. Further a number of program columns located in each row varies according to each keyword, and therefore the program table looks like a bar graph including bars having different heights respectively.

The program table by keyword generated as described above is displayed on the output section 27 in step S84 shown in FIG. 24.

As described above, however, the entire program table by keyword shown in FIG. 28 is not displayed, and a portion thereof is displayed according to size of the output section 27 or resolution thereof. For instance, in the example shown in FIG. 27, only the portion enclosed by a frame 222 shown in FIG. 28 is displayed.

In other words, assuming that this frame 222 is regarded as the so-called window, only the window 222 is displayed. Therefore, as shown in FIG. 28, the display contents (display range) of the area 212 shown in FIG. 27 can be changed by moving the window 222 as shown in FIG. 28. The process for moving this window 222 corresponds to the process sequence shown in step S87 to step S89 in FIG. 24. When the user wants to change display contents (display area) of the area 212 shown in FIG. 27, namely when the user wants to move the window 222 as shown in FIG. 28, the user is required only to press any of the up, down, right, and left buttons on the remote controller according to the necessity.

Further the user may perform operations like those to the program history as described above also for the program table by keyword. Namely, the program history managing section 63 can execute the processes in step S85 and on shown in FIG. 24 completely similarly even when the program table by keyword is displayed.

An arrangement order of keywords along the horizontal axis of the program table by keyword is not limited to the example described above, and any order is allowable. For instance, each genre (keyword) may be arrayed in the rightward descending order, by the number of recorded programs belonging to each genre (keyword). The genre means such as, "news", "music", "weather", "drama", "information", "variety program", and "sports". In this case, a user can easily imagine the entire arrangement of program columns. Namely, a program column at the top in each genre is displayed, and a user can easily understand that a number of recorded programs becomes fewer as compared to that displayed at the top, and even when only a portion of the program table by keyword is displayed, the user can easily grasp the entire image.

An example in which the present invention is applied was described above with reference to the content recording/reproducing apparatus 1 shown in FIG. 1.

The present invention is not limited to the example shown in FIG. 1, and various forms are allowable in the present invention.

Figure 29:
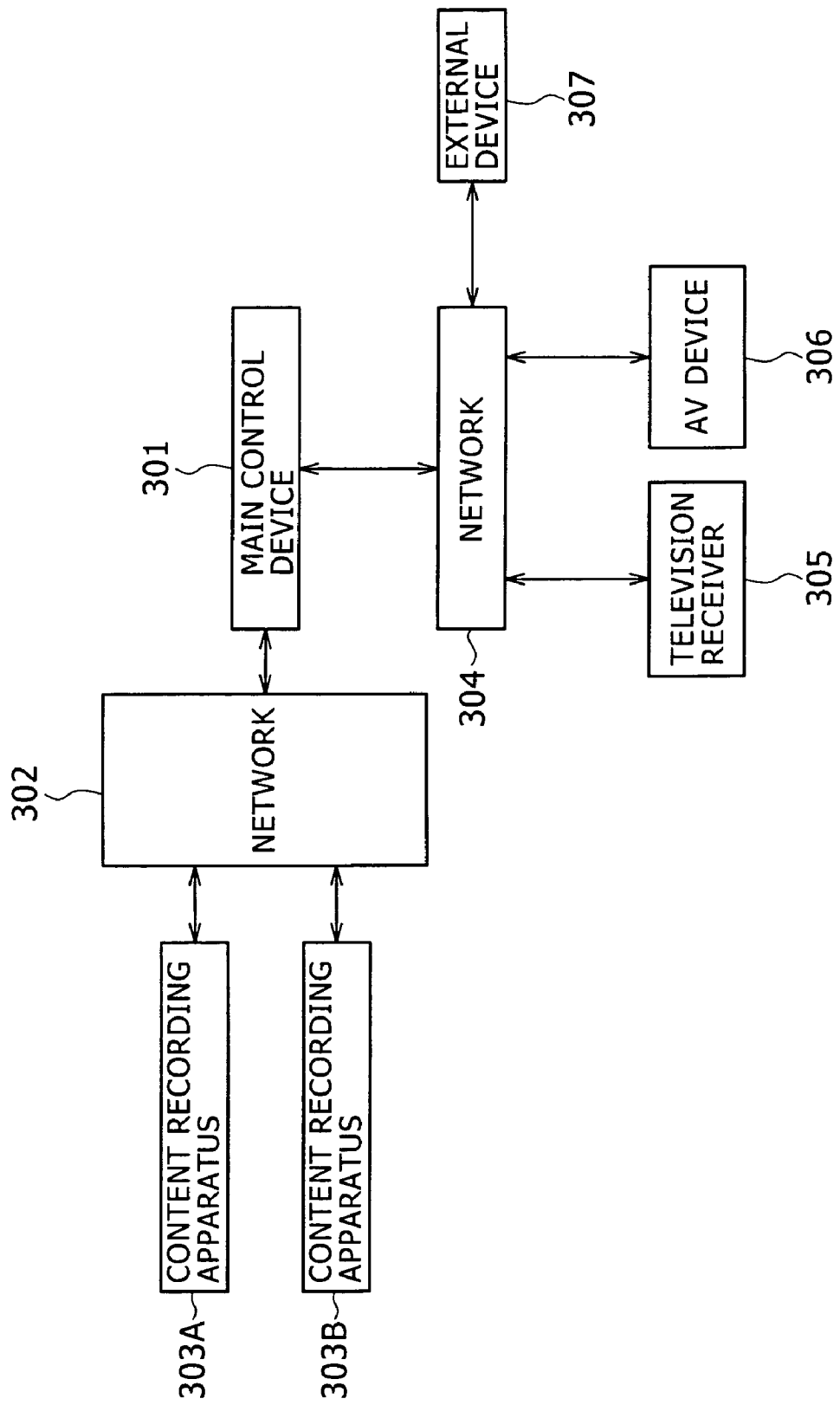
FIG. 29 is a view showing an example of configuration of an information processing system according to the present invention (having different configuration from that shown in FIG. 1).

More specifically, the present invention is applicable, for instance, also to the information processing system as shown in FIG. 29. Namely FIG. 29 shows an example of configuration of an information processing system in which the present invention is applicable.

In the information processing system shown in FIG. 29, a main control unit 301, a content recording apparatus 303A, and a content recording apparatus 303B are connected to each other via a network 302.

The main control unit 301, content recording apparatus 303A, and content recording apparatus 303B shown in FIG. 29 have the functions corresponding to those of the main control unit 11, content recording section 13A, and content recording section 13B respectively. Namely, the main control unit 301, content recording apparatus 303A, and content recording apparatus 303B have the same functional configurations as those of the main control unit 11, content recording section 13A, and content recording section 13B as shown in FIG. 4 respectively.

Further hardware configurations of the main control unit 301, content recording apparatus 303A, and content recording apparatus 303B shown in FIG. 29 are not always required to be, but also may be the same as those of the main control unit 11, content recording section 13A, and content recording section 13B respectively. Namely also the configuration is allowable in which the functional configuration of the main control unit 301 is, for instance, as shown in FIG. 2 and the content recording apparatus 303A and content recording apparatus 303B have the same functional configurations as those shown in FIG. 3.

In the following description, when it is not required to express the content recording apparatus 303A and the content recording apparatus 303B discretely, the two components are generically expressed as a content recording apparatus 303 like in other case where, when it is not required to express the content recording section 13A and the content recording section 13B discretely, the two components are generically expressed as a content recording section 13.

In other words, when the main control section 11 and two content recording sections 13 are accommodated within one housing, the housing, main control section 11, and two content recording sections 13B form the content recording/reproducing apparatus 1 shown in FIG. 1.

On the other hand, when the main control section 11 and two content recording sections 13 are located as the main control unit 301 and two content recording apparatus 303 each as an independent apparatus at different places respectively, the components form (a portion of) the information processing system shown in FIG. 29.

Namely, when a system is defined as an apparatus as a whole including a plurality of devices, FIG. 1 and FIG. 29 shows the same example of configuration of the information processing system in which the present invention is applicable, and the different consists only in whether the components are accommodated within a housing or not.

Therefore, in the example shown in FIG. 29, only two content recording apparatus 303 are provided, but there is no specific restriction over a number of the content recording apparatus 303 forming the information processing system like a case of the content recording section 13 described above.

There is no specific restriction over a form of the network 302, and the form may be the same as that of the network 12 shown in FIG. 1.

Further, in the example shown in FIG. 29, a network 304 different from the network 302 is connected to the main control section 301. With this configuration, the main control section 301 can send and receive various types of information to and from other apparatus connected to the network 304. For instance, in the example shown in FIG. 29, the main control unit 301 can send and receive various types of information to and from a television receiver 305, an AV (Audio and Visual) device 306, and an external device 307 via the network 304.

Therefore, although not shown in FIG. 1, it is needless to say that also the main control section (or the communicating section 29 shown in FIG. 2 to describe more exactly) can also be connected to a network like the network 304 and can send and receive various types of information to and from other devices connected to the network.

When the series of processes described above is executed by software, the program constituting the software is installed from a network or a recording medium, for instance, to a computer incorporated in dedicated hardware, or a general purpose computer capable of executing various types of functions when various types of programs are installed therein.

This recording medium includes not only the removable recording medium 31 shown in FIG. 2 such as a magnetic disk (including a floppy disk) with a program recorded therein for providing the program to a user, an optical disk (including a CD-ROM (Compact DISK-Read Only Memory), a DVD (Digital Versatile Disk) and an photo-magnetic disk (MD (Mini-DISK)) each provided in addition to the information processing apparatus itself, or a semiconductor memory, but also the ROM 29 shown in FIG. 2 or the ROM 42 shown in FIG. 3 each with a program recorded therein previously incorporated in the information processing apparatus itself or a hard disk included the storage section 28 shown in FIG. 2 or in the HDD 46 shown in FIG. 3.

In the examples described above, broadcast programs (video signals and audio signals constituting the same) are carried with radio signals (airwaves), but may also be carried through a cable like in the case of a cable television system.

Namely the broadcast program as used herein is defined with a broad concept including not only carried with ground waves or satellite waves, but also contents distributed through a network or the like. In other words, in this specification, terms of broadcast program and contents are treated as the synonymous terms. From the view point as described above, also the program information is not limited to an EPG (Electronic Program Guide), and includes meta data for general contents and information concerning broadcast programs (contents) as defined herein.

Further the steps of describing the programs in a recoding medium may be sequentially executed according to the time sequence as described in this specification, but also concurrently or discretely.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing method for an information processing apparatus for providing controls to have contents recorded in a recording medium for recording therein one or more broadcast programs broadcasted in the past as data displayed on a specified display device, said method comprising:

acquiring program information including at least first information indicating a broadcast station, second information indicating a start time of the broadcast program, and third information indicating an end time or a time zone, corresponding to one or more broadcast programs recorded in said recording medium;

generating a program table in which columns in one of a vertical direction and a horizontal direction are allocated to broadcast stations, columns in the other direction are allocated to time zones, program columns for the corresponding broadcast programs are allocated on each of one or more areas identified with said one or more acquired program information in the entire area constituting the first program table, and the program table is output as first image data, said first image data including at least one moving thumbnail image corresponding to a broadcast program; and controlling a display so that, when said first image data is outputted as a result of said program table generating step while the control is being executed to display a background image corresponding to second image data on said specified display device, data constituting each of said one or more program columns of said first image data which is currently selected is synthesized on corresponding data in said second image data with a first transmission percentage, remaining data constituting each of said one or more program columns of said first image data which is currently unselected is synthesized on corresponding data in said second image data with a second transmission percentage higher than said first transmission percentage, said background image is displayed in unallocated program column areas of the first image data without recorded broadcast programs to display, and an image corresponding to the resultant synthesized image data is displayed on said specified display device.

2. The method of claim 1, wherein
the generating step includes generating a second table in which information different from the broadcast stations or time zones is allocated to columns in the vertical direction or in the horizontal direction and in which said one or more program columns included in the first program table are arrayed according to a prespecified rule in the second table, and outputting the second program table as the first image data.

3. A non-transitory computer-readable medium including computer readable instructions encoded thereon that, when executed by a processor, cause the processor to implement a method for displaying contents recorded in a recording medium recording one or more programs broadcasted in the past as data on a specified display device, comprising:

acquiring with the processor program information including at least first information indicating a broadcast station, second information indicating a start time of the broadcast program, and third information indicating an end time or a time zone, corresponding to one or more broadcast programs recorded in said recording medium;

generating a program table in which columns in one of a vertical direction and a horizontal direction are allocated to broadcast stations, columns in the other direction are allocated to time zones, program columns for the corresponding broadcast programs are allocated on each of one or more areas identified with said one or more acquired program information in the entire area constituting the first program table, and the program table is output as first image data, said first image data including at least one moving thumbnail image corresponding to a broadcast program; and controlling with a controller a display so that, when said first image data is outputted as a result of said program table generating step while the control is being executed to display a background image corresponding to second image data on said specified display device, data constituting each of said one or more program columns of said first image data which is currently selected is synthesized on corresponding data in said second image data with a first transmission percentage, remaining data constituting each of said one or more program columns of said first image data which is currently unselected is synthesized on corresponding data in said second image data with a second transmission percentage higher than said first transmission percentage, said background image is displayed in unallocated program column areas of the first image data without recorded broadcast programs to display, and an image corresponding to the resultant synthesized image data is displayed on said specified display device.

4. The non-transitory computer readable medium of claim 3, wherein
said generating step includes generating a second program table in which information different from the broadcast stations or time zones is allocated to columns in the vertical direction or in the horizontal direction and in which said one or more program columns included in the first program table are arrayed according to a prespecified rule in the second table, and outputting the second program table as the first image data.

5. An information processing apparatus for providing controls to have contents recorded in a recording medium for recording therein one or more broadcast programs broadcasted in the past as data displayed on a specified display device, said information processing apparatus comprising:

an acquiring unit configured to acquire program information including at least first information indicating a broadcast station, second information indicating a start time of the broadcast program, and third information indicating an end time or a time zone, corresponding to one or more broadcast programs recorded in said recording medium;

a program table generating unit configured to generate a first program table in which columns in one of a vertical direction and a horizontal direction are allocated to broadcast stations, and columns in the other direction are allocated to time zones, by allocating program columns for the corresponding broadcast program on each of one or more areas identified with said one or more program information acquired by said acquiring means in an entire area constituting the first program table, and to output the first program table as first image data, said first image data including at least one moving thumbnail image corresponding to a broadcast program; and a display control unit configured to provide controls so that, when said first image data is outputted from said program table generating unit while the control is being provided to have a background image corresponding to second image data displayed on said specified display device, data constituting each of said one or more program columns of said first image data which is currently selected is synthesized on corresponding data in said second image data with a first transmission percentage, remaining data constituting each of said one or more program columns of said first image data which is currently unselected is synthesized on corresponding data in said second image data with a second transmission percentage higher than said first transmission percentage, said background image is displayed in unallocated program column areas of the first image data without recorded broadcast programs to display, and an image corresponding to the resultant synthesized image data is displayed on said specified display device.

6. The apparatus of claim 5, wherein said program table generating unit is further configured to generate a second program table in which information different from the broadcast stations or time zones is allocated to columns in the vertical direction or in the horizontal direction and in which said one or more program columns included in the first program table are arrayed according to a prespecified rule in the second table, and to output the second program table as the first image data.

7. The information processing apparatus according to claim 5, wherein the display control unit is further configured to not display said thumbnail image for a broadcast program if the corresponding program column has insufficient length to fit the thumbnail image.

8. The information processing apparatus according to claim 5, wherein the program table generating unit is further configured to generate said first image data further including a program title.

* * * * *